United States Patent [19]
Bender et al.

[11] Patent Number: 5,232,490
[45] Date of Patent: Aug. 3, 1993

[54] OXIDATION/REDUCTION PROCESS FOR RECOVERY OF PRECIOUS METALS FROM $MnO_2$ ORES, SULFIDIC ORES AND CARBONACEOUS MATERIALS

[75] Inventors: Fredrick N. Bender, Santa Fe, N. Mex.; James E. Reynolds, Lakewood; Robert L. Elder, Leadville, both of Colo.

[73] Assignee: Leadville Silver and Gold, Leadville, Colo.

[21] Appl. No.: 845,858

[22] Filed: Mar. 3, 1992

Related U.S. Application Data

[63] Continuation of Ser. No. 443,747, Nov. 29, 1989, abandoned, which is a continuation-in-part of Ser. No. 212,046, Jun. 24, 1988, abandoned, which is a continuation-in-part of Ser. No. 802,701, Nov. 27, 1985, abandoned.

[51] Int. Cl.$^5$ .......................... C01G 5/00; C01G 7/00; C22B 11/00
[52] U.S. Cl. ......................................... 75/733; 75/736; 75/744; 423/27; 423/38; 423/40; 423/41
[58] Field of Search ................. 423/22, 27, 38, 40, 423/41, 46, 51, DIG. 4; 75/732, 733, 736, 744, 725

[56] References Cited

U.S. PATENT DOCUMENTS

| | | | |
|---|---|---|---|
| 136,102 | 2/1873 | Selwyn | 423/40 |
| 889,129 | 5/1908 | Hendryx | 423/40 |
| 937,965 | 10/1909 | Schneider | 423/40 |
| 1,736,660 | 11/1929 | Mitchell | 423/40 |
| 2,747,965 | 5/1956 | Daugherty | 423/51 |
| 2,829,967 | 4/1958 | Schlecht | 423/22 |
| 3,047,365 | 7/1962 | Jukkola | 423/542 |
| 3,117,860 | 1/1964 | Bjorkerud et al. | 423/53 |
| 3,150,959 | 9/1964 | Wraith, Jr. | 75/645 |
| 3,533,739 | 10/1970 | Pelczarski et al. | 423/437 |
| 3,540,387 | 11/1970 | McLaren et al. | 110/345 |
| 3,540,848 | 11/1970 | Krugler et al. | 423/460 |
| 3,540,901 | 11/1970 | Kaitner | 501/112 |
| 3,958,985 | 5/1976 | Anderson | 423/22 |
| 4,002,717 | 1/1977 | Sandberg et al. | 423/24 |
| 4,026,773 | 5/1977 | Van Peteghem | 423/37 |
| 4,042,664 | 8/1977 | Cardwell et al. | 423/24 |
| 4,082,546 | 4/1978 | Wallace | 75/725 |
| 4,150,091 | 4/1979 | Peterson | 423/35 |
| 4,284,618 | 8/1981 | VanderHyden | 423/605 |
| 4,369,061 | 1/1983 | Kerley, Jr. | 75/732 |
| 4,545,816 | 10/1985 | Rappas | 423/24 |
| 4,591,489 | 5/1986 | Gremm | 423/DIG. 1 |
| 4,668,289 | 5/1987 | Langer et al. | 423/27 |
| 4,740,243 | 4/1988 | Krebs-Yuill et al. | 423/27 |
| 4,752,332 | 6/1988 | Wu et al. | 423/27 |
| 4,765,827 | 8/1988 | Clough et al. | 423/27 |
| 4,801,329 | 1/1989 | Clough et al. | 423/27 |

FOREIGN PATENT DOCUMENTS 26790 of 1905 United Kingdom ................ 423/40

OTHER PUBLICATIONS

Clement K. Chase, "Treatment of Manganiferous Silver Ores for Recovery of Silver in View of Changed Precious Metals Economics", Feb. 22–26, 1981, pp. 23–33.

(List continued on next page.)

*Primary Examiner*—Michael Lewis
*Assistant Examiner*—Steven Bos
*Attorney, Agent, or Firm*—Sheridan Ross & McIntosh

[57] ABSTRACT

A process for separating precious metals from an $MnO_2$, sulfidic or carbonaceous refractory ore or refractory feed such as tailings is provided. The process includes the step of leaching a feed with a leach liquor that includes an acid selected from the group of HCl and $H_2SO_4$ in the presence of $MnO_2$ and a reductant. A source of chloride ion is added to the leach sufficient to dissolve at least about 50% of the precious metals present in the ore. A portion of the leach is removed and precious metals are recovered from the removed portion. A portion of the chloride carrier is recycled to the leach to carry chloride values to the leach. In one embodiment, HCl is regenerated by pyrohydrolysis, which minimizes harmful waste products. The present process can advantageously avoid the use of noxious reagents.

41 Claims, 20 Drawing Sheets

OTHER PUBLICATIONS

P. R. Bremner, "Silver Recovery from Cyanide Tailings Using an Acidic $MnCl-FeCl_2$ Leachant", Bureau of Mines Report of Investigations No. 8649.

Lindsay D. Norman, et al., "Review of Major Proposed Processes for Recovering Manganese from United States Resources", Bureau of Mines Information Circular No. 8160.

A. Conners, "Hydrochloric Acid Regeneration as Applied to the Steel and Mineral Processing Industries", CIM Bulletin, Feb. 1975, pp. 75-81.

B. J. Scheiner, et al., "Extraction of Silver from Refractory Ores" Bureau of Mines Report of Investigations No. 7736, 1973.

Vance G. Leak, "Autoclave and Ambient Pressure Leaching of Lake Superior Manganiferous Ores", Bureau of Mines Report of Investigations No. 7501.

Charles A. Rhoades, "Recovery of Silver from Manganese Ores", Society of Mining Engineers of AIME, Reprint No. 84-140.

G. Thomas, "The Leaching of Manganese from Pyrolusite Ore by Pyrite" Canadian Journal of Chemical Engineering, Feb. 1958, pp. 37-43.

F. E. Joyce, et al., "Sulfatization Reduction of Manganiferous Iron Ore", Bureau of Mines Report of Investigations No. 7749.

F. P. Haver and M. M. Wong, "Ferric Chloride-Brine Leaching of Galena Concentrate", Bureau of Mines Report of Investigations No. 1976.

B. J. Scheiner, R. E. Lindstrom, T. A. Henrie, "Oxidation Process for Improving Gold Recovery from Carbon-Bearing Gold Ores" Bureau of Mines Report of Investigations No. 7573.

M. P. Finkelstein, R. N. Hoare, G. S. James, D. D. Howat, "An Aqueous Chlorination Process for the Treatment of Merrill Slimes and Gravity Concentrates from Gold Ores", Journal of South African Institute of Mining and Metallurgy, Dec., 1966.

Lo, Surges, and Hancock, "The Preferential Aqueous Oxidation of Sphalerite in a Mixed Sulfide Tailing Using Manganese Dioxide" Complex Sulfides, Proceedins of The Metallurgical Society of AIME Nov. 10-13, 1985.

OXIDATION/REDUCTION PROCESS FOR RECOVERY OF PRECIOUS METALS FROM MNO₂ ORES, SULFIDIC ORES AND CARBONACEOUS MATERIALS

This is a continuation of co-pending application Ser. No. 07/443,747, filed on Nov. 29, 1989, now abandoned, which is a continuation-in-part of co-pending application Ser. No. 07/212,046, filed on Jun. 24, 1988, now abandoned, which is a continuation-in-part of U.S. patent application Ser. No. 06/802,701, filed Nov. 27, 1985, now abandoned.

FIELD OF THE INVENTION

The present invention relates to a process for separating precious metals from a precious metals-containing manganese dioxide ore in which sulfidic or carbonaceous material acts as a reductant during a leaching process and also to a process for separating precious metals from a precious metals-containing sulfide or carbonaceous ore or concentrate in which $MnO_2$ acts as an oxidant during a leaching process, and particularly to extraction of precious metals from refractory manganese dioxide or sulfide or carbonaceous ores using a reduction/oxidation leach which comprises HCl or $H_2SO_4$.

BACKGROUND OF THE INVENTION

One of the most common processes for recovery of silver and other precious metals from ore, particularly low grade ores and concentrates is by direct cyanidation. According to this process, a silver-containing ore or concentrate, commonly treated with aqueous and pyrometallurgical pretreatment, such as chloride roasting or high temperature aqueous oxidation under pressure with $O_2$, is leached with a source of cyanide, commonly NaCN. Cyanidation is also applied to some high grade concentrates as an alterative to the accepted smelting procedures. Silver in the ore or concentrate forms the complex $Ag(CN)_2^-$ which is soluble in the cyanide leach. After a solid/liquid separation, precious metal values are recovered from the liquid, typically by cementation or carbon extraction.

A number of sources of silver and other precious metals, including gold, are not effectively treated by the direct cyanidation technique. As used herein, "refractory" refers to sources of precious metals in which the precious metals content is associated with $MnO_2$ or with sulfides or carbonaceous materials and which are thus not amenable to recovery of the precious metals content by direct cyanidation. Refractory sources of precious metals include ores, specifically both raw ores and concentrates, such as flotation concentrates, as well as tailings, both mining tailings and processing tailings such as flotation tailings, and further include cyanide tailings and residuals from various other processes.

Some precious metals-containing ores are refractory because the precious metals are bonded to minerals in the ore. For example, in a manganese dioxide-silver ore, silver is bonded to manganese and direct cyanidation is ineffective to break this bond in any substantial degree. Other types of ores are refractory because precious metals are chemically bound or encapsulated in other minerals. It is not uncommon for even relatively large amounts of precious metals to be found in a sulfidic ore in a highly dispersed form so that there is little surface area of precious metals exposed to a leach. Recovery of precious metals from such ores by, e.g., cyanidation often involves chemical or pyrometallurgical alteration or performing particularly fine grinding on the ore. Such ores include pyrite- or chalcopyrite- antimony- or arsenic-containing ores. Yet another group of ores is refractory because the gangue material, far from being resistant to reaction with cyanide, is particularly reactive with cyanide so that in order to obtain satisfactory dissolution of precious metals, very large amounts of cyanide reagents must be added. A number of methods for treating manganese dioxide-silver refractory ores have been proposed, but most of these are not presently economically viable and few have progressed beyond an experimental stage. Various methods for treating sulfidic and carbonaceous ores are practiced or have been proposed, but for many of these ores, the economics of such methods are unsatisfactory.

Among the methods attempted for treatment of manganese dioxide-precious metals ores are a number of two-stage processes involving a variety of pretreatment methods followed by cyanidation. The pretreatment methods are intended to weaken or break the manganese-precious metals bonds in order to render the precious metals amenable to cyanide dissolution. These pretreatment methods include $SO_2$ leaching, roasting reduction and salt roasting. These and other methods such as copper sulfate plus sodium chloride treatment followed by mercury amalgamation, thiosulfate leach, direct smelter recovery, chloridizing reduction, segregation roasting, flotation, and brine leach have been reviewed in C. D. Chase, "Treatment of Manganiferous Silver Ores for Recovery of Silver in View of Changed Precious Metal Economics", in *Gold and Silver-Leaching, Recovery and Economics*, W. Schlitt, W. Larsen, J. Huskey, Chapter 3, pp. 23–33.

Another class of methods for treatment of refractory manganese dioxide and other types of precious metals ores depends on a brine leach step. It is known that silver, in its native state, or at least after it has been dissociated from such refractory materials as sulfides and manganese oxides, will, in the presence of excess chloride ions, such as are present in a brine solution having a chloride concentration of 5–6 molar, form a tetrachloro complex $(AgCl_4^{-3})$, soluble in a brine solution. Gold, under conditions of high oxidizing potential, similarly forms soluble auric chloride $(AuCl_4^-)$. One method of assuring a $Cl^-$ concentration which is sufficiently high to dissolve precious metals is to add a reagent such as NaCl, $CaCl_2$, or HCl. P. R. Bremmner, "Silver Recovery from Cyanide Tailing Using an Acidic NaCl-FeCl₂ Leachant", Bureau of Mines Report No. 8649 describes a leaching process performed on the tailings from a cyanide process. The tailings contained 1.7 oz./ton silver and 0.025 oz./ton gold. Manganese content was approximately 0.4 percent. A silver extraction of 47 percent was obtained by a 24-hour leach in 5 weight percent NaCl and 1.2 weight percent hydrochloric acid. Silver extraction increased to 82 percent with the addition of 2.5 weight percent $FeCl_2$ as reductant to dissociate the manganese and silver. Acid consumption was 40 to 46 lbs. HCl per ton of feed.

Many brine leach methods are conducted in an acidic environment, particularly in the presence of HCl. One difficulty with a hydrochloric acid leach process, particularly when precious metals content is low, such as less than 5 oz./ton, is the expense of providing the HCl consumed in dissociating the ore. In processes which are directed to recovery of manganese, rather than recovery of precious metals, it has been suggested that HCl used in a manganese ore leach process be partially provided by regeneration of HCl through pyrohydrolysis of the $MnCl_2$ product. L. D. Normal and R. C. Kirby, "Review of Major Proposed Processes for Recovering Manganese from United States Resources, Part II", Bureau of Mines Information Circular 8160; U.S. Pat. No. 4,284,618, issued to Van der Heyden et al. on Aug. 18, 1981. Pyrohydrolysis of $MnCl_2$ to HCl has also been suggested in connection with steel pickling and other mineral and metallurgical processing. A. Conners, "Hydrochloric Acid Regeneration as Applied to the Steel and Mineral Processing Industries", CIM Bulletin, February 1975, pp. 75–81. Such pyrohydrolysis is not practical in conventional brine leach methods of precious metals recovery, because those methods require addition of reagents such as NaCl to dissolve precious metals values. The resultant pregnant liquor contains significant concentrations of NaCl, which, upon heating, will not dissociate chloride. Such a process would thus involve high chloride and HCl consumption.

One alternative to the use of relatively expensive HCl is a $H_2SO_4$-NaCl leach. Previous tests of such a system have indicated silver extractions from manganese dioxide ores were around 51 percent, compared to an 84 percent extraction obtained from an $SO_2$-NaCl treatment in which $SO_2$ acts as a reductant and provides the sulfuric acid environment. B. J. Scheiner et al., "Extraction of Silver from Refractory Ores", Bureau of Mines Report of Investigations 7736. A sulfuric acid leach of manganese ores which is directed to extraction of manganese, rather than recovery of precious metals, has been found to improve upon addition of pyrite or lignite char. V. G. Leak, "Autoclave and Ambient Pressure Leaching of Lake Superior of Manganiferous Ores", Bureau of Mines Report of Investigations 7501.

The acid processes for recovering precious metals from manganese dioxide precious metals ores normally require a process for neutralizing and rejecting manganese and this is another expense.

Ores which are refractory because of the association of precious metal values with sulfidic or carbonaceous materials may also be treated by a two-step process involving a pretreatment followed by cyanidation. Pretreatment methods which have been attempted include oxidation roasting and wet oxidation at elevated temperatures under an $O_2$ overpressure or with $Cl_2$. B. J. Scheiner et al., "Oxidation Process for Improving Gold Recovery from Carbon-Bearing Gold Ores", Bureau of Mines Report of Investigations 7573 discuss recovery of gold from a carbonaceous ore, including oxidation with chlorine, sodium hypochlorite or calcium hypochlorite, followed by cyanidation. As with the two-step treatments directed to the manganese dioxide-precious metals ores, two-step processes are, in general, more expensive to implement and operate than a one-step process. Additionally, oxidation roasting typically requires expensive and technically demanding methods for controlling the release of $SO_2$ and other toxic compounds such as arsenic into the environment, while wet oxidation with $O_2$ overpressure requires high capital and operating costs.

After pretreatment, sulfidic or carbonaceous precious metals ores have also been treated by a brine leaching process. Such a process typically requires high chloride concentrations to maintain the chloride solubility of precious metals which are often relatively high in concentration in sulfidic/carbonaceous ores or concentrates. This leads to costly loss of chloride due to washing requirements. Gold solubility in chloride solution also requires addition of a powerful oxidizing agent which adds to the cost.

In summary, previous methods have not effectively dealt with a number of problems associated with refractory precious metals ores. One difficulty with previous method of precious metals recovery from refractory ores has been the high cost of reagents, compared to the value of recoverable precious metals. This problem is particularly acute in ores which contain a modest amount of silver, for instance less than about 10 oz. Ag/ton of ore. When precious metal values are associated with $MnO_2$, reagent costs of providing a reductant for reducing the manganese in the ore can be prohibitive. Similarly, when precious metals are associated with sulfides in the ores, an oxidant for the sulfides must be provided, at a cost which may be prohibitive.

Reagents which are customarily provided to maintain the chloride ion concentration sufficiently high to render the precious metals soluble in the leach liquor represent another cost which, in many cases, can be excessive. Acids such as $H_2SO_4$ and, particularly, HCl represent a high reagent cost for previous precious metals recovery methods.

Methods which require a cyanide treatment also require costly methods for controlling the release of cyanide compounds into the environment, as well as the cost burden of a two-step process.

Previous methods for recovery of precious metals from refractory ores typically render recovery of by-products such as zinc, lead or copper difficult or infeasible.

Accordingly, it is an object of this invention to provide a process for recovering precious metals from a refractory ore which requires minimal cost or consumption of reagents, such as acids, oxidants or reductants and chloride sources and minimal capital and operating costs.

It is another object of this invention to provide for a precious metals recovery process which can produce marketable base metal by-products in addition to precious metals.

It is a further object of this invention to provide for a refractory ore, precious metals recovery process in which chloride values are recycled in the process.

It is a still further object of this invention to provide for a precious metals recovery process which minimizes the expense associated with environmental controls.

It is yet another object of this invention to provide a precious metals recovery process in which $MnO_2$ is reduced in an acid leach and a sulfidic or carbonaceous material is oxidized.

SUMMARY OF THE INVENTION

The present invention relates to a process for recovery of precious metals from a refractory ore comprising precious metals and manganese dioxide, sulfidic or carbonaceous ores, or mixtures thereof. This process comprises leaching said ore with a leach liquor comprising an acid selected from the group consisting of HCl and $H_2SO_4$ in the presence of a reductant and $MnO_2$ and maintaining a concentration of $Cl^-$ ions in said leach liquor sufficient to substantially dissolve the precious metals. The instant process can be accomplished by heap or percolation leaching or it can be accomplished by agitation leaching. With agitation leaching the ore is prepared by crushing and grinding to a particulate size which allows suspension by agitation. With heap or percolation leaching, the ore is coarse crushed or uncrushed and the reactants are blended with the ore. In the heap or percolation leach, no slurry is formed and no solid-liquid separation step is required (as discussed hereinbelow for the agitated leach embodiment) since the leach effluent is essentially solids free.

In the embodiment of the instant invention in which agitation leaching is used, a feedstream containing the particalized ore is combined with the leach liquor to form a leach slurry. The concentration of $Cl^-$ ions in the leach slurry is maintained sufficient to substantially dissolve precious metals. A stream is removed from the slurry, solids are separated from the removed stream to form a fluid comprising dissolved precious metals and a chloride carrier selected from the group consisting of $MnCl_2$, $CaCl_2$, KCl, $NH_4Cl$ and NaCl. A solid comprising at least a portion of said precious metals is precipitated from the fluid to produce a precious metals-depleted stream, and the chloride carrier is recycled to the leaching step to carry chloride values to the leach.

The process of the present invention preferably involves an autogenous leach, i.e., a leach involving a mutual oxidation/reduction reaction. The autogenous leach requires minimal or no addition of reagent grade oxidizing or reducing agents, but exploits the leach chemistry of complementary ores. When the precious metals ore is an $MnO_2$ ore, the autogenous leach proceeds by addition of a reductant which is preferably a sulfidic or carbonaceous ore. When the precious metals ore is a sulfidic or carbonaceous ore, the autogenous leach proceeds by addition of an $MnO_2$ ore as an oxidant. Chloride values are conserved by recycle following solids removal and precious metals recovery. Chloride concentration requirements and consumption can also be minimized by continuous leach liquor cementation process. The particulars of the autogenous leach will vary with the characteristics of the precious metals-containing ore and with the acid which is employed in the leach, as described more fully below.

The amount of precious metals which must be present in the primary ore for the precious metals recovery embodiment of this invention to be practical will, of course, depend upon a variety of considerations including market factors, capital and labor costs, etc. In the most general terms, it is preferred that a primary manganese-silver ore contain more than about 3.5 oz. of silver per ton of ore. In similar general terms, it is preferred that a sulfidic primary ore contain at least about 6 oz. of silver per ton of ore and that a carbonaceous primary ore contain at least about 5 oz. per ton of ore. An ore having gold values with equivalent worth may be substituted for silver, or an ore containing a combination of silver and gold with equivalent worth can be used.

When the precious metals are associated with $MnO_2$, a reductant such as a carbonaceous or sulfidic reductant is added to the leach. The $Cl^-$ may be from HCl or any of a number of chloride salts. During the leach, manganese in the form of $MnO_2$ is reduced to $MnCl_2$ or $MnSO_4$ which is soluble in the leach, thereby freeing the precious metals values from their association with $MnO_2$ and rendering the precious metals amenable to brine dissolution. Brine dissolution takes place in the same leaching step as $MnO_2$ reduction. A portion of the leach slurry is removed and solid tailings are separated or the effluent from heap or percolation leaching is collected. Precious metals are separated from the resulting liquid by, e.g., cementation. When zinc, lead or other base metals are present, these are removed and, preferably, recovered as by-products. The precious metals-depleted liquid comprises an amount of $MnCl_2$, $CaCl_2$, KCl, $NH_4Cl$ and/or NaCl which is recycled to the leach liquor to maintain elevated chloride levels.

When the leach acid comprises HCl, chloride values are largely in the form of dissolved $MnCl_2$ which can be recycled to provide the chloride carrier for the precious metals without addition of chloride salts. Pyrohydrolysis of a bleed stream from the $MnCl_2$ recycle stream also can be used to generate most or all of the HCl requirement for leaching. The pyrohydrolysis produces an $Mn_2O_3$ calcine by-product or reject.

When the leach comprises $H_2SO_4$, manganese sulfate is removed by precipitation or other methods before the recycle of the liquid to the leach.

When the precious metals are associated with a sulfidic or carbonaceous mineral, $MnO_2$ is added as an oxidant. A source of $Cl^-$ ions is added to the leach. The $Cl^-$ source may be HCl or any of a number of salts. During the leach, the sulfidic or carbonaceous material is oxidized simultaneously with the reduction of $MnO_2$ to $MnCl_2$ or $MnSO_4$, thereby freeing the precious metal values from their association with sulfidic or carbonaceous material, and rendering the precious metals amenable to brine dissolution. Brine dissolution takes place in the same leaching step as oxidation of the sulfidic or carbonaceous materials. A portion of the leach slurry is removed and solid tailings are separated. Precious metals are separated from the resulting liquid by, e.g., cementation. When zinc, lead or other base metals are present, these are removed and, preferably, recovered as by-products. The precious metals-depleted liquid comprises an amount of $MnCl_2$, $CaCl_2$, KCl, $NH_4Cl$ and/or NaCl which is recycled to the leach liquor to maintain elevated chloride levels. When the leach liquor comprises HCl, chlorine values are largely in the form of dissolved $MnCl_2$. The chlorine values can be recycled to the leach to act as the precious metals carrier. HCl can be recovered by pyrohydrolizing $MnCl_2$ to HCl following recovery of precious metals from the fluid. The pyrohydrolysis produces $Mn_2O_3$ calcine as a by-product. When the leach comprises $H_2SO_4$, manganese is removed from the cycle, by, e.g., precipitation with a base before recycle of the liquid to the leach.

Other metals present in the feed or in the added oxidant or reductant, such as copper, lead and particularly zinc, can be recovered from the fluid prior to recycle to the leach. Recovery can be by cementation, solvent extraction, ion exchange, electrolysis, precipitation, crystallization or granulation. An example of a feed comprising zinc and precious metals is a zinc concentrate such as a sphalerite or marmatite flotation concentrate.

Recovery of the dissolved precious metals in the fluid can be by such methods as electrolysis, but is preferably by cementation involving introduction of finely divided metals particles or contact with a reducing metal in the form of sheets, rods or shot. Lead is a preferred reductant in the cementation process of this invention, although zinc, iron or copper can also be used. The precious metals cement product is upgraded by means of hydrometallurgical or pyrometallurgical refining to produce the final precious metals product.

Base metals and manganese derived from the $MnO_2$ oxidant and sulfidic or carbonaceous reductant can be recovered as by-products by methods such as solvent extraction, precipitation, or crystallization.

DETAILED DESCRIPTION

Figure 1:
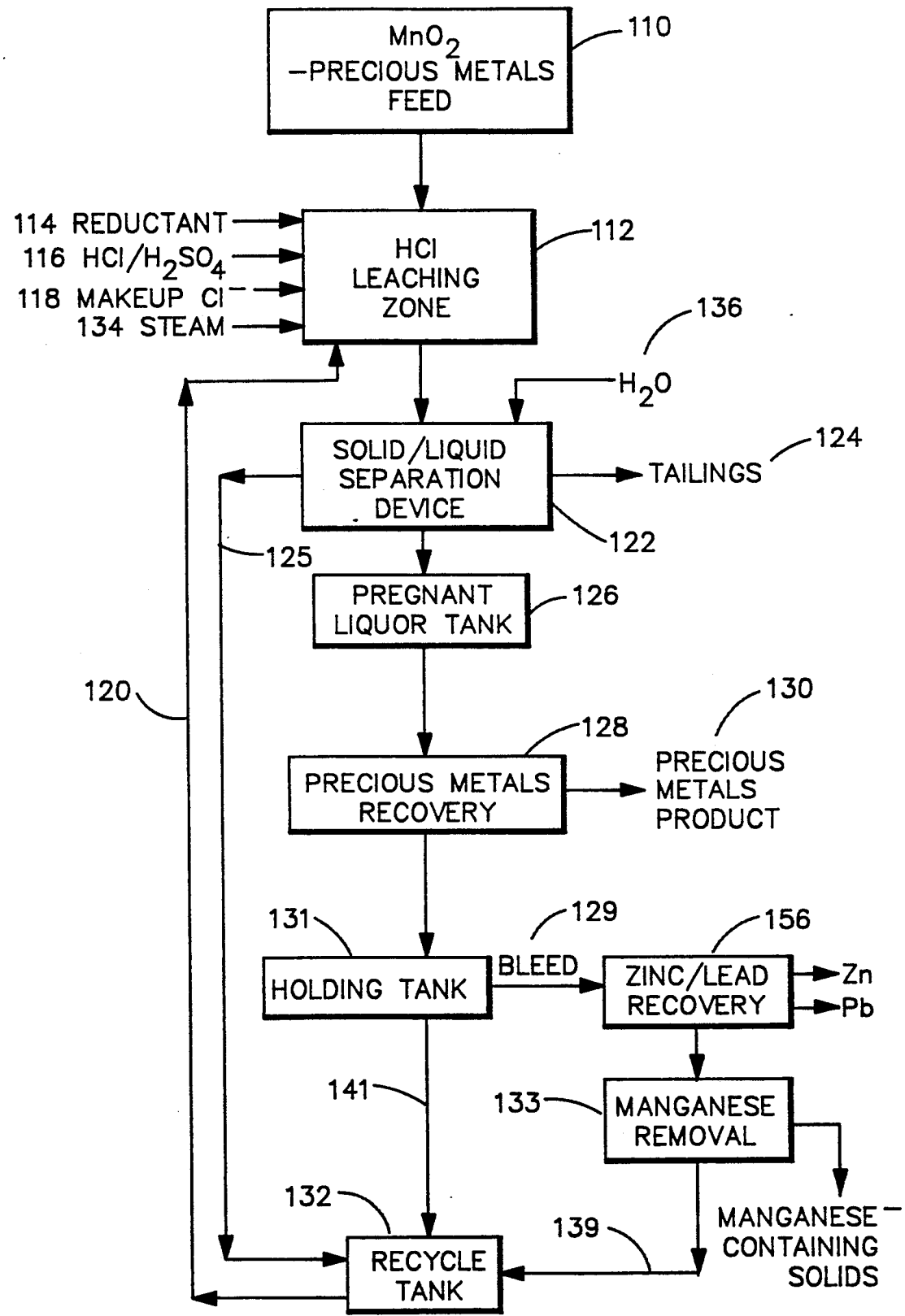
FIG. 1 is a schematic flow diagram of the process of the present invention applied to a manganese-precious metals ore, using an HCl agitation leach.

The present invention relates to a process for recovery of precious metals from refractory ores or other refractory feeds. In particular, the process of the present invention is useful for treatment of feeds in which precious metals, particularly silver and gold, are associated with $MnO_2$ or sulfides. The feed for the process of the present invention can be a raw ore, a partially processed ore such as an ore which has been ground, or subjected to flotation, or tailings from a mining operation or a metals processing operation.

According to one embodiment of this invention, the feed comprises an ore having precious metals associated with $MnO_2$. Examples of refractory $MnO_2$-precious metals feeds suitable for treatment by the process of the present invention are shown in Table I.

TABLE I

| Examples of Manganese Dioxide/Silver Ores | | | | | |
|---|---|---|---|---|---|
| | Assay | | | | |
| | (wt. %) | | | | (oz/ton) |
| Ore | Mn | Zn | Pb | Cu | Ag | Au |
| Agassiz Leadville, Colo. | 16.8 | 3.7 | .66 | — | 5.2 | .04 |
| Round Mountain Silvercliff, Colo. | 3.5 | .2 | 1.3 | — | 2.7 | .01 |
| Salvador Mine Patagonia, Ariz. | 13.5 | 1.3 | — | .12 | 10.7 | .005 |
| Sheep Tanks Mine Yuma, Arizona | 3.5 | .1 | — | .02 | 8.0 | .25 |
| Berenguela Mine Lampa Province, Peru | 20.5 | — | — | 1.5 | 5 to 20 | — |

The process of this embodiment of the present invention includes a leaching step in which a reduction/oxidation reaction takes place in an acidic environment. In order to dissolve the $MnO_2$ and thereby free the precious metals for brine dissolution, the manganese is reduced to a soluble manganese compound such as $MnCl_2$ or $MnSO_4$. To accomplish this reduction, a reductant is added to the leach.

A number of reductants have been found suitable for this purpose including sulfidic materials, carbonaceous materials and reducing wastes such as steel pickling liquors. The reductant is preferably a raw mineral, as opposed to a reagent grade or otherwise processed or refined material. The reductant can be an ore, a mining waste or a milling waste, particularly when such a reductant-containing material is located geographically near the precious metals-containing ore, so as to minimize transportation costs. Nevertheless, when such an ore is not available, the process of the present invention can be practical using a non-ore reductant such as a refined or purified reagent, e.g., pyrite, zinc sulfide concentrate or coal. Examples of sulfidic materials useful as reductants are pyrite; dump ores with mixed pyrite, zinc, lead, copper and iron sulfides; zinc sulfide concentrates; pyrrhotite; arsenopyrite, marmatite; tennantite; sphalerite; galena; and sulfosalts such as tetrahedrite or polybasite. Other materials which are expected to be useful as sulfidic reductants include chalcopyrite, covellite, chalcocite, pyrargerite and proustite. According to one embodiment of this invention, the reductant material contains no significant amount of precious metals, and in particular, contains less than 1 oz. per ton of silver and less than 0.02 oz. per ton of gold. According to another embodiment of this invention, the sulfidic reductant material can be significantly argentiferous, such as an ore comprising argentite, freibergite, pyrargyrite, proustite, polybasite or stephanite, or auriferous, such as an ore containing aruiferous pyrite or sylvanite, gold/silver telluride.

Examples of carbonaceous reductants suitable for the process of this invention include lignite, bituminous coal, peat and carbonaceous gold ores. Carbonaceous materials which are associated with precious metals are particularly preferred.

The leach is conducted in an acidic environment, in particular by leaching with a leach liquor which comprises HCl or $H_2SO_4$. The leach acid can be directly added as a reagent or can be generated in the leach in situ. The latter method is preferred when lime is used downstream to remove Mn in an HCl system. In particular, it is preferred, in this case, that $H_2SO_4$ be added as the primary acid added to the leach, to preclude calcium build-up while regenerating HCl. The downstream manganese removal reactions in this system include the following:

$$MnCl_2 + Ca(OH)_2 \rightarrow Mn(OH)_2 + CaCl_2 \quad (1)$$

The leach reactions in this system include the following:

$$H_2SO_4 + CaCl_2 \rightarrow 2HCl + CaSO_4 \quad (2)$$

This embodiment will need only makeup HCl or $CaCl_2$ to maintain the desired chloride level. If NaOH or $Na_2CO_3$ is used as the base in place of $Ca(OH)_2$ in reaction (1) above, then it is preferred that HCl be used as the primary added acid.

The chemistry of the leaching reactions between $MnO_2$-containing silver ores and sulfidic and carbonaceous materials in HCl and $H_2SO_4$ is represented by the following equations wherein Me represents a metal such as Zn, Pb or Cu:

$$15MnO_2 + 2FeS_2 + 28HCl \longrightarrow \quad (3)$$
$$14MnCl_2 + MnSO_4 + Fe_2(SO_4)_3 + 14H_2O$$

$$45MnO_2 + 6FeS_2 + 2NaCl + 74HCl \longrightarrow \quad (4)$$
$$37MnCl_2 + 8MnSO_4 + 2NaFe_3(SO_4)_2(OH)_6 + 2HCl + 30H_2O$$

$$6FeO(OH) + 2NaCl + 4H_2SO_4 \longrightarrow \quad (5)$$
$$2NaFe_3(SO_4)_2(OH)_6 + 2HCl$$

$$MnO_2 + MeS + 4HCl \longrightarrow \quad (6)$$
$$MnCl_2 + MeCl_2 + S° + 2H_2O$$

$$5MnO_2 + 2CuFeS_2 + 20HCl \longrightarrow \quad (7)$$
$$5MnCl_2 + 2CuCl_2 + 2FeCl_3 + 4S° + 10H_2O$$

$$3MnO_2 + 2Au + 14HCl \longrightarrow 2HAuCl_4 + 3MnCl_2 + 6H_2O \quad (8)$$

$$15MnO_2 + 2FeS_2 + 14H_2SO_4 \longrightarrow \quad (9)$$
$$15MnSO_4 + Fe_2(SO_4)_3 + 14H_2O$$

$$45MnO_2 + 6FeS_2 + 2NaCl + 37H_2SO_4 \longrightarrow \quad (10)$$
$$45MnSO_4 + 2NaFe_3(SO_4)_2(OH)_6 + 2HCl + 30H_2O$$

$$MnO_2 + MeS + 2H_2SO_4 \longrightarrow \quad (11)$$
$$MnSO_4 + MeSO_4 + S° + 2H_2O$$

$$5MnO_2 + 2CuFeS_2 + 10H_2SO_4 \longrightarrow \quad (12)$$
$$5MnSO_4 + 2CuSO_4 + Fe_2(SO_4)_3 + 4S° + 10H_2O$$

$$2Au + 3MnO_2 + 6H_2SO_4 + 8NaCl \longrightarrow \quad (13)$$
$$2NaAuCl_4 + 3MnSO_4 + 3Na_2SO_4 + 6H_2O$$

$$2MnO_2 + C + 4HCl \longrightarrow 2MnCl_2 + CO_2 + 2H_2O \quad (14)$$

Another reductant which can be used in the process of this invention is hydrogen such as that present in hydrocarbons associated with coal. The leach chemistry of this embodiment is represented by the following equation:

$$MnO_2 + 2H + 2HCl \rightarrow MnCl_2 + 2H_2O \quad (15)$$

According to another embodiment of this invention, the feed comprises an ore having precious metal values associated with sulfidic or carbonaceous materials. Examples of refractory sulfidic or carbonaceous precious metals feeds suitable for treatment by the process of the present invention are shown in Table II.

TABLE II

Examples of Sulfidic and Carbonaceous Ores and Concentrates

| Ore | Assay (wt. %) | | | | | (oz/ton) | |
|---|---|---|---|---|---|---|---|
| | Mn | Zn | Pb | Cu | Fe | Ag | Au |
| St. Kevin conc. Leadville, Colo. | 0.2 | 18.0 | 2.4 | — | 25 | 210.7 | .08 |
| Franklin Mine conc. Idaho Springs, Colo. | 0.3 | 7.3 | 6.5 | 7.8 | 15.0 | 44.0 | 4.16 |
| Cashier Mine Summit County, Colo. | 1.4 | 2.6 | 1.5 | 6.0 | 39.5 | 59.1 | .12 |
| Black Cloud conc. Leadville, Colo. | 1.2 | 49.0 | .6 | — | — | 5.4 | .04 |
| Leadville Silver & Gold dump ores Leadville, Colo. | — | 3.5 | 1.9 | — | 15 | 2.9 | .02 |
| carbonaceous ore north central Nevada | carbon = .43% | | | | | | .32 |

The process of this embodiment of the present invention includes a leaching step in which a reduction/oxidation reaction takes place in an acidic environment. In order to dissolve the sulfidic or carbonaceous material and thereby free the precious metal values or brine dissolution, the sulfidic material is oxidized to form a soluble compound such as $FeCl_2$ or $MeCl_2$ and the carbon is oxidized to $CO_2$. To accomplish this oxidation, an amount of $MnO_2$ is added to the leach to act as an oxidant. It has been found that $MnO_2$ can induce an oxidizing potential in the leach sufficient to permit gold to form soluble auric chloride $AuCl_4^-$. Although the $MnO_2$ can be a purchased purified reagent, it is preferably an $MnO_2$ ore. Examples of $MnO_2$ sources suitable for this purpose are Groote Eylant $MnO_2$ ore, low grade $MnO_2$ ores such as GSA stockpile ores, and Leadville manganiferous oxide waste dumps. According to one embodiment of this invention, the $MnO_2$-containing material contains no significant amount of precious metals. According to another embodiment of this invention, the $MnO_2$-containing material may be significantly silver-containing, such as Agassiz, Leadville ore, the Round Mountain Colo. ore and Tombstone, Ariz. ores. The chemistry of the leaching reactions between sulfidic or carbonaceous precious metals ores and $MnO_2$ in HCl and $H_2SO_4$ is the same as that represented by equations (3)–(15) above.

In the agitation and heap leaching systems described, the oxidizing and reducing materials work together synergetically in one reactor. However the oxidation/reduction process also can be applied with the oxidizing and reducing materials in separate reactors connected by the cycling solution. In one reactor sulfidic or carbonaceous materials are oxidized by ferric ion producing ferrous ion in the solution, which then cycles to the other reactor in which $MnO_2$ is reduced and regenerates ferric ion for recyle to the first reactor. With the separate reactor system any combination of agitation and heap systems is possible. That is, the oxidizing reactor can be a heap (percolation) or agitation system and the reducing reactor also can be a heap or agitation system. The flowsheet descriptions for solid/liquid separation, washing and solution handling relating to the agitation and heap leaching systems for the single reactor concept apply to the corresponding reactor in a two reactor system. The solution processing options indicated for the single reactor agitation and heap leach systems also apply to the two reactor systems.

Brine dissolution of precious metals in the leach proceeds by formation of a soluble precious metal-chloride complex such as $AgCl_4^{-3}$ or $AuCl_4^{-}$. The $Cl^-$ concentration in the leach must be large enough that sufficient dissolution of precious metals will result to yield an acceptable precious metals recovery. The effective concentration of chloride will depend upon, among other factors, the concentration of metals such as zinc which will tend to react with chloride and reduce the amount of total chloride present which is available for solubilization of precious metals. In one embodiment of the present invention, the $Cl^-$ concentration must be sufficiently high to complex substantially all precious metals which have been freed by dissolution of the refractory portion of a low grade feed such as a manganese-silver ore. In this embodiment the concentration of $Cl^-$ ions must be sufficient to produce a $Cl^-$ molarity of at least about 2M, based on the amount of accessible precious metals, i.e., precious metals which have been released from the ore matrix by dissolution of the refractory portion of the feed and the solids content of the leach slurry, a higher leach solids content, in general, requiring a higher molarity.

In an embodiment of this invention, as applied to agitation leaching, the required $Cl^-$ concentration can be minimized relative to the amount of silver to be solubilized by a process of continuous cementation. Continuous cementation is particularly useful for a high Ag-content ore, i.e., an ore with more than about 50 oz. Ag per ton of ore or concentrate. According to this process, an amount of leach liquor is bled from the aqueous leach and precious metals are removed from this separated portion by cementation. The precious metals-depleted leach liquor is then returned to the leach. By the process of this embodiment, even when the $Cl^-$ concentration is insufficient to complex all of the accessible precious metals in the ore, there is sufficient concentration of $Cl^-$ to produce dissolution of some portion of the precious metals. If the leach having such a concentration of $Cl^-$ were allowed to reach an equilibrium, without practice of the continuous cementation, there would be an equilibrium between the amount of precious metals dissolved and the amount of precious metals which remained undissolved in the leach. Continuous cementation is a process of continuously removing the portion of the dissolved precious metals, which shifts the equilibrium of the system towards dissolution of more precious metals. In this manner, the $Cl^-$ concentration can be maintained at a level less than 4M, such as between about 1M and about 4M, while still achieving dissolution of substantially all precious metals which have been released from the ore matrix depending on such factors as the precious metals concentration of the feed material, the percent solids in the leach, and the presence of such chloride "getters" as zinc. By practice of either of these embodiments, dissolution of up to about 95 percent of the precious metals originally present in the feed is obtained.

Although continuous leach liquor cementation is an optional process with respect to all embodiments of this invention relating to agitation leaching, it is expected that continuous cementation will nearly always be used when sulfidic precious metals concentrates are being treated because such concentrates typically have a relatively high precious metals content, such as about 100 oz. per ton and as high as about 250 oz. per ton or more.

In any of the embodiments of the present invention, an effective concentration of ferric ion is preferably maintained in the leach. Ferric concentration bears directly on both effectiveness of leach extractions and kinetics. Although the exact mechanism of the reactions involved are not definitively known, the mechanism of the oxidation reduction process includes the action of reductants, such as sulfides (and particularly the refractory sulfide pyrite $FeS_2$), to reduce and solubilize $MnO_2$ and, conversely, the action of $MnO_2$ as an oxidant to solubilize precious metal containing ores, such as sulfides, and particularly precious metal-bearing pyrite. In either case, the oxidation reduction reactions involve the presence of ferric ion as the immediate reductant. $MnO_2$ is believed to function as the primary source of oxidant to convert ferrous to ferric iron, while ferrous iron reduces and solubilizes the manganese. In the presence of $MnO_2$, virtually all the soluble iron is in the ferric form, yielding a high oxidizing electromotive force (EMF), which enhances the kinetics of the oxidation of sulfides and, consequently, the rate of formation of ferrous iron to react with the $MnO_2$. In addition to the maintenance of a high ferric to ferrous ratio, a preferred minimum concentration of ferric iron in the leach has been found to enhance the oxidation of sulfur, particularly pyrite, and consequently produce ferrous iron to reduce $MnO_2$ in addition to maximizing recovery of precious metal values as well as to increase the reaction rates. The preferred minimum amount of ferric ions also applies to the converse situation in which $MnO_2$ is the primary oxidant acting through ferric ion concentration to solubilize sulfides and thus recover associated precious metal values.

For example, it is presently believed that the following sequence of reactions (3A) through (3D) generally indicate the reaction mechanism of reaction (3) above.

$$14FeCl_3 + FeS_2 + 8H_2O \rightarrow 14FeCl_2 + FeSO_4 + H_2SO_4 + 14HCl \quad (3A)$$

$$MnO_2 + 2FeCl_2 + 4HCl \rightarrow MnCl_2 + 2FeCl_3 + 2H_2O \quad (3B)$$

$$MnO_2 + 2FeSO_4 + 2H_2SO_4 \rightarrow MnSO_4 + Fe_2(SO_4)_3 + 2H_2O \quad (3C)$$

$$7Fe_2(SO_4)_3 + FeS_2 + 8H_2O \rightarrow 15FeSO_4 + 8H_2SO_4 \quad (3D)$$

Similarly, it is believed that the following two reactions (6A) and (6B) generally indicate the reaction mechanism of reaction (6) above.

$$2FeCl_3 + MeS \rightarrow 2FeCl_2 + MeCl_2 + S^0 \quad (6A)$$

$$MnO_2 + 2FeCl_2 + 4HCl \rightarrow MnCl_2 + 2FeCl_3 + 2H_2O \quad (6B)$$

For a $MnO_2$ feed ore, a preferred embodiment is a ferric ion concentration greater than about 10 g/l, preferably greater than about 15 g/l and further preferably between about 20 g/l and about 30 g/l. Preferably, the process includes a ferric to ferrous concentration ratio sufficiently high to produce an electromotive force value for the leach solution of about 450–700 mv, more preferably about 500 mv. A large ratio of ferric to ferrous ions is maintained until the $MnO_2$ source is depleted in said leach slurry.

Although a minimum concentration of ferric ions in the leach is desirable, an excess, particularly in post-leach processes, is preferably avoided. Iron ions present during iron-based cementation from the pregnant liquor must be predominantly ferrous, rather than ferric, if precious metal recovery is to be efficient. Reduction in the pregnant liquor of ferric to ferrous ions could be prohibitively expensive and thus excessive ferric ion concentration should be avoided. Further, high ferric concentration in the manganese removal step, described more fully below, may adversely affect the market value of the manganese-containing solids byproduct by contaminating the byproduct with iron.

To increase ferric ion concentration in the leach, a feed ore containing iron or a reductant which contains an iron source such as pyrite may be used, or an iron-containing cement component in the precious metals cementation step, discussed more fully below, may be used. Such iron-containing component can provide at least part and usually all of the desired iron concentration, e.g. by way of a recycle stream to the leach.

Preferably, jarosite precipitation, described more fully below, may be used for control of ferric ion concentration, during or following the leaching step. Jarosite precipitation results in precipitation of iron as, e.g. $NaFe_3(SO_4)_2(OH)_6$. The jarosite precipitation method is preferably conducted in the presence of a monovalent cation, such as $H^+$, $Na^+$, $K^+$, or $NH_4^+$. For example, about 0.33 moles $Na^+$ per mole of ferric ion can provide the desired cation concentration. The amount of jarosite precipitation is controlled by the amount of monovalent cation pr⁻sent, by temperature and by pH (e.g. base concentration). In general, an increase in temperature and/or increase in base concentration results in an increase in precipitation of jarosite.

Jarosite precipitation preferably occurs before the initial solid/liquid separation, preferably in the leach, thus avoiding additional solid/liquid separation. Jarosite precipitation can be conducted after the initial solid/liquid separation, e.g. to provide for higher $Fe^{+3}$ leach concentrations. A second, non-preferred iron control method involves decreasing iron in process steps downstream from the leaching step, e.g. $Fe(OH)_3$ may be precipitated by addition of a base such as lime.

In any of the embodiments of the present invention, an effective concentration of $Cl^-$ must be maintained in the leach. Sources of the $Cl^-$ for the leach include the addition of makeup NaCl, $CaCl_2$ or HCl. Make-up chloride is preferably added to the leach by using the makeup chloride solution as a wash solution for the solid/liquid separation step and conveying the wash effluent back to the leach step. In this way, a high chloride concentration is maintained in the solid/liquid separation step so as to prevent any precious metals precipitation which might result if the chloride concentration in the solid/liquid separation step was not maintained sufficiently high to keep precious metal values in solution.

Another aspect of maintaining effective concentration of $Cl^-$ in the leach is to reduce or prevent loss of chlorine values as $Cl_2$ which can cause environmentally troublesome leaches as well as representing loss of an economically valuable resource. When pyrite is used as a reductant, providing sufficient amount of pyrite with respect to $MnO_2$, particularly a 100 percent stoichiometric amount of $FeS_2$ (with respect to Equation (3) above), results in about 95 to 98 percent recapture and retention of Cl in the leach slurry. A 100 percent stoichiometric amount of $FeS_2$ would represent a molar ratio of $MnO_2$ to $FeS_2$ of about 7.5. More complete $Cl_2$ recapture, such as about 99.8 percent, can be achieved where pyrite in excess of the stoichiometric amount is added.

In order to maintain a sufficiently high concentration of $Cl^-$ in the leach, while minimizing the addition requirement and associated cost of makeup chloride, a chloride recycle system is used in the process of the present invention. According to this recycle process, the leached solids are removed from the exit stream of the leach, yielding a fluid which comprises dissolved $MnCl_2$ and other chlorides or $MnSO_4$ and dissolved precious metals. The chloride values of this fluid are recycled to the leach, typically after recovery of precious metals from the fluid. In the HCl leach system, manganese, normally regarded as a species which is preferably removed from a leach because it often is refractory with respect to a precious metals leach, is purposely recycled to the leach, because of its useful role as a chloride "carrier." When the leach is to comprise an amount of HCl, providing for an $MnCl_2$ stream has the further advantage that it makes possible a regeneration of HCl for recycle to the leach, as described below. The rate of such recycle is determined by the water washing requirements and the water balance of the leach step, taking into consideration the limits of solubility of the manganese compounds.

As noted, the recycle step serves to maintain desired high levels of chloride ion in the leach without requiring the addition of large amounts of chloride-containing reagents. However, the recycle step, in the absence of further treatment of the recycle fluid, also conveys manganese back to the leach. In order to prevent a build-up of manganese concentration in the leach to unacceptable levels, i.e., to levels where $MnO_2$ is no longer effectively solubilized in the leach, the recycle stream must be treated to remove an amount of manganese from the recycle stream. Start-up phases of a leach process may require recycle of nearly all manganese back to the leach until the required chloride values are reached. However, in the steady-state operation of the preferred continuous leaching process, the manganese content of the recycle stream is controlled such that the manganese entering the leach in the ore and added reductant or other leach additives is approximately balanced by the manganese removed from the cycle.

Several methods can be used to remove manganese from the recycle stream, as more fully described below. The manganese withdrawn may be disposed of as tailings or may represent a useful and valuable by-product. Lime neutralization can be used to produce $Mn(OH)_2$. When lime neutralization is used in the HCl leach system, it is preferred to employ $H_2SO_4$ as the primary acid reagent and to generate HCl in the leach in-situ by reaction of $H_2SO_4$ with a chloride salt such as $CaCl_2$. In this way calcium build-up is avoided. As an alternative to lime neutralization, manganese can be removed by a process comprising crystallization, solvent extraction or precipitation with reagents other than lime.

When the leach comprises HCl, it is particularly advantageous to remove manganese from the recycle stream by a process comprising pyrohydrolysis of $MnCl_2$ to form HCl and $Mn_2O_3$. The HCl thus produced can be recycled to the leach to both conserve chloride values and preserve the required acidic leach environment. Normally, such regenerated HCl will not meet the entire requirements of the HCl leach, principally because of washing losses. Make-up HCl for the leach can be provided by adding HCl, by adding $CaCl_2$ and $H_2SO_4$ or by adding NaCl, which will generate HCl through precipitation of jarosite.

The $Mn_2O_3$ produced by pyrohydrolysis can be disposed of as tailings or can be marketed as a by-product. When particularly pure $Mn_2O_3$ is desired as a by-product, $MnCl_2 \cdot H_2O$ can be crystallized, separated, and pyrohydrolyzed to form a high-purity $Mn_2O_3$ calcine.

Although the present invention is described in the context of recovery of precious metals, the process of this invention is effective for dissolution of a number of refractory ores, regardless of whether the ultimate purpose is recovery of precious metals. According to this aspect of the invention, a refractory ore comprising sulfidic, carbonaceous, or manganiferous material is treated by a process comprising leaching the refractory ore with a leach liquor comprising an acid selected from the group consisting of HCl and $H_2SO_4$ in the presence of $MnO_2$ and a sulfidic or carbonaceous reductant. When the ore is agitated, a leach slurry is formed; a stream is removed from the slurry; and solids are removed from the stream. In the heap or percolation leach embodiments, solid/liquid separation is not necessary since the leach effluent is essentially free of solids.

The process can further comprise recycling a fluid, resulting from the separation of solids, from said removed agitation batch slurry stream or from said heap leach effluent, to said leaching step.

When the ore or other constituents of the leach comprise other valuable minerals, these can also be recovered according to the process of this invention. Particularly, as more fully described below, manganese, $Mn_2O_3$, zinc, lead and copper can be recovered. It is preferred that removal of zinc and lead be conducted prior to manganese removal in order to prevent interference of zinc or lead with the manganese removal step or with pyrohydrolysis, when it is included.

Referring now to FIG. 1, a refractory manganese precious metals feed, comprising precious metals associated with $MnO_2$ 110 is conveyed to a leaching zone 112. Although the leach can be conducted at ambient temperature, preferably an amount of steam 134 is added sufficient to produce a leach temperature of between about 60° C. and about 100° C. A reductant 114 is introduced into the leaching zone 112. The amount of reductant 114 added to the leaching zone 112 must be sufficient to reduce substantially all of the $MnO_2$ present in the feed 110. When the reductant 114 is a sulfide, the amount of reductant 114 added should be sufficient to produce a sulfide to manganese molar ratio of at least about 1 to 7.5 relative to the pyrite content and about 1 to 1 relative to the MeS content. When the reductant 114 is carbonaceous, the amount of reductant 114 added to the leaching zone 112 should be sufficient to produce a carbon to manganese molar ratio of at least about 1 to 2.

HCl or $H_2SO_4$ 116 is added in an amount sufficient to produce a pH of less than about 1. When lime neutralization is used in the manganese removal step as described below, it is preferred to produce HCl in the leach in-situ by adding $H_2SO_4$ to the leach for reaction with chloride salts such as $CaCl_2$. In-situ generation of HCl is also advantageous when the precious metals ore or any added reductant or oxidant comprises an amount of a calcium-containing compound, such as calcite. A source of makeup $Cl^-$ 118 such as HCl, $CaCl_2$, or NaCl can be added to the leaching zone 112 to maintain the required concentration of $Cl^-$. NaCl added may report to the calcine resulting from pyrohydrolysis of precious metals-depleted liquor to HCl, if such pyrohydrolysis is desired. Sodium can also be removed in the leach as sodium jarosite by control of pH, with consequent formation of HCl. A recycle stream 120 comprising $MnCl_2$, produced by a process described below, is introduced to the leaching zone 112. The rate of introduction of $MnCl_2$ by recycle stream 120 is adjusted such that the total concentration of $MnCl_2$ in the leaching zone 112, derived from both the recycle stream 120 and from reduction of the incoming $MnO_2$, component of the ore 110, is greater than about 1 molar. The total concentration of $Cl^-$, obtained from the recycle stream 120, from the addition or generation of HCl 116 and from any make up $Cl^-$ source 118, is maintained at about 3 molar.

The slurry from the leaching zone 112 is conveyed to a solid-liquid separation device 122. Although the process of the present invention can be practiced in a batch mode, it is preferred that a continuous mode operation be employed as by continuously conveying a stream of the leach slurry from leaching zone 112 and conducting this stream to a continuous-operation solid/liquid separation device 122. In all embodiments of this invention, the rate at which the feed 110 enters the leaching zone 112 and the rate at which the leach slurry is bled off the leaching zone 112 and conveyed to the solid/liquid separation device 122 are adjusted to provide an average residence time of the feed in the leaching zone 112 sufficient to dissolve substantially all, i.e., more than about 85 weight percent, of the precious metals in the feed 110. The average residence time is preferably between about 3 hours and about 6 hours.

The solid/liquid separation can be performed by a number of devices, including filtration, gravity settling, centrifugation, decantation, thickening, counter-current washing or combinations thereof. The solids from the separation device 122 are substantially depleted of precious metal values by washing with water, preferably containing an amount of $Cl^-$ ions sufficient to maintain precious metals in solution 136. Solids are disposed of as tailings 124. The liquid from the solid/liquid separation device can be directly recycled to the leach 125 as when dissolved precious metals in the liquid have not yet built up to the point where it is desired to perform precious metals recovery, e.g. during start-up of the system. When precious metals recovery from the liquid is desired, the fluid portion from the solid/liquid separation device 122 is conducted to a pregnant liquor tank 126. The fluid comprises dissolved precious metals, dissolved $MnCl_2$, and may additionally comprise other metals such as zinc, iron, lead, and copper and other elements such as calcium, magnesium and sodium.

The fluid from the pregnant liquor tank 126 is conducted to the precious metals recovery device 128, dissolved precious metals are recovered by a method such as cementation, sulfide precipitation, dilution for AgCl precipitation or electrolysis. In the preferred embodiment, precious metals are recovered by a cementation process involving contact with a metal which is less noble than a precious metal, such as zinc, iron, or lead, in powder, granular or other form, to produce a precious metals product 130 such as an Ag/Au cement. Precious metals-depleted fluid is conveyed to a holding tank 131. Manganese is removed from a bleed stream 129 taken from the precious metals-depleted stream by a manganese removal process 133. Manganese removal can be accomplished by such means as precipitation of manganese sulfate or lime neutralization, to reject manganese as $Mn(OH)_2$. These processes can be used in any of the manganese removal steps depicted in FIGS. 2-10, as well. The manganese-depleted liquor 139 can be recycled to the leach. The remaining portion of the pregnant liquor 141, i.e., that portion not bled off to the manganese removal process, is conducted to a recycle tank 132 whence recycle stream 120 conveys a chloride-containing recycle fluid to the leaching zone 112. Chloride can be recycled to the leaching zone 112 by chloride carriers such as $CaCl_2$, $MnCl_2$ and/or NaCl.

Figure 1A:
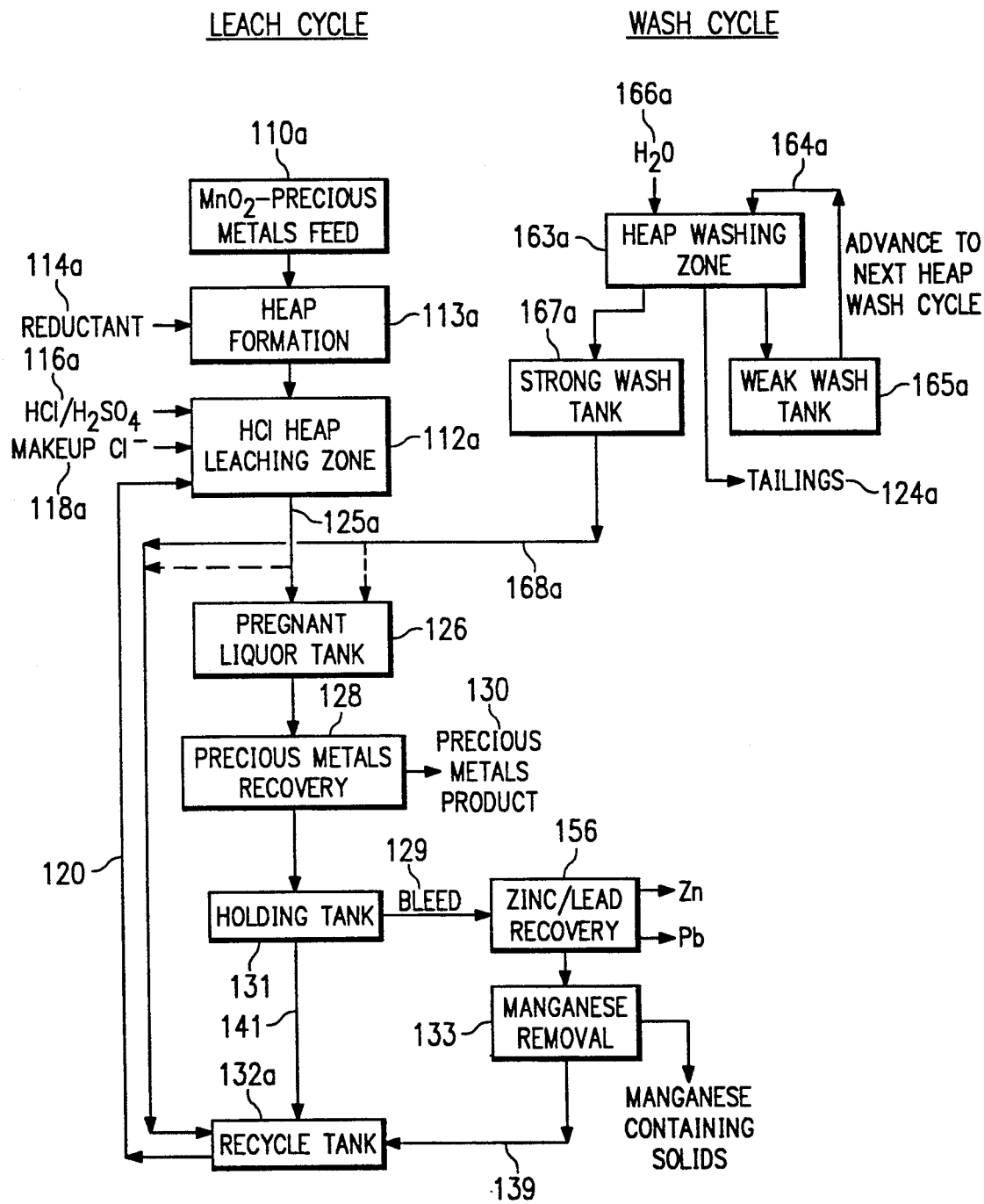
FIG. 1A is a schematic flow diagram of the process of the present invention applied to a manganese-precious metals ore, using a HCl heap leaching process.

Referring now to FIG. 1A, a refractory manganese precious metals feed 110a is conveyed to a heap formation zone 113a where a reductant 114a is blended with the $MnO_2$ precious metals feed. The amount of reductant 114a added to the formation zone 113a must be sufficient to reduce substantially all of the $MnO_2$ present in the feed 110a. When the reductant 114a is a sulfide, the amount of reductant 114a added should be sufficient to produce a sulfide to manganese molar ratio of at least about 1 to 7.5 relative to the pyrite content and about 1 to 1 relative to the MeS content. When the reductant 114a is carbonaceous, the amount of reductant 114a added to the formation zone 113a should be sufficient to produce a carbon to manganese molar ratio of at least about 1 to 2.

HCl or $H_2SO_4$ 116a is added to the heap leaching zone 112a, along with recycle liquids 120 by any one of the accepted methods of application used in heap or percolation leaching, in an amount sufficient to produce a pH of less than about 1. The leaching is conducted at ambient temperatures. When lime neutralization is used in the manganese removal step as described below, it is preferred to produce HCl in the leach in-situ by adding $H_2SO_4$ to the leach for reaction with chloride salts such as $CaCl_2$. In-situ generation of HCl is also advantageous when the precious metals ore or any added reductant or oxidant comprises an amount of a calcium-containing compound, such as calcite. A source of makeup $Cl^-$ 118a such as HCl, $CaCl_2$, or NaCl can be added to the leaching zone 112a to maintain the required concentration of $Cl^-$. NaCl added may report to the calcine resulting from pyrohydrolysis of precious metals-depleted liquor to HCl, if such pyrohydrolysis is desired.

Sodium can also be removed in the leach as sodium jarosite by control of pH, with consequent formation of HCl. A recycle stream 120 comprising $MnCl_2$, produced by a process described in connection with FIG. 1, is introduced to the leaching zone 112a. The rate of introduction of $MnCl_2$ by recycle stream 120 is adjusted such that the total concentration of $MnCl_2$ in the leaching zone 112a, derived from both the recycle stream 120 and from reduction of the incoming $MnO_2$ component of the ore 110a, is greater than about 1 molar. The total concentration of $Cl^-$, obtained from the recycle stream 120, from the addition or generation of HCl 116a and from any makeup $Cl^-$ source 118a, is maintained at about 3 molar.

Heap leaching by percolation, following known practice, is continued until incremental recovery of precious metal values in the effluent has decreased to a minimum for sound economics. A reasonable cycle time in the leach zone is on the order of 30 to 60 days. The leach zone effluent 125a is essentially clear pregnant liquor, obviating solid liquid separation. The pregnant liquor 123a advances to the pregnant liquor tank 126. Subsequent treatment is the same as described for FIG. 1 above.

Following the leaching cycle, the heap is subjected to washing by percolation with water 166a, applying known practice, to recover entrained chloride and precious metals values. Although depicted as a separate washing zone 163a, it is contemplated that the heap is not moved from the leach location, but is merely subjected to in place washing with water. Washing with water 166a, preferably containing an amount of $Cl^-$ ions sufficient to maintain precious metals in solution, is countercurrent, advancing weak wash liquor 164a from the weak wash tank 165a to the next leached heap wash zone and recycling the strong wash liquor 168a from the strong wash tank 167a to the subsequent leach through recycle tank 132a. Following washing to effect a predetermined recovery of the leach liquors residual from the lead zone 112a, the heap is regarded as tailings 124a to be left in place or transported to a tailings area. A final chemical treatment of the heap in place or in transit to disposal can be used as necessary to meet environmental requirements. The effluent liquid 125a from the leaching zone 112a can be directly recycled to the leach as when dissolved precious metals in the liquid have not yet built up to the point where it is desired to perform precious metals recovery, e.g. during start-up of the system. When precious metals recovery from the liquid is desired, the fluid portion from the leach zone 112a is conducted to a pregnant liquor tank 126. The fluid comprises dissolved precious metals, dissolved $MnCl_2$, and may additionally comprise other metals such as zinc, iron, lead, and copper and other elements such as calcium, magnesium and sodium. This can be treated as discussed for FIG. 1 to recover precious metals.

Figure 2:
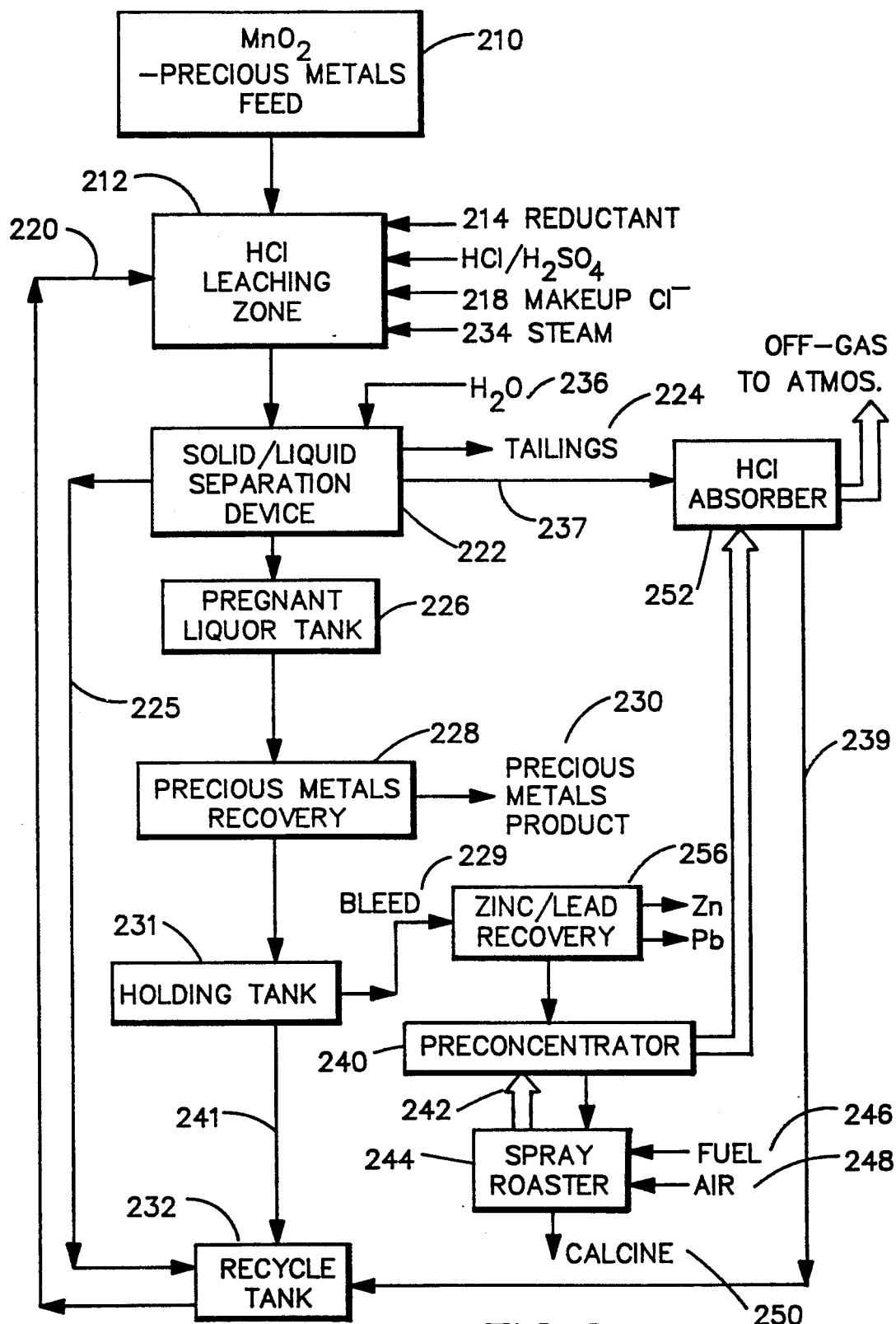
FIG. 2 is a schematic flow diagram of the process of FIG. 1 including HCl recycle by pyrohydrolysis and zinc recovery.

FIG. 2 is a schematic flow diagram of a process similar to the process depicted in FIG. 1, intended for processing of an $MnO_2$-precious metals ore in a hydrochloric acid leach, but further comprising steps for regeneration and recycling of HCl, by means of a pyrohydrolysis process, and recovery of zinc. According to the process of this invention, a $MnO_2$-precious metals ore 210 is conveyed to an HCl leaching zone 212. Also added into the leaching zone 212 is a reductant 214, preferably sulfidic reductant such as pyrite or carbonaceous reductant, an amount of HCl or $H_2SO_4$ 216, and makeup Cl⁻ 218 from HCl, NaCl or CaCl₂. The amounts of reductant 214, HCl/H₂SO₄ 216 and NaCl or CaCl₂ 218 are the same as that of the embodiment depicted in FIG. 1.

The leach process is conducted in a continuous mode, i.e., the feed 210 is continuously conveyed to the leaching zone 212, and a stream of the leach slurry is continuously conveyed to the solid/liquid separation device 222.

As in the embodiment depicted in FIG. 1, the solid/liquid separation device 222 can be a number of different separation devices, such as a filtration device, a decantation device, a centrifugation device, an gravity settling device, or combinations thereof. Wash water 236 is added to the solid/liquid separation device 222. The wash liquor 237, after use, is conveyed to the HCl absorber 252 to act as a quenching fluid.

The solids exiting the solid/liquid separation device are disposed of as tailings 224. The pregnant liquid from the solid/liquid separation device 222 comprising dissolved precious metals and dissolved MnCl₂ is recycled to the leach 225 or conveyed to the pregnant liquor tank 226. Liquid from the pregnant liquor tank 226 is conveyed to the precious metals recovery device 228 for recovery of precious metals product 230.

Precious metals-depleted fluid is conveyed to a holding tank 231. A portion of the fluid from the holding tank 231 which has been depleted of its precious metals content is conveyed to the zinc/lead removal/recovery device 256. Zinc removal/recovery can be accomplished by a number of processes including solvent extraction, ion exchange, precipitation, and electrolysis, depending upon the zinc product desired, such as zinc sulfate, zinc hydroxide or zinc sulfide. In one embodiment, cathode zinc can be recovered by an ion exchange process followed by electrolysis. Alternatively, zinc sulfate can be produced by granulation or spray drying or the first separation zinc chloride can be precipitated with lime to prepare a zinc oxide product. Lead removal can be accomplished by a sulfidizing reagent such as H₂S, NaHS, or CaHS to precipitate PbS. Zinc and lead can be precipitated together in a single device as ZnS and PbS. Simultaneous precipitation can be achieved by conducting the sulfidizing step at a pH of about 5, for example by addition of a base. When the zinc and lead removal/recovery steps are conducted separately, these steps are independent in the sense that they can be performed in either order. When precious metals-depleted liquid is sufficiently low in zinc or lead as to be free of substantial interference with the subsequent manganese removal step, the zinc and/or lead removal/recovery steps can be deleted. Although the zinc/lead removal/recovery step 256 has been described in connection with the embodiment of FIG. 2, this description also applies to the zinc/lead removal/recovery steps of FIGS. 3-10.

Following removal of lead and zinc, as needed, 256, the lead- and zinc-depleted fluid from the circuit 256 is conveyed to a preconcentrator 240. The preconcentrator is preferably a wet cyclone device, but may be any device suitable for separating volatile components of a mixture from less volatile components. In the preferred embodiment, volatilization of the fluid conveyed to the preconcentrator 240 is accomplished by heating the fluid with off-gas 242 generated by the spray roaster 244.

The unvolatilized portion of the fluid from the preconcentrator 240 is conveyed to a pyrohydrolysis device, which is preferably a spray roaster 244. In the spray roaster 244, fuel, such as fuel oil, natural gas, powdered coal or coal partial combustion gas 246 and air 248, are mixed and combusted producing an off-gas 242 and heat. The heat is used to drive the endothermic reaction:

$$4MnCl_2 + 4H_2O + O_2 \rightarrow 2Mn_2O_3 + 8HCl \tag{16}$$

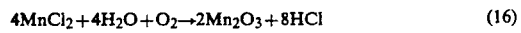

In the spray roaster device 244, the unvolatilized fluid exiting the preconcentrator 240 is dispersed by a spray nozzle and heated by the combustion of the fuel 246 and air 248 to a temperature between about 500° C. and about 900° C. At this temperature, substantially all, i.e., more than about 95 weight percent and preferably about 99.5 weight percent, of the MnCl₂ is pyrohydrolyzed to form Mn₂O₃ and HCl according to reaction (16). The fluid from the preconcentrator will normally contain other constituents, such as FeCl₃ or FeCl₂ which will also be pyrohydrolyzed, according to the reactions:

$$2FeCl_3 + 3H_2O \rightarrow Fe_2O_3 + 6HCl \tag{17}$$

$$4FeCl_2 + 4H_2O + O_2 \rightarrow 2Fe_2O_3 + 8HCl \tag{18}$$

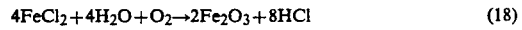

The pyrohydrolysis calcine 250 can be disposed of as waste, or the Mn₂O₃ can be marketed as a by-product. The gaseous product from the spray roaster, comprising regenerated HCl is conveyed back to the preconcentrator 240.

In the preconcentrator 240, the volatile portion of the fluid input to the preconcentrator, including the regenerated HCl input from the spray roaster device 244, is separated and conveyed to an HCl absorber device 252.

The HCl absorber device 252 may be any of a number of devices capable of absorbing HCl from combustion gas, such as a packed tower, or a venture scrubber. The off-gas from HCl absorber 252 is vented to the atmosphere. The HCl scrub liquor 239 along with the portion of the holding tank fluid 241 which is not bled off to the zinc/lead recovery device 256 is conveyed to the recycle tank 232.

The fluid in the recycle tank 232, comprising HCl and MnCl₂, is conveyed by recycle line 220 to the leaching zone 212. As in the configuration depicted in FIG. 1, the flow rate of the fluid through recycle line 220 is adjusted so as to produce a leach liquor MnCl₂ concentration of about 2 molar.

Figure 2A:
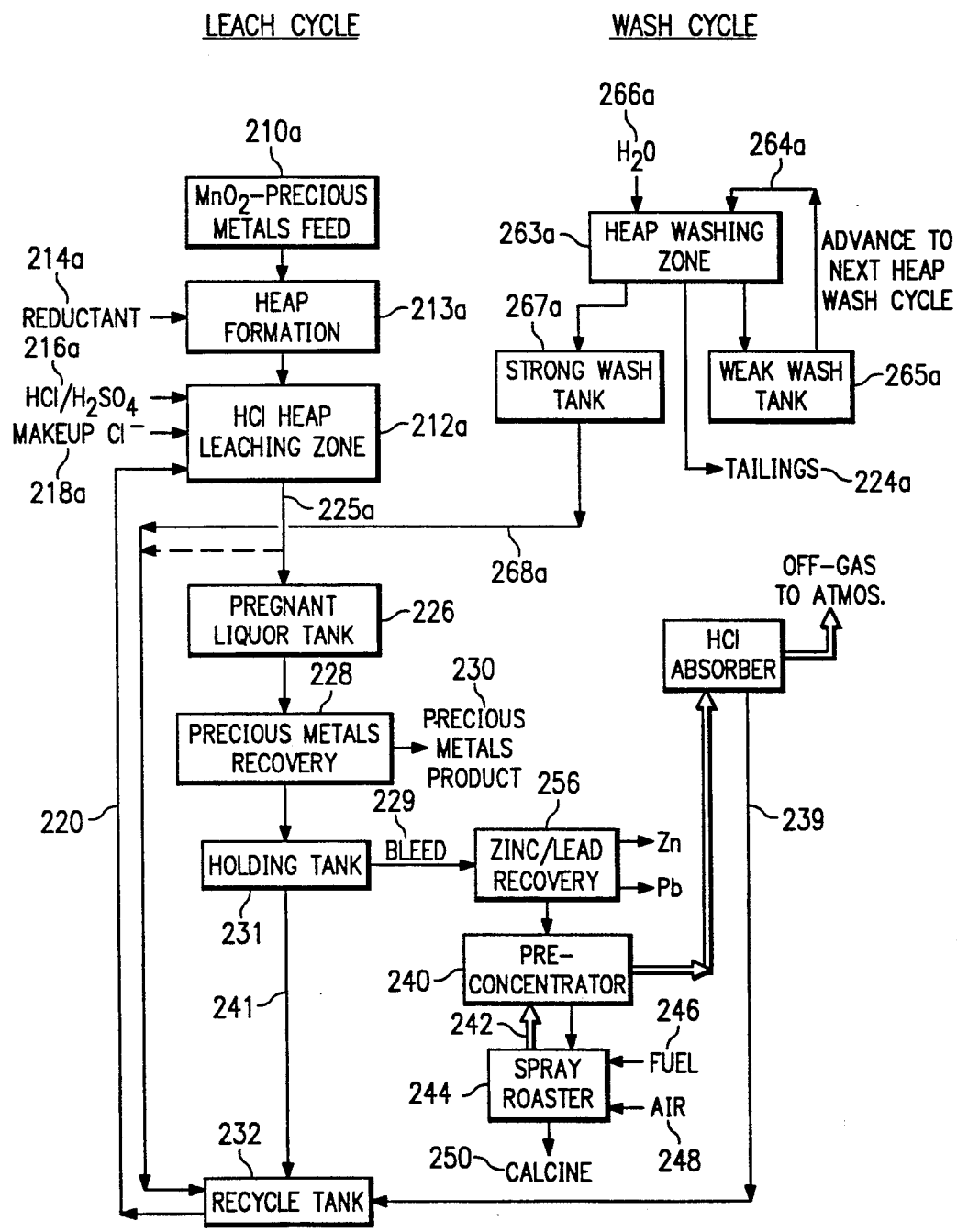
FIG. 2A is a schematic flow diagram of the process of FIG. 1A, including HCl recycle by pyrohydrolosis and zinc recovery.

FIG. 2A is a schematic flow diagram of a process similar to the process depicted in FIG. 1A, further comprising steps for regeneration and recycling of HCl, by means of a pyrohydrolysis process, and recovery of zinc. According to the process of this invention, a refractory manganese precious metals feed 210a is conveyed to a heap formation zone 213a where a reductant 214a is blended with the refractory manganese precious metals feed. The reductant 214a added into the heap formation zone 213a is preferably sulfidic reductant such a pyrite or carbonaceous reductant. An amount of HCl or H₂SO₄ 216a, and makeup Cl⁻ 218a from HCl, NaCl or CaCl₂ is added into the heap leaching zone 212a along with recycle liquid 220. The amounts of reductant 214a, HCl/H₂SO₄ 216a and NaCl or CaCl₂ 218a are the same as that of the embodiment depicted in FIG. 1A.

The leach process is conducted at ambient temperatures generally in a batch mode, using any configuration of design for leaching coarse material by percolation, such as heaps, vats, columns, mine dumps or tailings piles.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 225a is essentially clear pregnant liquor, obviating solid liquid separation. The pregnant liquor advances to the pregnant liquor tank 226. Subsequent treatment is the same as described for FIG. 2 above.

Following the leaching cycle, the heap is subjected to washing by percolation with water 266a, applying known practice, to recover entrained chloride and previous metals values. Although depicted as a separate washing zone 263a, it is contemplated that the heap is not moved from the leach location, but is merely subjected to in place washing with water. Washing with water 266a preferably containing an amount of $Cl^-$ ions sufficient to maintain precious metals in solution, is countercurrent, advancing weak wash liquor 264a from the weak wash tank 265a to the next leached heap wash zone and recycling the strong wash liquor 268a from the strong wash tank 267a to the subsequent leach through recycle tank 232. Following washing to effect a predetermined recovery of the leach liquors residual from the leach zone 212a, the heap is regarded as tailings 224a to be left in place or transported to a tailings area. A final chemical treatment of the heap in place or in transit to disposal can be used as necessary to meet environmental requirements. The effluent liquid 255a from the leaching zone 212a comprising dissolved precious metals and dissolved $MnCl_2$ is recycled to the leach or conveyed to the pregnant liquor tank 226. This can then be treated as disclosed for FIG. 2 to recover previous metal.

Figure 3:
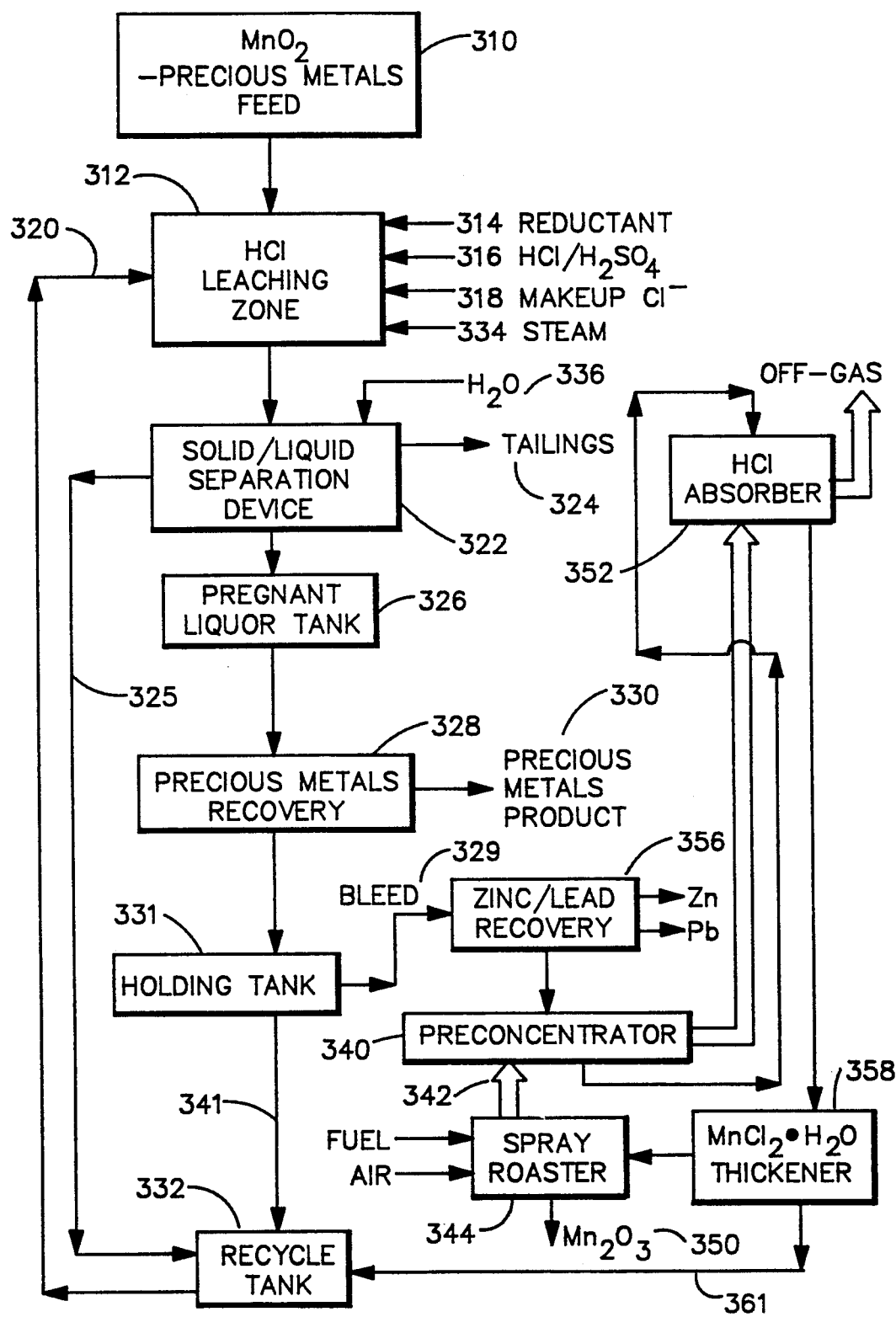
FIG. 3 is a schematic flow diagram of the process of FIG. 1 with HCl recycle pyrohydrolysis preceded by $MnCl_2 \cdot H_2O$ concentration.

Referring now to FIG. 3, an embodiment is depicted for recovery of precious metals from an $MnO_2$-precious metals ore by a HCl leach. This embodiment is similar to the embodiment depicted in FIG. 2, except that high purity $MnCl_2 \cdot H_2O$ is crystallized from the HCl absorber, resolubilized and pyrohydrolyzed to form a high purity $Mn_2O_3$ calcine. This embodiment is thus preferred when it is desired to produce a high purity $Mn_2O_3$ by-product.

In the embodiment depicted in FIG. 3, an $MnO_2$-precious metals feed 310 is conveyed to a leaching zone 312 where reductant 314, $HCl/H_2SO_4$ 316 and makeup $Cl^-$ from HCl, NaCl or $CaCl_2$ 318 are added along with steam 334 and recycle fluid 320. A stream of the leach slurry is continuously conveyed to a solid/liquid separation device 322. Solids are disposed of as tailings 324. The separated liquid is sent to a pregnant liquor tank 326 whence it is recycled to the leach 325 or conveyed to a precious metals recovery step 328 where the precious metals product 330 is recovered. The precious metals-depleted fluid is conveyed to a holding tank 331 and a portion is bled off and conveyed to a lead and zinc removal/recovery step 356, and then to a preconcentrator 340 such as a wet cyclone. The remaining holding tank liquid 341 is conveyed to recycle tank 322. As in the embodiment depicted in FIG. 2, the volatile portion of the fluid sent to the preconcentrator device 340 is conveyed to an HCl absorber device 352. Unlike the embodiment depicted in FIG. 2, the non-volatile portion of the fluid sent to the preconcentrator device 340 is conveyed to the HCl absorber device 352 where it is sparged with the HCl volatile portion from the preconcentrator device 340. The HCl-sparged slurry is conveyed to a thickener 358 where the slurry is cooled to crystallize $MnCl_2 \cdot H_2O$. The underflow 359 from the thickener 358, containing high purity $MnCl_2 \cdot H_2O$ crystals is conveyed to the spray roaster or fluidized bed roaster device 344 where it is pyrohydrolyzed to form high purity $Mn_2O_3$ calcine 350 and HCl which is conveyed to the preconcentrator device 340 for sparging in the HCl absorber 352 as already described. Off-gas from the HCl absorber 352 is vented to the atmosphere. Besides providing high purity $Mn_2O_3$ calcine 350, the HCl sparging process acts to concentrate $MnCl_2$ and reduce the hydrolysis costs.

The overflow 361 from the thickener 358 comprising HCl is conveyed to the recycle tank 332. The $HCl/MnCl_2$-containing fluid in the recycle tank 332 is conveyed to the leaching zone 312 by recycle line 320 in a manner similar to that of the embodiment depicted in FIG. 2.

Figure 3A:
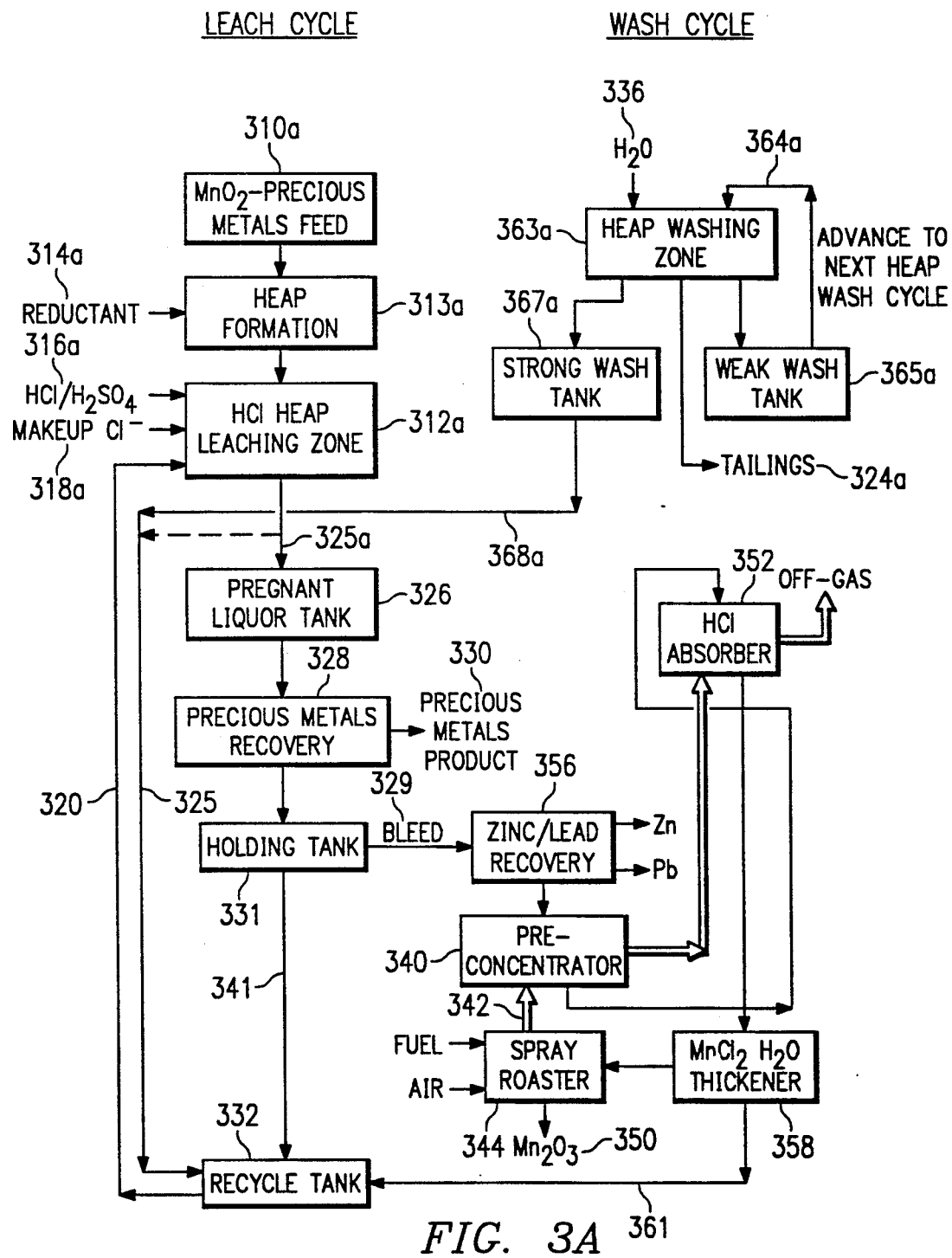
FIG. 3A is a schematic flow diagram of the process of FIG. 1A, with HCl recycle pyrohydrolosis preceded by $MnCl_2 \cdot H_2O$ concentration.

Referring now to FIG. 3A, an embodiment is depicted for recovery of precious metals from an $MnO_2$-precious metals ore by a HCl leach. This embodiment is similar to the embodiment depicted in FIG. 2A, except that high purity $MnCl_2 \cdot H_2O$ is crystallized from the HCl absorber, resolubilized and pyrohydrolyzed to form a high purity $Mn_2O_3$ calcine. This embodiment is thus preferred when it is desired to produce a high purity $Mn_2O_3$ by-product.

In the embodiment depicted in FIG. 3A, an $MnO_2$-precious metals feed 310a is conveyed to a heap formation zone 313a where a reductant 314a is blended with the refractory manganese precious metals feed. $HCl/H_2SO_4$ 316a and makeup $Cl^-$ from HCl, NaCl or $CaCl_2$ 318a are added along with recycle liquid 320 at the heap leaching zone 312a.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 325a is essentially clear pregnant liquor, obviating solid liquid separation. The pregnant liquor 323a advances to the pregnant liquor tank 326. Subsequent treatment is the same as described for FIG. 3 above.

Following the leaching cycle, the heap is subjected to washing by percolation with water 366a, applying known practice, to recover entrained chloride and previous metals values. Although depicted as a separate washing zone 363a, it is contemplated that the heap is not moved from the leach location, but is merely subjected to in place washing with water. Washing with water 366a preferably containing an amount of $Cl^-$ ions sufficient to maintain precious metals in solutions, is countercurrent, advancing weak wash liquor 364a from the weak wash tank 365a to the next leached heap wash zone and recycling the strong wash liquor 368a from the strong wash tank 367a to the subsequent leach through recycle tank 332. Following washing to effect a predetermined recovery of the leach liquors residual from the lead zone 312a, the heap is regarded as tailings 324a to be left in place or transported to a tailings area. A final chemical treatment of the heap in place or in transit to disposal can be used as necessary to meet environmental requirements. The effluent liquid 325a is sent to a pregnant liquor tank 326 whence it is recycled to the leach 325 or conveyed to a precious metals recovery step 328 where the precious metals product 330 is recovered. It can then be treated as disclosed for FIG. 3 to recover precious metals.

Figure 4:
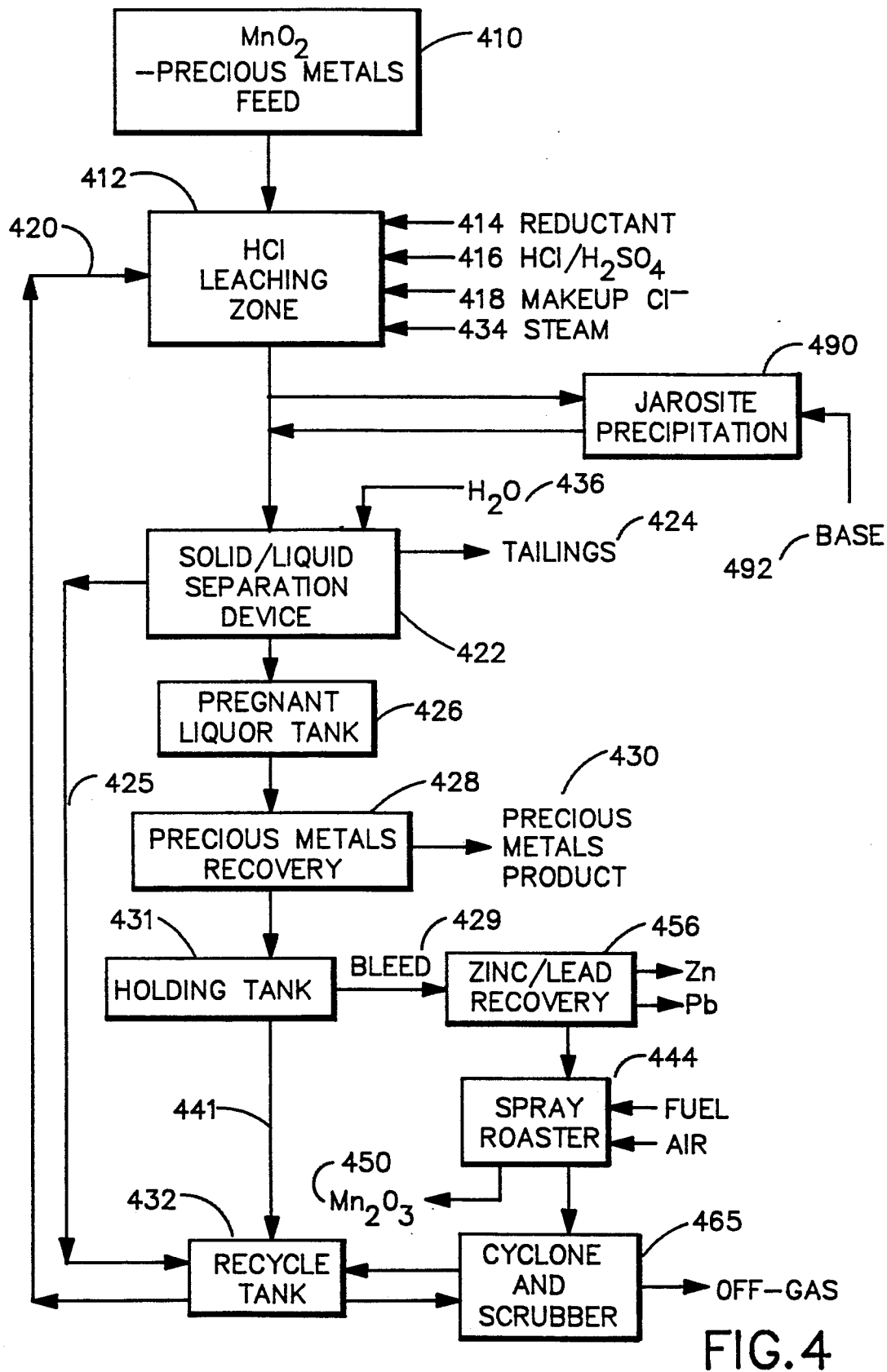
FIG. 4 is a schematic flow diagram of the process of FIG. 2 including an iron removal step.

The embodiment depicted in FIG. 4 is similar to the embodiment depicted in FIG. 2, except that a step is provided for precipitation of jarosite to remove iron and sulfates resulting from the leach reaction with pyrite and acid attack on iron oxides in the ore.

In this embodiment, a $MnO_2$-precious metals feed 410 is conveyed to a leaching zone 412 where it is combined with HCl 416, reductant 414, makeup $Cl^-$ source 418, a recycle stream comprising $MnCl_2$ and HCl 420 and steam 434. To accomplish iron and sulfate removal, a portion of the leach slurry is subjected to a jarosite precipitation process 490. Jarosite precipitation is accomplished by adjusting the pH of the slurry, by, e.g., addition of a base 492, such as NaOH or $Ca(OH)_2$, or, in some circumstances, an acid in the presence of a monovalent cation a proceeds according to the reaction:

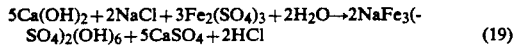

$$5Ca(OH)_2 + 2NaCl + 3Fe_2(SO_4)_3 + 2H_2O \rightarrow 2NaFe_3(SO_4)_2(OH)_6 + 5CaSO_4 + 2HCl \qquad (19)$$

Where it is desired to attain very low levels of iron and sulfate, or where Ag has a tendency to precipitate as argento-jarosite, the jarosite precipitation process 490 can be performed after the precious metals recovery step 428.

Leach slurry is conveyed to a solid/liquid separation device 422 with the addition of wash water 436. Solids are disposed of as tailings 424. The liquid is recycled to the leach 425 or sent to a pregnant liquor tank 426 whence it is sent to the precious metals recovery device 428 for recovery of the precious metals product 430. The precious metals-depleted fluid is conveyed to a holding tank 431. A portion of the precious metals-depleted fluid in the holding tank 431 is bled-off to a zinc/lead removal/recovery device 456. The remainder of the holding tank liquid 441 is conveyed to the recycle tank 432. The lead-and zinc-depleted liquid is then conveyed to the pyrohydrolysis device 444. In pyrohydrolysis device 444, the $MnCl_2$-containing fluid is pyrohydrolyzed to $Mn_2O_3$ 450 and HCl is condensed and conveyed to recycle tank 432. The $MnCl_2$- and HCl-containing fluid from the recycle tank 432 is conveyed back to the leaching zone 412 by recycle line 420.

Figure 4A:
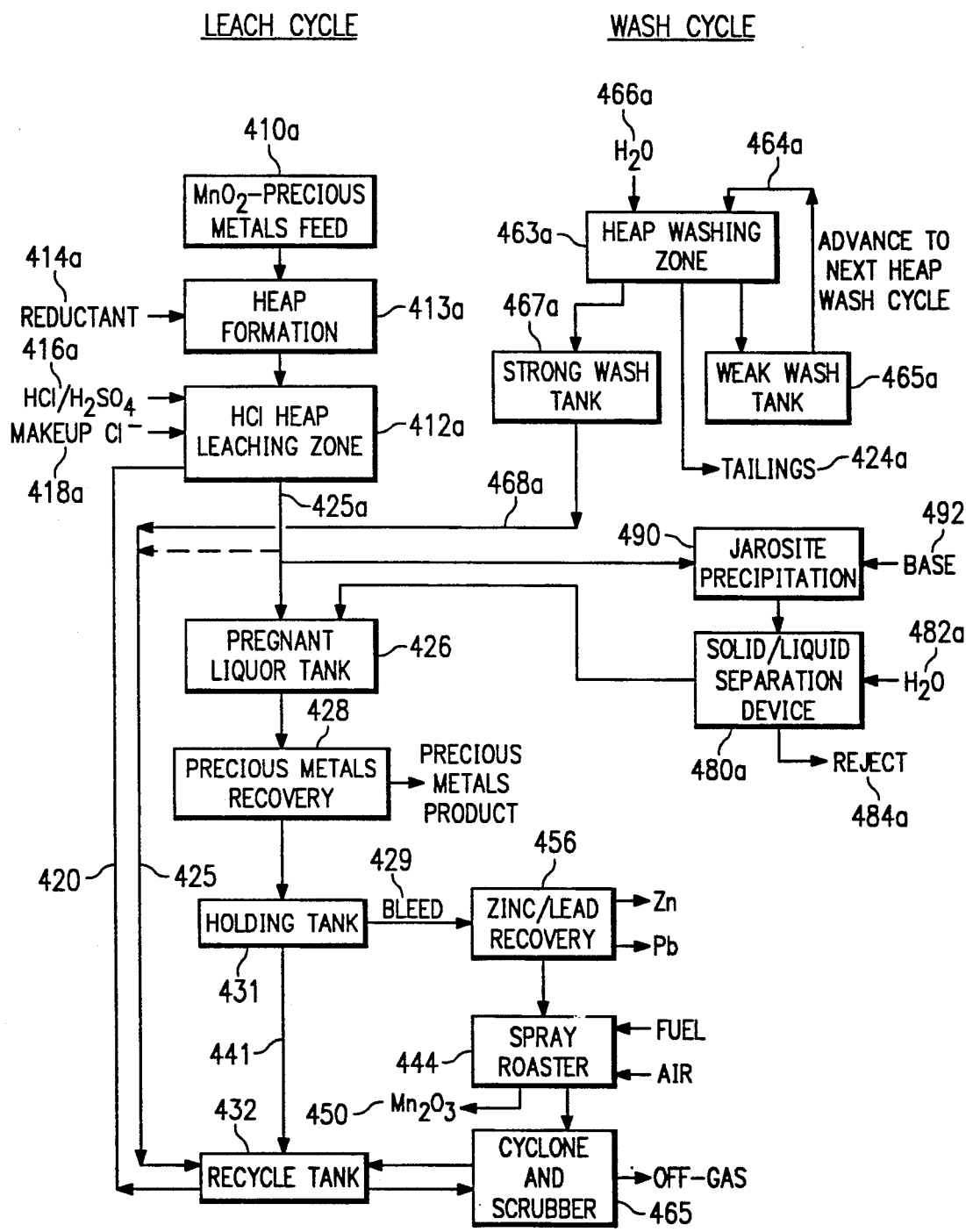
FIG. 4A is a schematic flow diagram of the process of FIG. 2A, including an iron removal step.

The embodiment depicted in FIG. 4A is similar to the embodiment depicted in FIG. 2A, except that a step is provided for precipitation of jarosite to remove iron and sulfates resulting from the leach reaction with pyrite and acid attack on iron oxides in the ore.

In this embodiment, a $MnO_2$- precious metals feed 410a is conveyed to a heap formation zone 413a where it is combined with a reductant 414a. HCl 416a and makeup $Cl^-$ source 418a are added at the heap leaching zone 412a.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 425a is essentially clear pregnant liquor, obviating solid liquid separation. The pregnant liquor 425a advances to the pregnant liquor tank 426. Subsequent treatment is the same as described for FIG. 4 above.

Following the leaching cycle, the heap is subjected to washing by percolation with water 466a, applying known practice, to recover entrained chloride and precious metals values. Although depicted as a separate washing zone 463a, it is contemplated that the heap is not moved from the leach location, but is merely subjected to in place washing with water. Washing with water 466a preferably containing an amount of $Cl^-$ ions sufficient to maintain precious metals in solutions, is countercurrent, advancing weak wash liquor 464a from the weak wash tank 465a to the next leached heap wash zone and recycling the strong wash liquor 468a from the strong wash tank 467a to the subsequent leach through recycle tank 432. Following washing to effect a predetermined recovery of the leach liquors residual from the leach zone 412a, the heap is regarded as tailings 424a to be left in place or transported to a tailings area. A final chemical treatment of the heap in place or in transit to disposal can be used as necessary to meet environmental requirements.

To accomplish iron and sulfate removal, a portion of the effluent liquor is subjected to a jarosite precipitation process 490. Jarosite precipitation is accomplished by adjusting the pH of the liquor, by, e.g., addition of a base 492, such as NaOH or $Ca(OH)_2$, or, in some circumstances, an acid in the presence of a monovalent cation and proceeds according to the reaction:

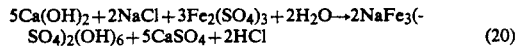

$$5Ca(OH)_2 + 2NaCl + 3Fe_2(SO_4)_3 + 2H_2O \rightarrow 2NaFe_3(SO_4)_2(OH)_6 + 5CaSO_4 + 2HCl \qquad (20)$$

Where it is desired to attain very low levels of iron and sulfate, or where Ag has a tendency to precipitate as argento-jarosite, the jarosite precipitation process 490 can be performed after the previous metals recovery step 428. The jarosite precipitate is separated in solid/liquid separation device 480a with additions of wash water 482a. Solids are disposed of as tailings 484a. The liquid is sent to the pregnant liquor tank 426. The fluid can then be treated as disclosed for FIG. 4 to recover precious metals.

Figure 5:
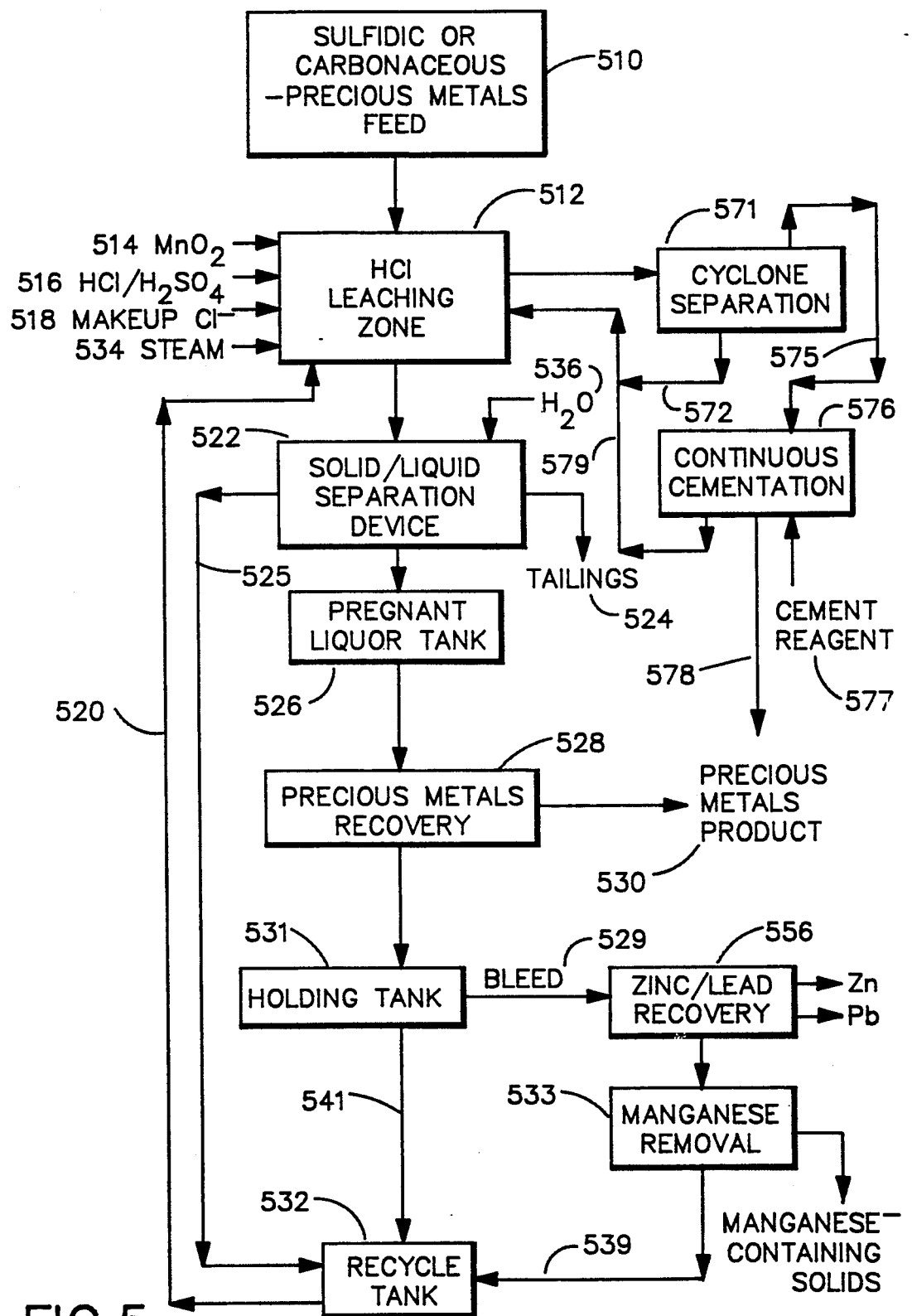
FIG. 5 is a schematic flow diagram of the process of the present invention applied to a sulfidic precious metals ore using an HCl agitation leach.

The embodiment depicted in FIG. 5 is directed to recovery of precious metals from an ore in which the precious metals are associated with sulfidic or carbonaceous, rather than $MnO_2$ refractory minerals. In this embodiment, the reduction/oxidation reaction of the process of the present invention requires the addition of $MnO_2$ 514 as an oxidant. Specifically, a sulfidic- or carbonaceous-silver or gold ore 510 is conveyed to leaching zone 512 with the addition of steam 534, HCl or $H_2SO_4$ 516, makeup $Cl^-$ source 518 and $MnO_2$ 514. As in the embodiment shown in FIG. 1, $H_2SO_4$ is preferred as the primary acid input to the HCl leach 512 when lime is used to precipitate manganese in the downstream manganese removal step 533. The amount of $MnO_2$ 514 which is added is an amount sufficient to substantially oxidize the sulfidic or carbonaceous mineral associated with precious metals in the feed 510. The Mn-to-sulfide molar ratio depends on the precious metals mineralization and association with other sulfides and can vary from less than about 0.25 to 1 to more than about 5 to 1 when intimate association with pyrite occurs.

An amount of leach slurry is bled off from the leaching zone and conveyed to a device to separate at least the bulk of the solids from the liquid phase, preferably a cyclone classifier and separation device 571. The underflow solids 573 are returned to the leach 512 and the overflow 575 is passed through a continuous cementation device 576 where a cementation reagent 577 is added for separation of precious metals by cementation.

By continuously removing precious metals from the leach liquor 512, the precious metals dissolution equilibrium equation where Me represents precious metals:

$$Me(solid) + 4Cl^- \rightarrow MeCl_4^{-3} \quad (21)$$

is driven towards the right side of equation 20 which allows for substantially complete dissolution of the precious metals, i.e., dissolution of more than about 85 weight percent of the precious metals in the feed 510, even though the chlorine concentration in the leach liquor is less than that otherwise required for complete equilibrium dissolution of metals value, being in an amount less than that required to produce a ratio of Cl⁻ molarity to precious metals solubility of 3M Cl⁻:25.4 oz. Ag/ton solution, and may be even so low as to produce a ratio less than 2M Cl⁻:7.6 oz. Ag/ton solution. Although continuous cementation has been described in connection with the embodiment of FIG. 5, the description of the continuous cementation process applies to the corresponding portions of FIGS. 7 and 9 as well. The continuous cementation precious metals cement 578 is recovered and the partially precious metals-depleted liquor 579 is reconveyed back to the leaching zone 512.

The remainder of the process depicted in FIG. 5 is similar to the process depicted in FIG. 1. Specifically, a stream of the leach slurry is bled off to solid/liquid separation device 522 where the solids are disposed of as tailings 524 and the liquid conveyed to pregnant liquor tank 526. The pregnant liquor is recycled to the leach 525 or conveyed to the precious metals recovery device 528 where precious metals product 520 is recovered. The precious metals-depleted fluid is conveyed to holding tank 531. A portion 529 of the fluid from the holding tank 531 is bled off to lead/zinc removal step 556 and thence conveyed to a manganese removal step 533. The manganese depleted fluid 539 and the fluid from the holding tank 531 which is not bled off 541 are sent to the recycle tank 532 for recycle to the leaching zone 512 by recycle line 520.

The most basic steps of the process are depicted in FIG. 5 in order to emphasize the differences in the process required by the characteristics of the sulfidic refractory ore 510 as opposed to the process required by an MnO₂ refractory ore, as depicted in FIG. 1, particularly the addition of MnO₂ oxidant rather than the addition of a reductant to the leaching zone 512. However, as will be clear to those skilled in the art, various aspects of the embodiments depicted in FIGS. 2-4 may also be employed in the process depicted in FIG. 5, namely, the pyrohydrolysis and zinc recovery step shown in FIG. 3, and the jarosite precipitation step shown in FIGS. 2-4. Additionally, although the continuous cementation step 576 is expected to be particularly useful in connection with sulfidic ores, there is no theoretical reason why it could not be advantageously used in processes for recovery of precious metals from MnO₂-precious metals ores such as those shown in FIGS. 1-4.

Figure 5A:
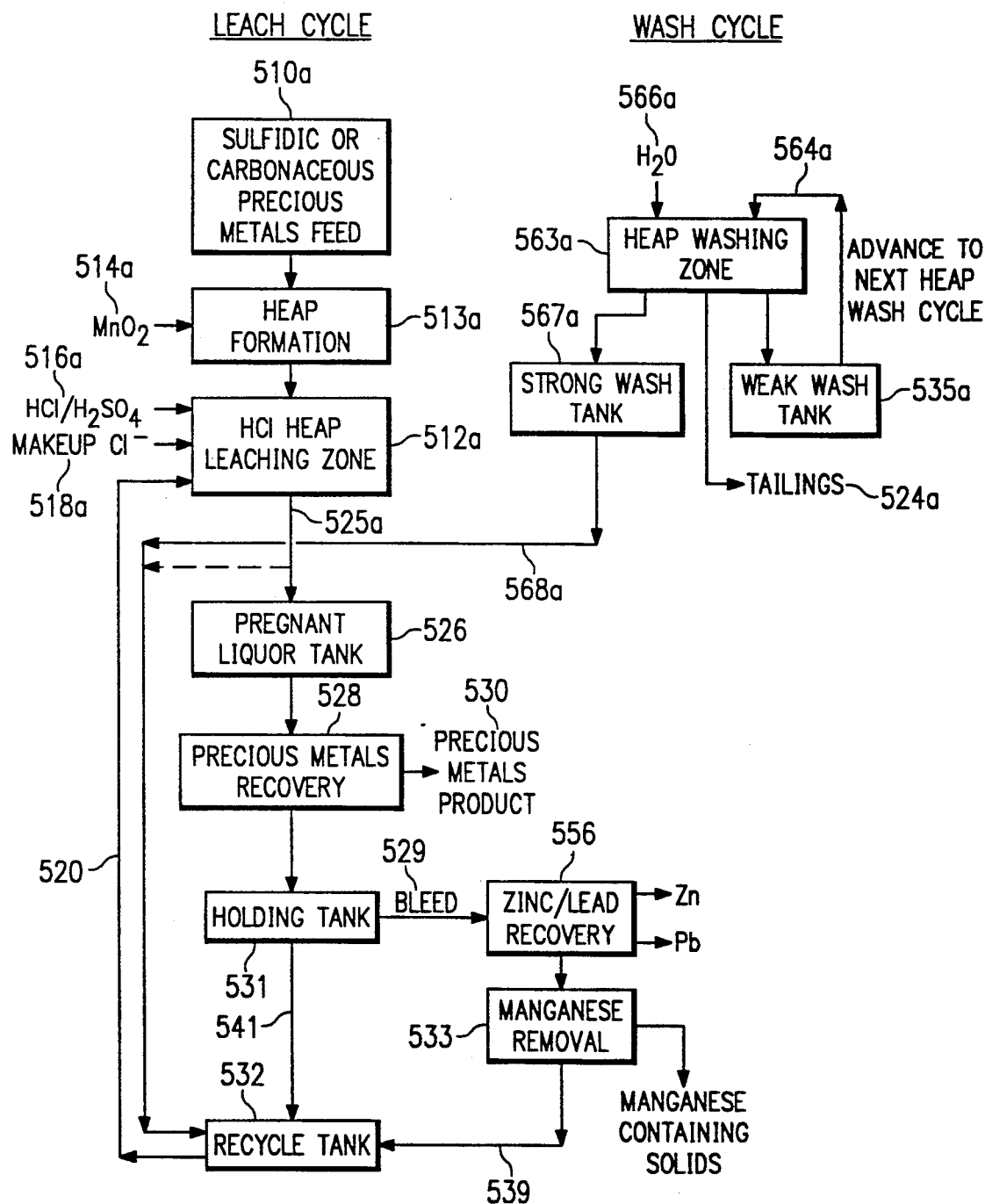
FIG. 5A is a schematic flow diagram of the process of the present invention applied to a manganese-precious metals are using an $H_2SO_4$ heap leach.

The embodiment depicted in FIG. 5A is directed to recovery of precious metals from an ore in which the precious metals are associated with sulfidic or carbonaceous, rather than MnO₂ refractory minerals. In this embodiment, the reduction/oxidation reaction of the process of the present invention requires the addition of MnO₂ 514a as an oxidant. The reductant ore and/or oxidant ore must be coarse enough to allow heap formation and percolation. Fine MnO₂ or sulfidic used with a coarse sulfidic or MnO₂ material may require agglomeration as is commonly practiced in heap leaching. Specifically, a sulfidic- or carbonaceous-silver or gold ore 510a is conveyed to a heap formation zone 513a where the reductant ore is blended with the oxidant MnO₂ 514a. HCl or H₂SO₄ 516a and makeup Cl⁻ source 518a are applied with the recycle liquor 520 to the heap leaching zone 512a. As in the embodiment shown in FIG. 1A, H₂SO₄ is preferred as the primary acid input to the HCl leach 512a when lime is used to precipitate manganese in the downstream manganese removal step 533. The amount of MnO₂ 514a which is added is an amount sufficient to substantially oxidize the sulfidic or carbonaceous mineral associated with precious metals in the feed 510a. The Mn-to-sulfide molar ratio depends on the precious metals mineralization and association with other sulfides and can vary from less than about 0.25 to 1 to more than about 5 to 1 when intimate association with pyrite occurs.

The remainder of the process depicted in FIG. 5A is similar to the process depicted in FIG. 1A. Heap leaching by percolation, following known practice, is continued until incremental recovery of precious metal values in the effluent has decreased to a minimum for sound economics. A reasonable cycle time in the leach zone is of the order of 30 to 60 days. The leach zone effluent 525a is essentially clear pregnant liquor, obviating solid liquid separation. The pregnant liquor advances to the pregnant liquor tank 526. Subsequent treatment is the same as described for FIG. 5 above.

Following the leaching cycle, the heap is subjected to washing by percolation with water 566a, applying known practice, to recover entrained chloride and precious metals values. Although depicted as a separate heap washing zone 563a, it is contemplated that the heap is not moved from the leach location, but is merely subjected to in place washing with water. Washing with water 566a preferably containing an amount of Cl⁻ ions sufficient to maintain precious metals in solutions, is countercurrent, advancing weak wash liquor 564a from the weak wash tank 565a to the next leached heap wash zone and recycling the strong wash liquor 568 from the strong wash tank 567a to the subsequent leach through recycle tank 562. Following washing to effect a predetermined recovery of the leach liquors residual from the leach zone 512a, the heap is regarded as tailings 524a to be left in place or transported to a tailings area. A final chemical treatment of the heap in place or in transit to disposal may or may not be necessary to meet environmental requirements. The liquid then conveyed to the pregnant liquor tank 526 can be treated as disclosed for FIG. 5 to recover previous metals.

Figure 6:
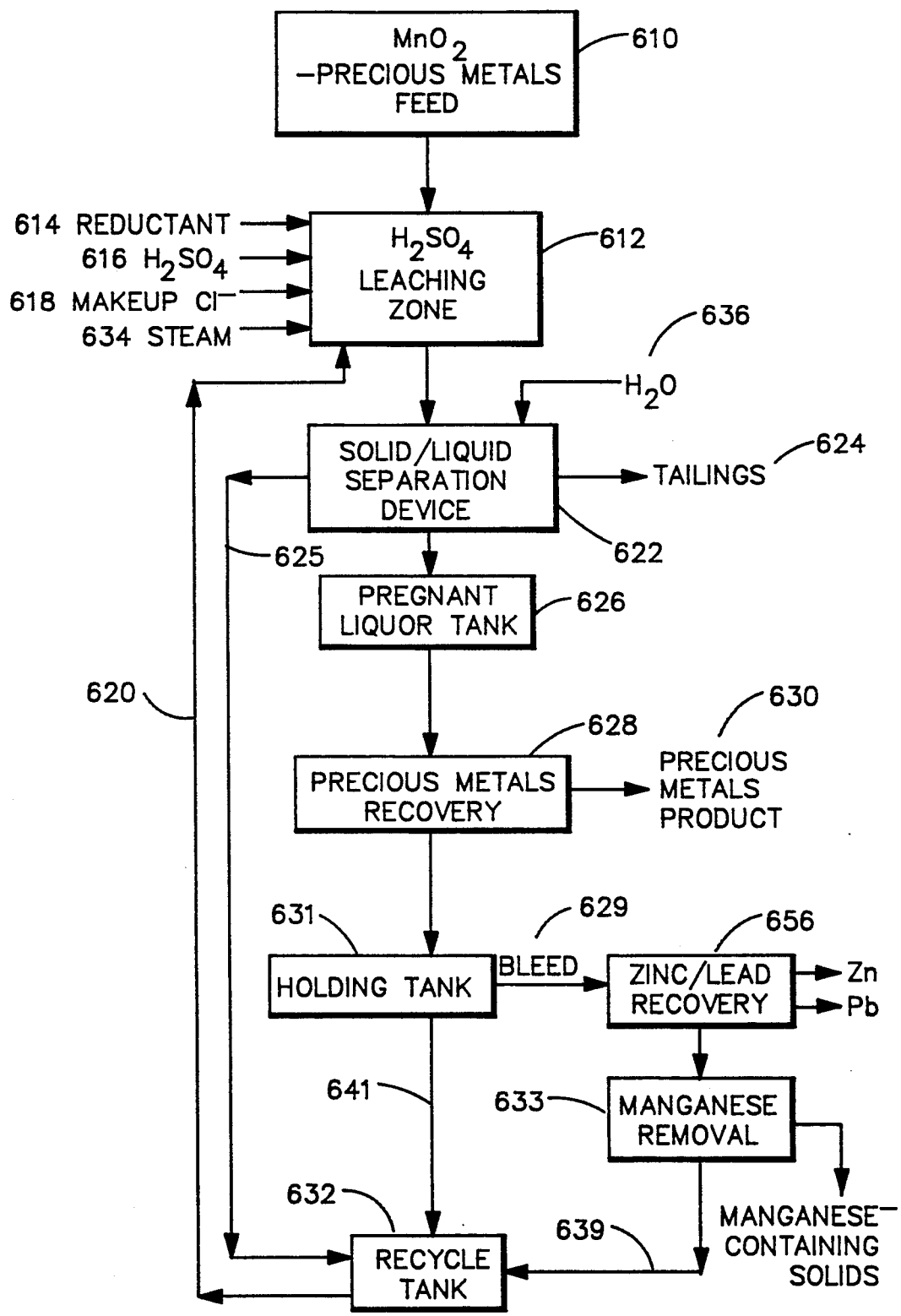
FIG. 6 is a schematic flow diagram of the process of the present invention applied to a manganese-precious metals ore using an $H_2SO_4$ agitation leach.

The embodiment depicted in FIG. 6 is similar to the embodiment depicted in FIG. 1, except that leaching zone 612 employs an H₂SO₄ leach, rather than an HCl leach. In particular, a MnO₂-precious metals feed 610 is conveyed to leaching zone 612 where steam 634, reductant 614, makeup Cl⁻ source 618 and H₂SO₄ 616 are added. H₂SO₄ 616 is added in an amount sufficient to produce a pH in the leaching zone of less than about 1. A stream of the leach slurry is continuously conveyed to a solid/liquid separation device 622. The tailings from the solid/liquid separation device 622 are disposed of as tailings 624. The liquid from the solid/liquid separation device 622 is recycled to the leach 625 or conveyed to pregnant liquor tank 626. This liquor comprises an amount of dissolved precious metals, and an amount of dissolved manganese sulfate. The fluid in the pregnant liquor tank 626 is conveyed to precious metals recovery device 628 where precious metals are recovered by, for example, cementation to provide a precious metals product 630. The precious metals-depleted fluid comprises manganese sulfate, which can represent a by-product of this process. The precious metals-depleted fluid from the pregnant liquor tank 626 is conveyed to holding tank 631. A portion of the fluid 629 from the holding tank 631 is bled off to a lead/zinc removal step 656, and thence to a manganese removal step 633 for recovery of manganese sulfate. The manganese-depleted fluid 639 and the fluid from the holding tank 631 which was not bled off 641 are conveyed to the recycle tank 632 for recycle to the leaching zone 612 by recycle line 620. The recycle line 620 is provided in order to conserve chloride values required to solubilize the precious metals in the leach 612. Chloride can be recycled to the leaching zone 612 by chloride carriers such as $CaCl_2$, $MnCl_2$ and/or NaCl.

Figure 6A:
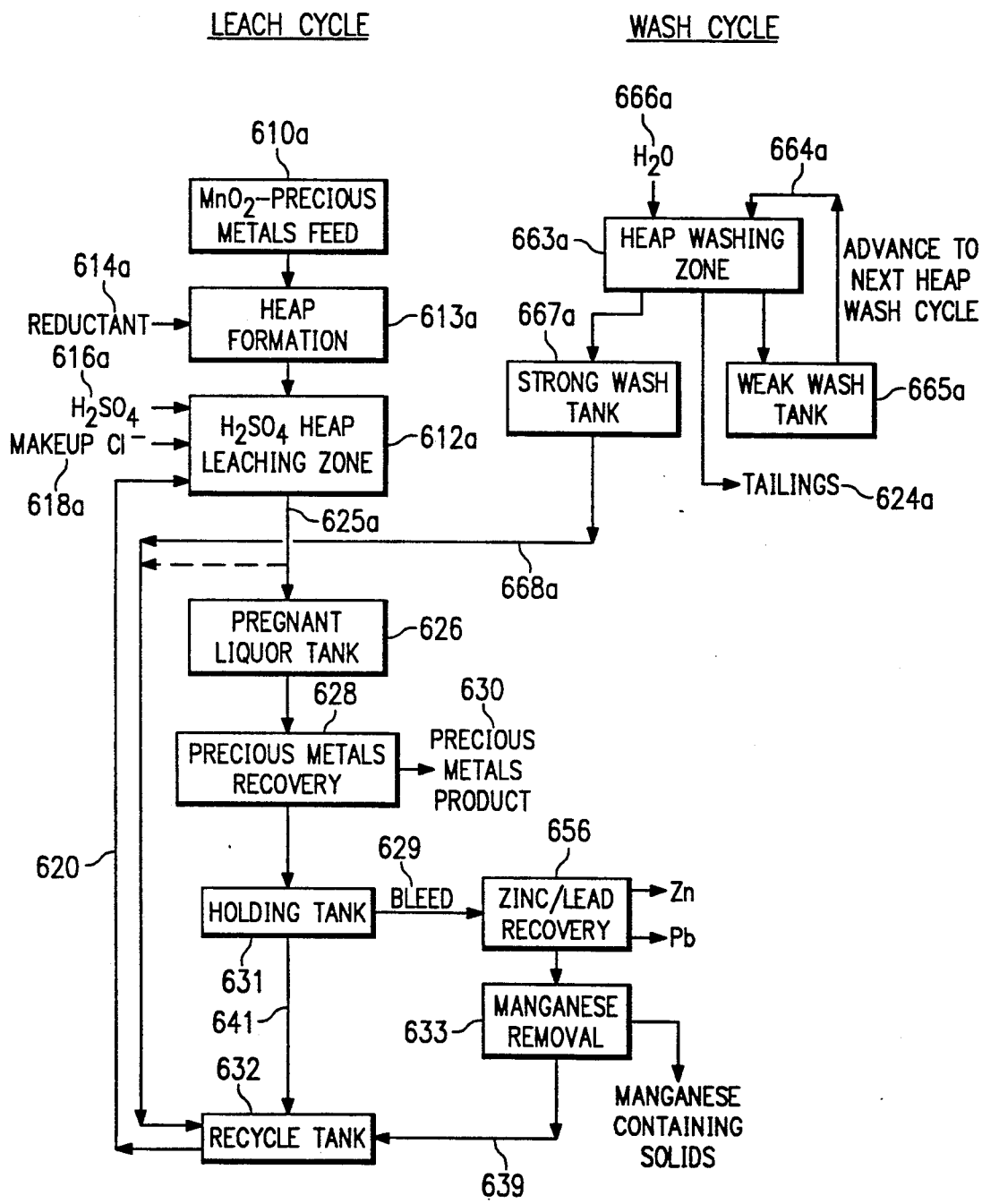
FIG. 6A is a schematic flow diagram of the process of the present ivention applied to a manganese-precious meatls ore using an $H_2SO_4$ heap leach.

The embodiment depicted in FIG. 6A is similar to the embodiment depicted in FIG. 1A, except that leaching zone 612A employs an $H_2SO_4$ leach, rather than an HCl leach. In particular, a $MnO_2$-precious metals feed 610a is conveyed to heap formation zone 613a where reductant 614a is added. $H_2SO_4$ 616a is added in an amount sufficient to produce a pH in the leaching zone of less than about 1 along with makeup $Cl^-$ at the heap leaching zone 612a. Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 625a is essentially clear pregnant liquor, obviating solid liquid separation. The pregnant liquor advances to the pregnant liquor tank 626. Subsequent treatment is the same as described for FIG. 6 above.

Following the leaching cycle, the heap is subjected to washing by percolation with water 666a, applying known practice, to recover entrained chloride and previous metals values. Although depicted as a separate heap washing zone 663a, it is contemplated that the heap is not moved from the leach location, but is merely subjected to in place washing with water. Washing with water 666a preferably containing an amount of $Cl^-$ ions sufficient to maintain precious metals in solutions, is countercurrent, advancing weak wash liquor 664 from the weak wash tank 665a to the next leached heap wash zone and recycling the strong wash liquor 668 from the strong wash tank 667a to the subsequent leach through recycle tank 632. Following washing to effect a predetermined recovery of the leach liquors residual from the leach zone 612a, the heap is regarded as tailings 624a to be left in place or transported to a tailings area. A final chemical treatment of the heap in place or in transit to disposal may or may not be necessary to meet environmental requirements. The liquid then conveyed to the pregnant liquor tank 626 can be treated as disclosed for FIG. 6 to recover previous metals.

Figure 7:
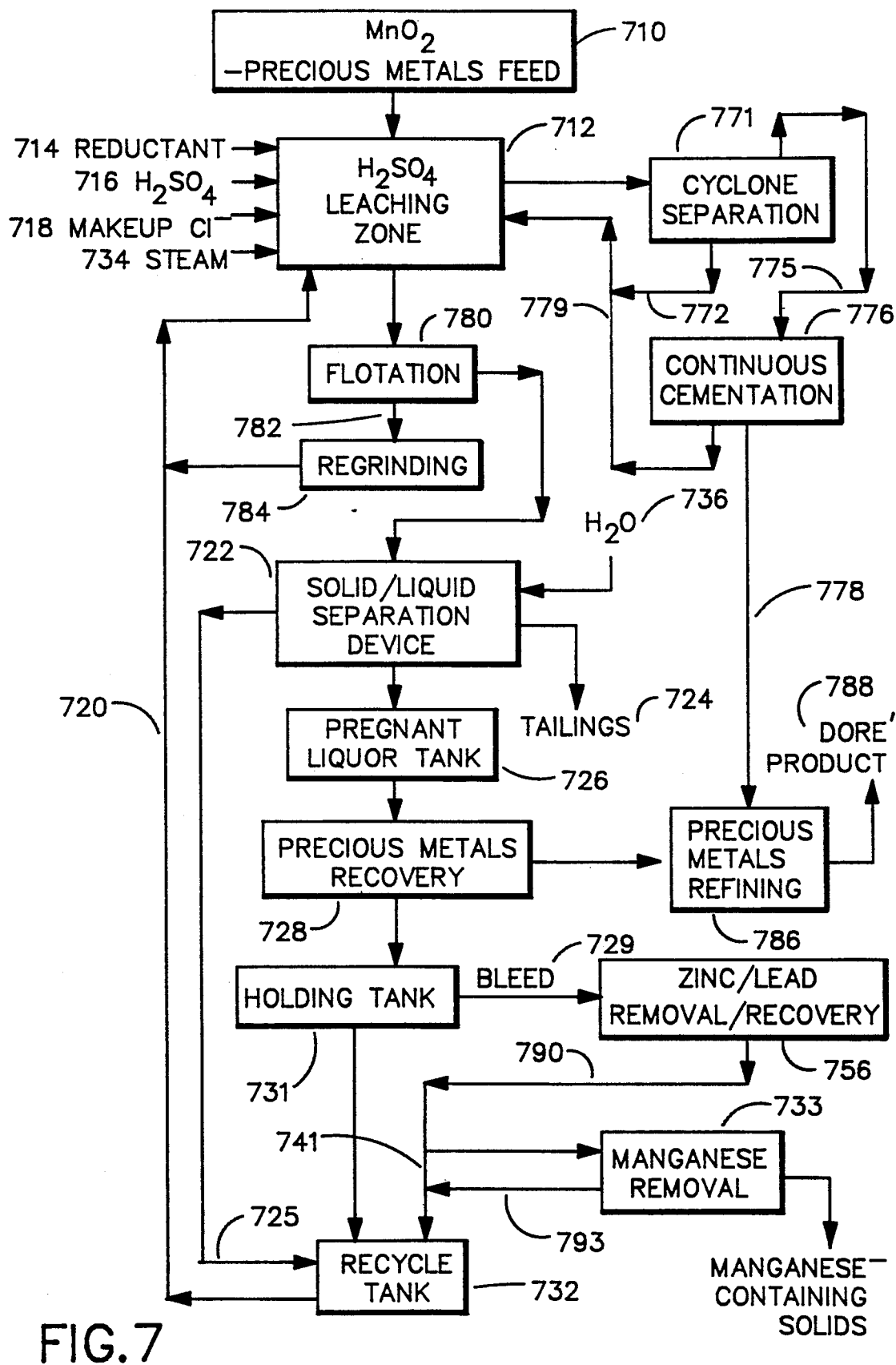
FIG. 7 is a schematic flow diagram of the process of FIG. 6 including continuous recycle cementation, reductant recovery by flotation, zinc recovery and precious metals product upgrading.

The embodiment depicted in FIG. 7 is similar to the embodiment depicted in FIG. 6 except that this contains the additional steps of continuous cementation from the leach, sulfide concentration by flotation and recycling, and precious metals refining.

In this embodiment, a $MnO_2$-precious metals feed 710 is conveyed to leaching zone 712, where it is combined with steam 734, a reductant 714, $H_2SO_4$ 716, makeup $Cl^-$ source 718 and a recycle stream 720. A first portion of the leach slurry is bled off and conveyed to a solid/liquid separation device, preferably a cyclone classifier and separation device 771. The underflow solids 773 are returned to the leach 712 and the overflow 775 is passed through a continuous recycle cementation device 776. In cementation device 776, precious metals are separated from the leach liquor by cementation to produce a precious metals cement 778. The precious metals-depleted leach liquor 779 is returned to the leaching zone 712.

When the reductant 714 comprises valuable minerals, such as when it is a sulfidic silver or gold ore, or when reductant 714 is not entirely oxidized in one pass through the leaching zone 712, the portion of the leach slurry which is continuously removed for downstream precious metals recovery is conveyed to a flotation device 780. In the flotation device 780, the slurry is subjected to a flotation operation producing a sulfide concentrate 782 and a dissolved precious metals and dissolved $MnSO_4$ and solids-containing "tailings" portion 781, which is conveyed to solid/liquor separation device 722. The concentrate 782 from the sulfide flotation device 780 can be directly conveyed to recycle line 720 to undergo further leaching in leaching zone 712 and to act as a reductant for the $MnO_2$ in the feed 710. When the sulfide concentrate 762 comprises an amount of precious metals, as when the sulfide reductant 714 is a precious metals-containing sulfide ore, the concentrate 782 may be reground in regrinding zone 784 to release precious metals for recycle by line 720 to the leaching zone 712 and dissolution therein.

Although the flotation step of this embodiment of the invention has been described with respect to sulfide flotation, a flotation process such as that described can be advantageously used whenever the stream removed from the leaching zone 712 contains a valuable material which is amenable to flotation recovery. for example, when the reductant 714 is sphalerite, the flotation step 780 can be used to recover zinc values.

Solids from the solid/liquid separation zone 722 are disposed of as tailings 724. The liquid from the solid/liquid separation device 722 is recycled to the leach 725 or conveyed, via pregnant liquor tank 726, to a precious metals recovery device 728, where precious metals are recovered by a cementation process to produce a precious metals product 730. The precious metals product 730 from the precious metals recovery device 728 is combined with the precious metals cement 778 from the continuous recycle concentration device 776 and sent to a refining device 786. The refining device 786 can be a fire refining device which produces a dore product 788.

A portion 729 of the precious metal-depleted liquid from the precious metals recovery device 728 is conveyed, via holding tank 731, to a zinc and lead recovery step 756.

Zinc- and lead-depleted fluid from the zinc/lead removal/recovery step 756 is conveyed by line 790 to recycle tank 732. A portion of the fluid from line 790 is bled off to manganese removal step 733. The remaining portion of the zinc-depleted fluid 741, i.e., that portion not bled off to manganese removal step 733. and manganese-depleted fluid 793 from the manganese removal 733 are conveyed by line 790 to recycle tank 732 for recycle by recycle line 720 to the leaching zone 712 in order to conserve sulfuric acid and chlorine values.

Figure 7A:
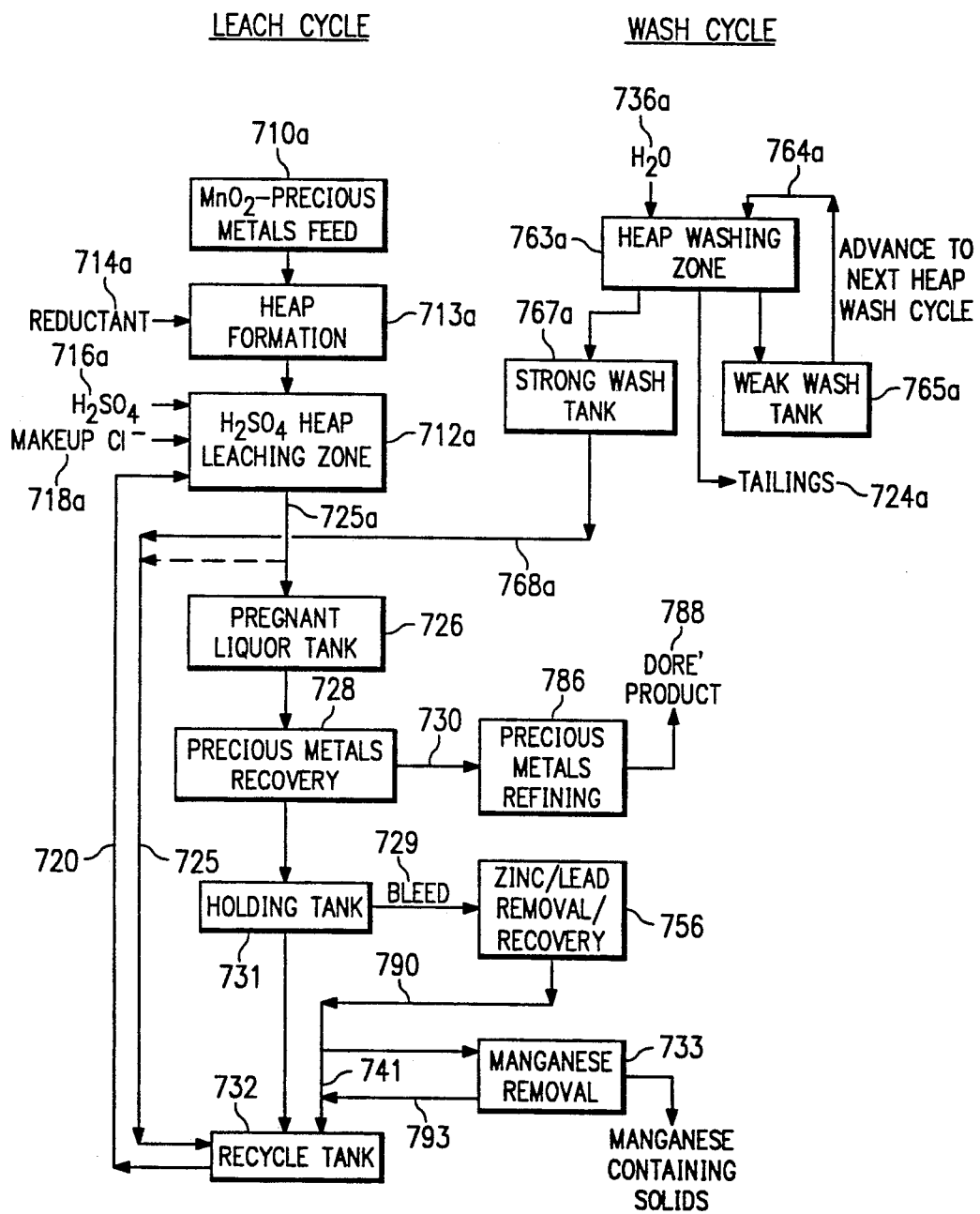
FIG. 7A is a schematic flow diagram of the process of FIG. 6A, but including the precious metals refining feature of FIG. 7 and excluding continuous cementation, flotation and regrinding.

The embodiment depicted in FIG. 7A is similar to the embodiment depicted in FIG. 6A except that it contains the additional steps of precious metals refining.

Reductant 714a is added to MnO2 precious metal feed 710a at the heap formation zone. H2SO4 and makeup Cl− are added at the heap leaching zone.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 725a is essentially clear pregnant liquor, obviating solid liquid separation. The pregnant liquor advances to the pregnant liquor tank 726.

Following the leaching cycle, the heap is subjected to washing by percolation with water 766a, applying known practice, to recover entrained chloride and previous metals values. Although depicted as a separate heap washing zone 763a, it is contemplated that the heap is not moved from the leach location, but is merely subjected to in place washing with water. Washing with water 766a preferably containing an amount of Cl− ions sufficient to maintain precious metals in solutions, is countercurrent, advancing weak wash liquor 764a from the weak wash tank 735a to the next leached heap wash zone and recycling the strong wash liquor 768a from the strong wash tank 767a to the subsequent leach through recycle tank 732. Following washing to effect a predetermined recovery of the leach liquors residual from the leach zone 712a, the heap is regarded as tailings 724a to be left in place or transported to a tailings area. A final chemical treatment of the heap in place or in transit to disposal may or may not be necessary to meet environmental requirements.

The effluent 725a from the heap leach zone 712 is recycled to the leach or conveyed, via pregnant liquor tank 726, to a precious metals recovery device 728, where precious metals are recovered by a cementation process to produce a precious metals product 730. The precious metals product 730 from the precious metals recovery device 728 is sent to a refining device 786. The refining device 786 can be a fire refining device which produces a dore product 788.

A portion 729 of the precious metal-depleted liquid from the precious metals recovery device 728 is conveyed, via holding tank 731, to a zinc and lead recovery step 756.

Zinc- and lead-depleted fluid from the zinc/lead removal/recovery step 756 is conveyed by line 790 to recycle tank 732. A portion of the fluid from line 790 is bled off to manganese removal step 733. The remaining portion of the zinc-depleted fluid 741, i.e., that portion not bled off to manganese removal step 733, and manganese-depleted fluid 793 from the manganese removal 733 are conveyed by line 790 to recycle tank 732 for recycle by recycle line 720 to the leaching zone 712a in order to conserve sulfuric acid and chlorine values.

Figure 8:
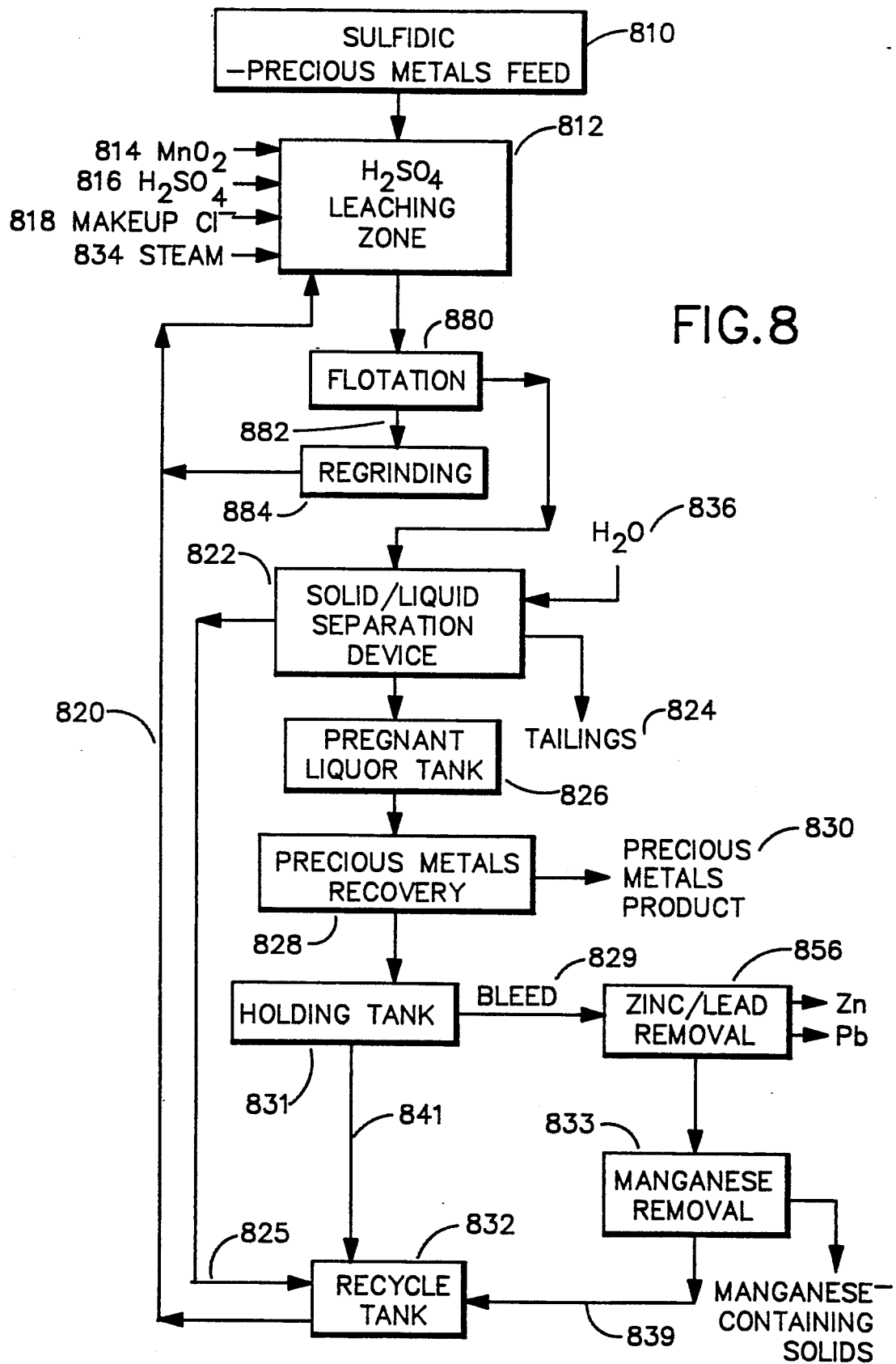
FIG. 8 is a schematic flow diagram of the process of the present invention applied to a sulfidic-precious metals ore using an $H_2SO_4$ agitation leach.

The process depicted in FIG. 8 is similar to the process depicted in FIG. 7, except that it is directed to recovery of precious metals from an ore in which the precious metals are associated with sulfidic refractory minerals rather than with MnO2. In this case, the reduction/oxidation acidic leach of the process of this invention requires the addition of MnO2 as an oxidant. This embodiment is particularly advantageous when the sulfidic or carbonaceous precious metals ore body 810 is located geographically close to an MnO2 ore body, so that transportation costs can be minimized.

According to the process of this embodiment, a refractory sulfidic precious metals-containing feed 810 is conveyed to leaching zone 812 where it is mixed with steam 834, MnO2 814, H2SO4 816, makeup Cl− source 818 and recycle fluid from recycle line 820. A stream of the leach slurry is preferably conveyed to a flotation step 880 for separation of a sulfide-rich fraction 882 which is optionally ground 884 to release further sulfide for recycle to the leaching zone 812 by recycle line 820. The flotation tailings and leach liquor, comprising dissolved precious metals, are conveyed to solid/liquid separation zone 822. Solids from solid/liquid separation zone 822 are disposed of as tailings 824. The liquid from solid/liquid separation zone 822 is recycled to the leach 825 or conveyed to pregnant liquor tank 826. The pregnant liquor is conveyed to the precious metals recovery device 828 where precious metals are recovered by cementation to produce precious metals product 830. The precious metals-depleted liquid from precious metals recovery device 828 comprise manganese sulfate and base metal sulfates such as zinc sulfate. Precious metals-depleted liquid is conveyed to a holding tank 831, whence it is sent to the recycle tank 832. A portion of fluid from the holding tank 831 is bed off to the lead/zinc recovery step 856 where base metals can be recovered as a process by-product. The remaining holding tank liquid 841 is conveyed to the recycle tank 832. The base metal-depleted fluid is further treated by manganese removal device 833. When MnSO4 is removed by reaction with Ca(OH)2, the reaction proceeds according to the equation:

$$MnSO_4 + Ca(OH)_2 \rightarrow Mn(OH)_2 + CaSO_4 \tag{22}$$

Base metal- and manganese-depleted fluid 839 is conveyed to recycle tank 832 for recycle to the leaching zone 812 by recycle line 820, so as to conserve chlorine values.

Figure 8A:
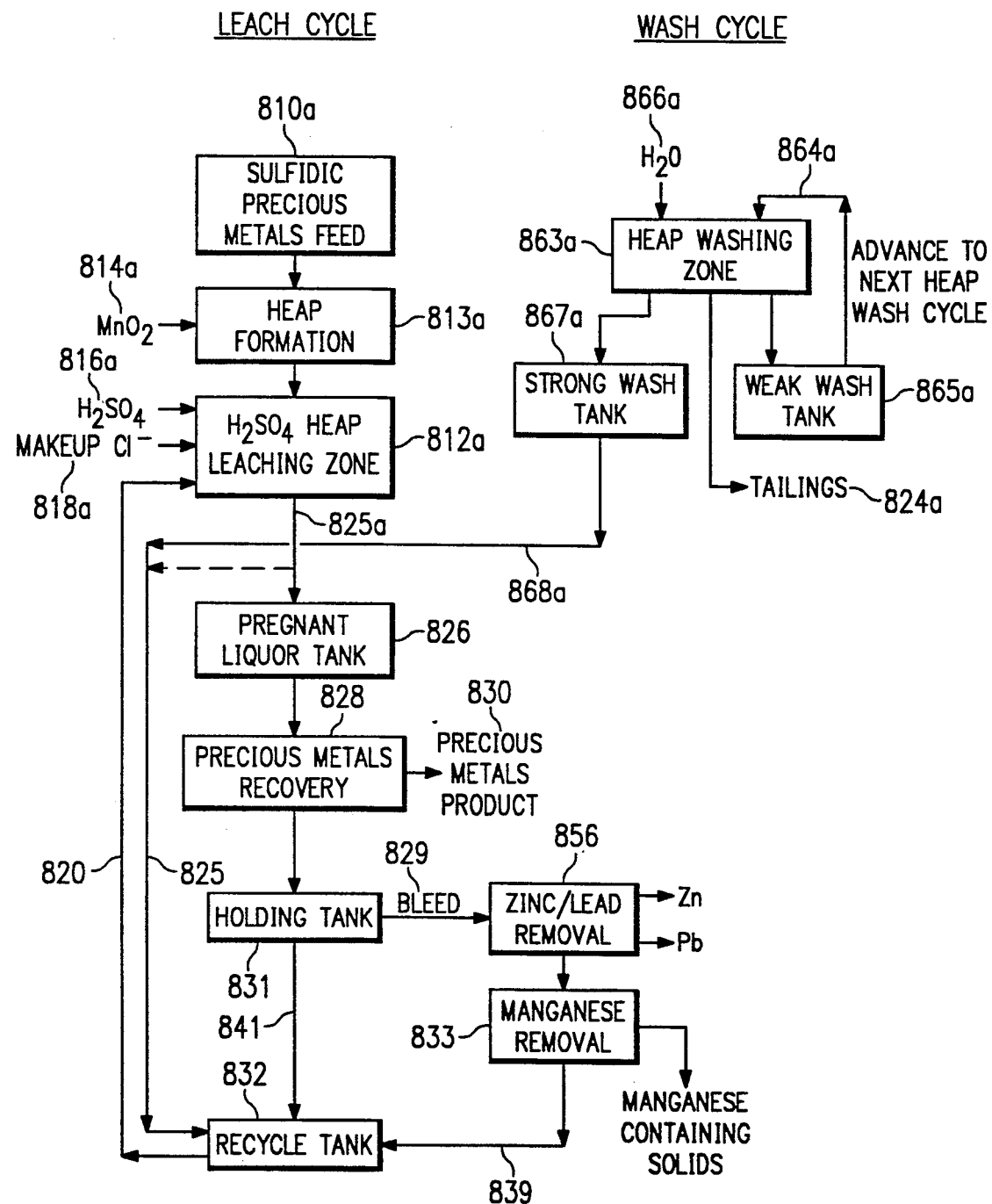
FIG. 8A is a schematic flow diagram of the process of the present invention applied to a sulfidic-precious metals ore using an $H_2SO_4$ heap leach, but excluding flotation and regrinding of FIG. 8.

The process depicted in FIG. 8A is similar to the process depicted in FIG. 6A, except that it is directed to recovery of precious metals from an ore in which the precious metals are associated with sulfidic refractory minerals rather than with MnO2. In this case, the reduction/oxidation acidic leach of the process of this invention requires the addition of MnO2 as an oxidant. This embodiment is particularly advantageous when the sulfidic or carbonaceous precious metals ore body 810a is located geographically close to an MnO2 ore body, so that transportation costs can be minimized.

According to the process of this embodiment, a refractory sulfidic precious metals-containing feed 810a is conveyed to a heap formation zone 813a where it is mixed with MnO2 814a Makeup Cl− source 818a, H2SO4 816a, and recycle fluid from recycle line 820 are added at heap leaching zone 812a.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 825a is essentially clear pregnant liquor, obviating solid liquid separation. The pregnant liquor advances to the pregnant liquor tank 826.

Following the leaching cycle, the heap is subjected to washing by percolation with water 866a, applying known practice, to recover entrained chloride and previous metals values. Although depicted as a separate heap washing zone 863a, it is contemplated that the heap is not moved from the leach location, but is merely subjected to in place washing with water. Washing with water 866a preferably containing an amount of Cl− ions sufficient to maintain precious metals in solutions, is countercurrent, advancing weak wash liquor 864a from the weak wash tank 833a to the next leached heap wash zone and recycling the strong wash liquor 868a from the strong wash tank 867a to the subsequent leach through recycle tank 832. Following washing to effect a predetermined recovery of the leach liquors residual from the leach zone 812a, the heap is regarded as tailings 824a to be left in place or transported to a tailings area. A final chemical treatment of the heap in place or in transit to disposal may or may not be necessary to meet environmental requirements.

Effluent liquid 825a from the heap leach zone is recycled to the leach 812a or conveyed to pregnant liquor tank 826. It is then treated as disclosed for FIG. 8 above to remove precious metals.

Figure 9:
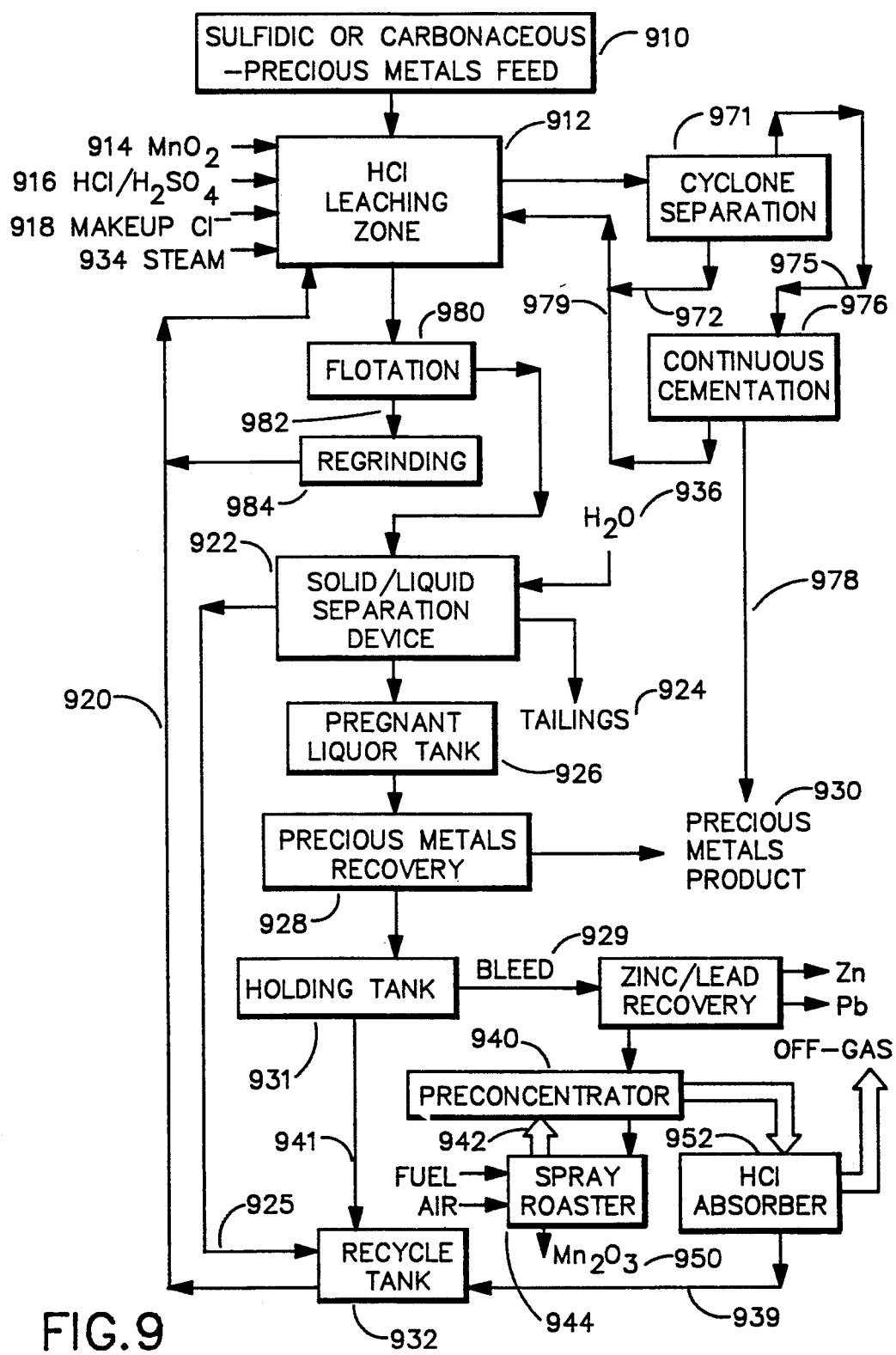
FIG. 9 is a schematic flow diagram of the process of FIG. 5, with additional steps for the regeneration of HCl by pyrohydrolysis.

The embodiment depicted in FIG. 9 involves the same leach and solid/liquid separation steps described above in regard to the embodiment of FIG. 5, but additionally contains steps for regeneration of HCl by pyrohydrolysis. In this embodiment, the reduction/oxidation reaction of the process requires the addition of $MnO_2$ 914 as an oxidant. Specifically, a sulfidic or carbonaceous precious metals ore 910 is conveyed to leaching zone 912 with the addition of steam 934, HCl 916, makeup chloride 918 and $MnO_2$ 914. The leaching step 912, continuous recycle cementation step 976, solid/liquid separation step 922, precious metals recovery step 928, flow of the precious metals-depleted fluid through the holding tank 931, recycle tank 932 and recycle line 920, are the same as that described above in connection with the embodiment depicted in FIG. 5. The flotation 980 and regrinding 984 steps are the same as those described above in connection with the embodiment depicted in FIG. 8. A portion of the precious metals-depleted fluid is bled off from the holding tank 931 and conveyed to a circuit 956 for recovery of zinc and lead. The remaining holding tank liquid 941 is conveyed to the recycle tank 932. The zinc- and lead-depleted fluid from the zinc recovery device 956 is conveyed to a treatment to regenerate and recycle HCl, which is performed according to the process described above with respect to the embodiment depicted in FIG. 2. The bleed stream is sent to a preconcentrator 940 in, e.g., a wet cyclone 940. The unvolatilized portion of the fluid from preconcentrator 940 is conveyed to a pyrohydrolysis device which is preferably a spray roaster 944. The gaseous product 942 from the spray roaster 944, comprising regenerated HCl is conveyed back to the preconcentrator 940. In the preconcentrator 940, the volatile portion of the fluid input from the spray roaster device 944, is separated and conveyed to an HCl absorber device 952. Off-gas from the HCl absorber is vented to the atmosphere.

The HCl scrub liquor 939 from the HCl absorber 952 is conveyed to the recycle tank 932. Recycle of fluid back to the leaching zone 912 is conducted in a manner already described in connection with other embodiments of this invention.

Figure 9A:
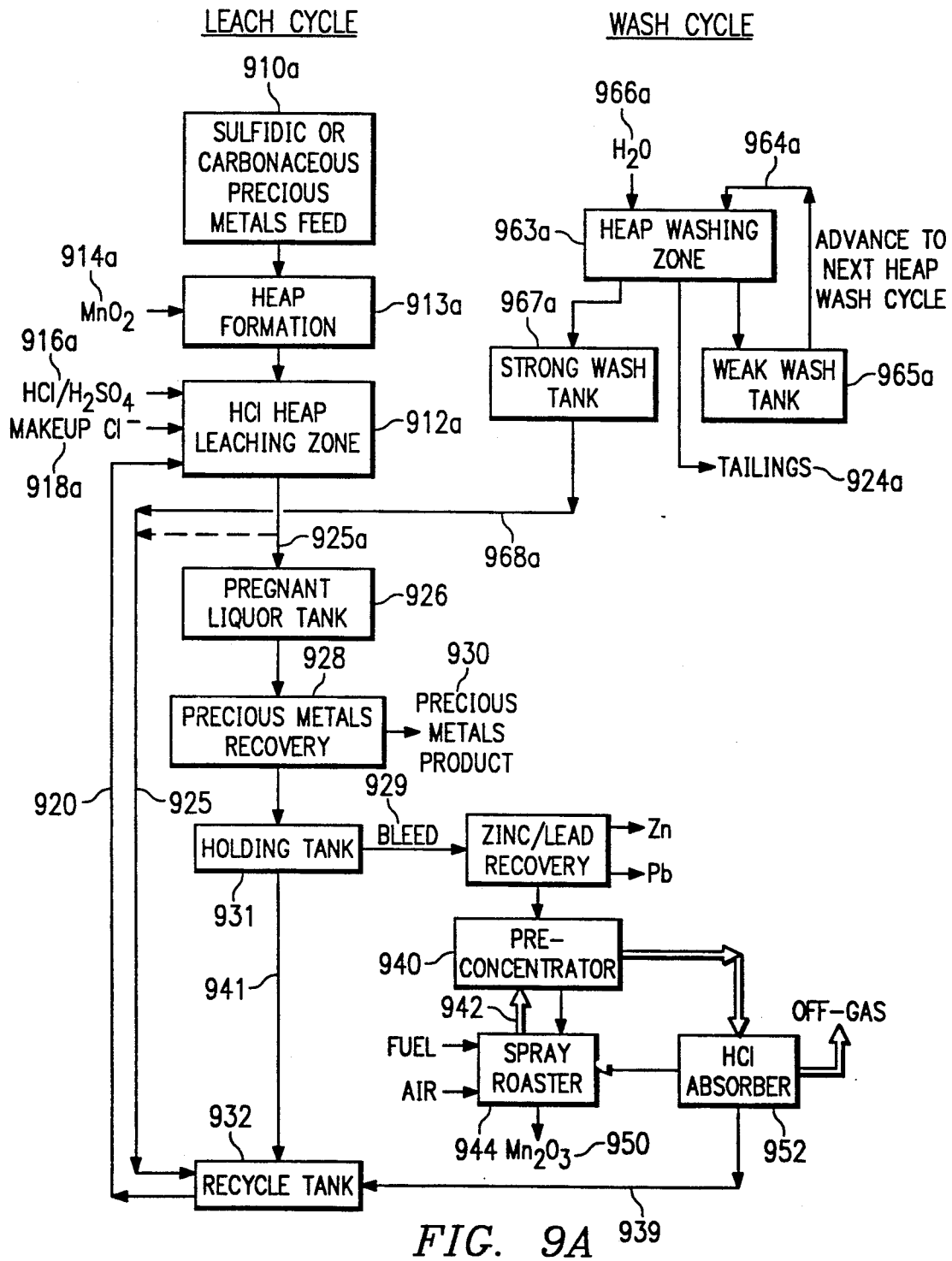
FIG. 9A is a schematic flow diagram of the process shown in FIG. 5A, with additional steps for the regeneration of HCl by pyrohydrolosis.

The embodiment depicted in FIG. 9A involves the same leach steps described above in regard to the embodiment of FIG. 5A, but additionally contains steps for regeneration of HCl by pyrohydrolysis. In this embodiment, the reduction/oxidation reaction of the process requires the addition of $MnO_2$ 914 as an oxidant. The reductant ore and/or oxidant ore must be coarse enough to allow heap formations and percolation. Fine $MnO_2$ or sulfridic used with a coarse sulfridic or $MnO_2$ material may require agglomeration as is commonly practices in heap leaching. Specifically, a sulfidic or carbonaceous precious metals ore 910a is conveyed to a heap formation zone 913a where the reductant ore is blended with the oxidant $MnO_2$ 914a. HCl 916a and makeup chloride 918a are applied with the recycle liquor 920 to the heap leaching zone 912a.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 925a is essentially clear pregnant liquor, obviating solid liquid separation. The pregnant liquor advances to the pregnant liquor tank 926.

Following the leaching cycle, the heap is subjected to washing by percolation with water 966a, applying known practice, to recover entrained chloride and previous metals values. Although depicted as a separate heap washing zone 963a, it is contemplated that the heap is not moved from the leach location, but is merely subjected to in place washing with water. Washing with water 966a preferably containing an amount of $Cl^-$ ions sufficient to maintain precious metals in solutions, is countercurrent, advancing weak wash liquor 964a from the weak wash tank 963a to the next leached heap wash zone and recycling the strong wash liquor 968a from the strong wash tank 967a to the subsequent leach through recycle tank 932. Following washing to effect a predetermined recovery of the leach liquors residual from the lead zone 912a, the heap is regarded as tailings 924a to be left in place or transported to a tailings area. A final chemical treatment of the heap in place or in transit to disposal may or may not be necessary to meet environmental requirements. The liquid then conveyed to the pregnant liquor tank 926 can be treated as disclosed for FIG. 9 to recover precious metals.

Figure 10:
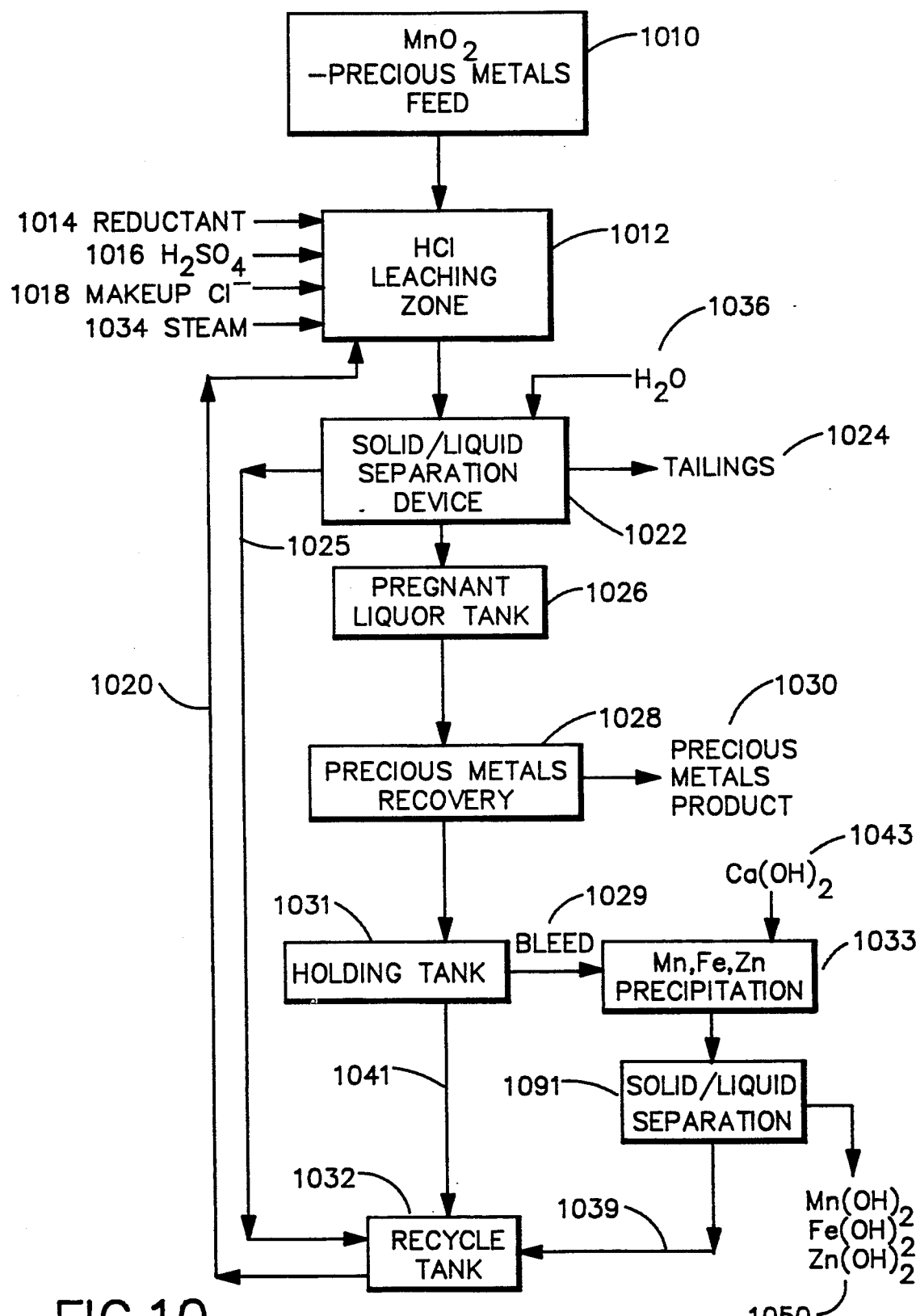
FIG. 10 is a schematic flow diagram of the process of FIG. 1 with in-situ leach generation of HCl from $H_2SO_4$ and $CaCl_2$.

The embodiment depicted in FIG. 10 is similar to the embodiment depicted in FIG. 1, except that manganese, along with iron and zinc, is lime-precipitated and the primary acid added to the HCl leach is $H_2SO_4$.

In this embodiment, an $MnO_2$-precious metals feed 101 is conveyed to an HCl leaching zone 1012 where it is combined with steam 1034, a reductant 1014, a makeup chloride source such as HCl, NaCl, $CaCl_2$ or $MnCl_2$ 1018, $H_2SO_4$ 1016 and a recycle stream 720. HCl is generated in situ in the leach by reaction of $H_2SO_4$ with $CaCl_2$. The $CaCl_2$ can be introduced via recycle line 1020 or as a carrier for makeup chloride 1018. A stream of the slurry is continuously conveyed to a solid/liquid separation device 1022. The solids, after washing with water 1036 to remove precious metals, are disposed of as tailings 1024 which will include an amount of $CaSO_4$. The precious metals-containing fluid is recycled to the leach 1025 or is conveyed to a pregnant liquor tank 1026 and then to a precious metals separation device 1028 for recovery of precious metals product 1030 by means such as cementation. The precious metals-depleted fluid is conveyed to a holding tank 1031 and a portion is bled off 1029 to a Mn, Fe, Zn precipitation device 1033 where $Ca(OH)_2$ 1093 is added. The manganese chloride present in the fluid is precipitated as $Mn(OH)_2$ according to the reaction:

$$MnCl_2 + Ca(OH)_2 \rightarrow Mn(OH)_2 + CaCl_2 \qquad (23)$$

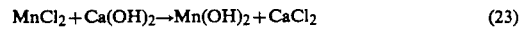

$Mn(OH)_2$, $Fe(OH)_2$ and $Zn(OH)_2$ 1050 are removed by a solid/liquid separation device 1091 and the liquid comprising an amount of CaCl$_2$ 1039 is conveyed to the holding tank 1031. A recycle stream 1020 conveys liquid containing CaCl$_2$ and, possibly, MnCl$_2$ and NaCl back to the HCl leach 1012.

Figure 10A:
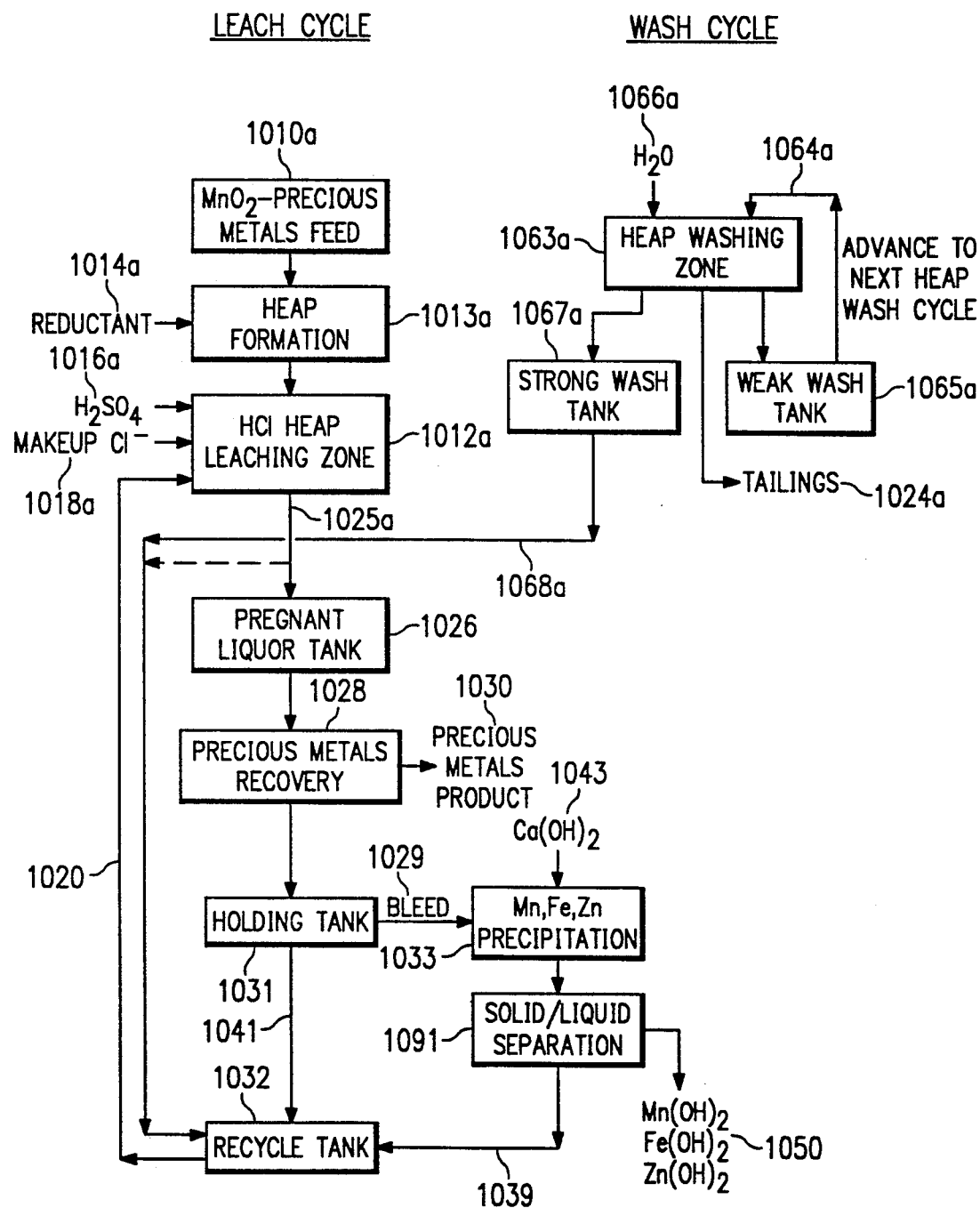
FIG. 10A is a schematic flow diagram of the process of FIG. 1A, with in-situ leach generation of HCl from $H_2SO_4$ and $CaCl_2$.

The embodiment depicted in FIG. 10A is similar to the embodiment depicted in FIG. 1A, except that manganese, along with iron and zinc, is lime-precipitated and the primary acid added to the HCl leach is H$_2$SO$_4$.

In this embodiment, an MnO$_2$-precious metals feed 1010a is conveyed to a heap formation zone 1013a where a reductant 1014a is blended with the MnO$_2$-precious metals feed. A makeup chloride source such as HCl, NaCl, CaCl$_2$ or MnCl$_2$ 1018a, H$_2$SO$_4$ 1016a and a recycle liquor 1020 are added to the heap leaching zone 1012a. HCl is generated in situ in the leach by reaction of H$_2$SO$_4$ with CaCl$_2$. The CaCl$_2$ can be introduced via recycle line 1020 or as a carrier for makeup chloride 1018a.

Heap leaching by percolation, following known practice, is continued until incremental recovery of precious metal values in the effluent has decreased to a minimum for sound economics. A reasonable cycle time in the leach zone is at the order of 30 to 60 days. The leach zone effluent 1025a is essentially clear pregnant liquor, obviating solid liquid separation. The pregnant liquor advances to the pregnant liquor tank 1026. Subsequent treatment is the same as described for FIG. 10 above.

Following the leaching cycle, the heap is subjected to washing by percolation with water 1066a, applying known practice, to recover entrained chloride and precious metals values. Although depicted as a separate heap washing zone 1063a, it is contemplated that the heap is not moved from the leach location, but is merely subjected to in place washing with water. Washing with water 1066a preferably containing an amount of Cl$^-$ ions sufficient to maintain precious metals in solutions, is countercurrent, advancing weak wash liquor 1064a from the weak wash tank 1063a to the next leached heap wash zone and recycling the strong wash liquor 1068a from the strong wash tank 1067a to the subsequent leach through recycle tank 1032. Following washing to effect a predetermined recovery of the leach liquors residual from the lead zone 1012a, the heap is regarded as tailings 1024a to be left in place or transported to a tailings area. A final chemical treatment of the heap in place or in transit to disposal may or may not be necessary to meet environmental requirements. The liquid then conveyed to the pregnant liquor tank 1026 can be treated as disclosed for FIG. 10 to recover precious metals.

EXPERIMENTAL

The following examples are provided by way of illustration and not by way of limitation. Example 1 is a test of a MnCl$_2$ leach of a manganese-silver ore without added reductant. This example represents an ore treatment process which is not conducted according to the process of the present invention and is provided for purposes of comparison with the examples which represent the process of the present invention.

Examples 2, 3, 7, 9, 11 and 12 represent the process of the present invention comprising an HCl leach of refractory precious metals ore. Examples 4, 6, 8 and 10 represent the process of the present invention including an H$_2$SO$_4$ leach of refractory precious metals ore.

EXAMPLE 1

A refractory manganese-silver ore having the composition indicated in Table 1A was subjected to a MnCl$_2$/HCl leach. 100 g of the ore was pulverized and slurried in 1000 ml of aqueous solution containing 266 g MnCl$_2$ and 50 g HCl. The leach was heated and stirred for 6 hours at a temperature and pH indicated in Table 1B. 900 ml H$_2$O was added during the leach. Analysis of the leach tailings and solution is indicated in Table 1A. In the absence of added reductant, manganese dissolution was only 14.3 percent and silver recovery only 33.5 percent.

TABLE 1A

| | | Assay | | | | | | | | |
| | | Mn | Zn | Pb | Ag | Au | | Distribution (%) | | | |
| | Wt % | (Wt %) | | | (oz/ton) | | Mn | Zn | Pb | Ag | Au |
| --- | --- | --- | --- | --- | --- | --- | --- | --- | --- | --- | --- |
| Feed #1 | 100.0 | 10.45 | 1.59 | 1.40 | 9.44 | Tr | 100.0 | 100.0 | 100.0 | 100.0 | 100 |
| Leach Tailing | 87.0 | 10.30 | 0.80 | 1.40 | 7.22 | Tr | 85.7 | 44.0 | 87.1 | 66.5 | 100 |
| Solution (Calc) | | | | | | | 14.3 | 56.0 | 12.9 | 33.5 | 0 |

TABLE 1B

| Elapsed Time (min.) | pH | Temp. °C. |
| --- | --- | --- |
| 0 | 0 | 19 |
| 30 | 0 | 60 |
| 45 | 0 | 85 |
| 60 | 0 | 89 |
| 90 | 0 | 91 |
| 120 | 0 | 91 |
| 180 | 0 | 91 |
| 240 | 0 | 91 |
| 360 | 0 | 91 |

EXAMPLE 2

The leaches of Example 2 were similar to that of Example 1, except that pyritic tailings were added to the feed as a reductant in an amount indicated in Tables 2A and 2B. In one leach, 100 g. of Feed No. 1 was combined with 43.0 g of pyritic tailings to produce 143 g. of leach feed. The leach feed was slurried in 1,000 ml of aqueous solution containing 184 g MnCl$_2$, and 100 g. NaCl. 80 ml of concentrated HCl was added incrementally to maintain a pH of 0.5 or lower. The leach was conducted for 6 hours at a temperature a pH indicated in Table 2C. Total chloride molarity was 5.4. The leach tailings and solution were analyzed with the results shown in Table 2A. Manganese dissolution was 99.3 percent and silver recovery was 83.2 percent. Zinc, lead, gold and silver were also recovered from the pyritic tailings, as well as from Feed No. 1. This example indicates that MnCl$_2$ is an effective chloride source for complexing precious metals and that pyritic tailings are effective as a reductant in performing a reduction/oxidation leach of a refractory manganese-silver ore.

Another leach was conducted similar to the leach described above, but with a larger amount of MnCl$_2$ and in the absence of NaCl. 100 g. of Feed No. 1 was combined with 40 g of pyritic tailings having the composition indicated in Table 2B to produce 140 g. of leach feed. The leach feed was slurried in 1000 ml of aqueous solution containing 252 g (2M) $MnCl_2$ and 20 ml HCl. The leach was conducted for 6 hours at a temperature and pH indicated in Table 2D. 40 ml HCl and 500 ml $H_2O$ was added during the leach to maintain pH. The results shown in Table 2B indicate that $MnCl_2$ is operative to maintain the necessary chloride levels, in the absence of NaCl.

the temperature and pH indicated in Table 3B. Total chloride molarity was 4.7. The test results indicated in Table 3A show that NaCl is an effective chloride source.

TABLE 3A

| | Wt (g) | Assay Au (oz/ton) | Assay Ag (Wt %) | Distribution (%) Au | Distribution (%) Ag |
|---|---|---|---|---|---|
| Feed #1 | 100.0 | Tr | 9.44 | | |
| Pyritic Tailings | 43.0 | 0.04 | 2.60 | | |
| Leach Feed | 143.0 | 0.02 | 7.38 | 100.00 | 100.00 |
| Leach Tailings | 100.9 | Tr | 1.64 | 22.52 | 15.67 |
| Solution (by difference) | | | | 77.48 | 84.33 |

TABLE 2A

| | Wt % (g) | Assay Mn (Wt %) | Assay Zn (Wt %) | Assay Pb (Wt %) | Assay Ag (oz/ton) | Assay Au (oz/ton) | Fe | Distribution (%) Mn | Zn | Pb | Ag | Au | Fe |
|---|---|---|---|---|---|---|---|---|---|---|---|---|---|
| Feed #1 | 69.9 | 10.45 | 1.59 | 1.40 | 9.44 | Tr* | 3.1 | 93.1 | 65.7 | 76.5 | 89.4 | 23 | 19.2 |
| Pyritic Tailings | 30.1 | 1.74 | 1.94 | 1.00 | 2.60 | .04 | 30.5 | 6.9 | 34.3 | 23.5 | 10.6 | 77 | 80.7 |
| Leach Feed | 100.0 | 7.83 | 1.69 | 1.28 | 7.38 | .02 | 11.4 | 100.0 | 100.0 | 100.0 | 100.0 | 100 | 100.0 |
| Leach Tailing (68.0) | 70.7 | 0.07 | 0.17 | 0.08 | 1.76 | Tr | (10.9) | 0.7 | 7.0 | 4.4 | 16.8 | 23 | |
| Solution (Calc) | | 11.2 g/l | 2.4 g/l | 1.7 g/l | 30.1 mg/l | 1.08 mg/l | — | 99.3 | 93.0 | 95.6 | 83.2 | 77 | — |
| Solution (Assay) | | 61.0** g/l | 2.4 g/l | | 37 mg/l | | 5.2 | | | | | 32.0 | |

*Trace considered 0.005 oz/ton
**Includes simulated recycle $MnCl_2$

TABLE 2B

| | Wt % (g) | Assay Mn (Wt %) | Assay Zn (Wt %) | Assay Pb (Wt %) | Assay Ag (oz/ton) | Assay Au (oz/ton) | Distribution (%) Mn | Zn | Pb | Ag | Au |
|---|---|---|---|---|---|---|---|---|---|---|---|
| Feed #1 | 100.0 | 10.45 | 1.59 | 1.40 | 9.44 | Tr | | | | | |
| Pyritic Tailings | 40.0 | — | 0.18 | 0.09 | 1.44 | Tr | | | | | |
| Leach Feed | 140.0 | 7.46 | 1.19 | 1.03 | 7.15 | Tr | 100.00 | 100.00 | 100.00 | 100.00 | 100 |
| Leach Tailings | 112.6 | 0.60 | 0.18 | 0.12 | 1.50 | 0.02 | 6.51 | 12.05 | 9.72 | 16.86 | |
| Solution (by difference) | | | | | | | 93.49 | 87.95 | 90.28 | 83.14 | |

TABLE 2C

| Elapsed Time (min.) | pH | Temp. °C. |
|---|---|---|
| 0 | 0 | 17 |
| 30 | 0.5 | 71 |
| 45 | 2.5 | 92 |
| 60 | 0 | 92 |
| 90 | 0.5 | 91 |
| 120 | 0.5 | 91 |
| 180 | 0 | 91 |
| 240 | 0 | 91 |
| 360 | 0 | 91 |

TABLE 2D

| Elapsed Time (min.) | pH | Temp. °C. |
|---|---|---|
| 0 | 0 | 22 |
| 30 | 0 | 78 |
| 45 | 0 | 85 |
| 60 | 0 | 85 |
| 90 | 1.5 | 85 |
| 120 | 0 | 85 |
| 180 | 0 | 85 |
| 240 | 1.5 | 85 |
| 300 | 0 | 85 |
| 360 | 0 | 85 |

TABLE 3B

| Elapsed Time (min.) | pH | Temp. °C. |
|---|---|---|
| 0 | 0 | 9 |
| 30 | 0 | 78 |
| 45 | 1.5 | 91 |
| 60 | 0 | 91 |
| 90 | 0.5 | 91 |
| 120 | 0.5 | 91 |
| 180 | 0.5 | 91 |
| 240 | 0.5 | 91 |
| 360 | 0.5 | 91 |

EXAMPLE 3

100 g of Feed No. 1 was pulverized and combined with 43 g of pyritic tailings as a reductant. The leach feed was slurried in 1,000 ml of aqueous solution containing 175.5 g NaCl and 60 ml HCl, added incrementally. The slurry was heated and stirred for 6 hours at

EXAMPLE 4

A series of tests was run with Feed No. 2 to determine the level of chloride required to effect high recovery of the silver and gold values. In each of 3 tests, 140 g. of manganese/silver feed No. 2 having the composition indicated in Table 4A was combined with 60 g of pyritic tailings having the composition indicated in Table 4A and slurried with 1000 ml of water containing 20 ml $H_2SO_4$ and an amount of NaCl. The amount of NaCl added in the respective tests was: 50 g in Test 4A-1, 100 g in Test 4A-2 and 175.5 g in Test 4A-3. The leach in each test was conducted for 6 hours at the temperature and pH indicated in Table 4B. 20 ml H₂SO₄ and 500 ml H₂O were added during the leach to maintain acidity and volume. The results indicated in Table 4A show that 0.86M Cl⁻ (50 g. NaCl) with 20 percent leach feed solids gives only 54.7 percent recovery whereas 1.7M Cl⁻ (100 G NaCl) yields 88.3 percent recovery of silver. A maximum recovery of 91.7 percent of the silver is achieved with 3M Cl⁻ (175.5 g NaCl) and lead recovery increased from 4.3 percent with 1.7M Cl⁻ to 85.9 percent recovery with 3M Cl⁻.

was slurried with 1000 cc of solution containing 106 g NaCl and H₂SO₄ added incrememtally in a ratio of 1,360 lbs per ton. The leach was conducted for 6 hours at approximately 91° C. and at a pH of 0. The results indicated in Table 5A show incomplete silver recovery with the high-silver feed at 13 percent solids in the presence of 3M chloride without continuous recycle through cementation during the leach.

TABLE 5A

|  | Wt % | Assay Mn (Wt %) | Zn (Wt %) | Pb (Wt %) | Ag (oz/ton) | Au (oz/ton) | Distribution (%) Mn | Zn | Pb | Ag | Au |
| --- | --- | --- | --- | --- | --- | --- | --- | --- | --- | --- | --- |
| Feed #3 | 71.4 | 0.2 | 18.0 | 2.4 | 210.7 | .08 | | | | | |
| MnO₂ reagent | 28.6 | 63.2 | | | | | | | | | |
| Leach Feed | 100.0 | 18.1 | 12.9 | 1.7 | 150.5 | .06 | 100.0 | 100.0 | 100.0 | 100.0 | 100.0 |
| Leach Tailing | 60.1 | 0.12 | 4.6 | 2.2 | 137.4 | .04 | 0.4 | 25.7 | 75.4 | 54.8 | 42.0 |
| Solution (Calc) | | | | | | | 99.6 | 74.3 | 24.6 | 45.2 | 42.0 |

EXAMPLE 6

A sulfidic-silver concentrate having the composition indicated in Table 6A was combined with 33.3 percent

TABLE 4A

|  | Wt % | NaCl gms (moles) | Assay Mn (Wt %) | Zn (Wt %) | Pb (Wt %) | Ag (oz/ton) | Au (oz/ton) | Distribution (%) Mn | Zn | Pb | Ag | Au |
| --- | --- | --- | --- | --- | --- | --- | --- | --- | --- | --- | --- | --- |
| Feed #2 | 70.0 | | 10.45 | 1.59 | 1.40 | 9.44 | Tr* | 93.3 | 65.7 | 76.6 | 89.4 | 22.6 |
| Pyritic Tailings | 30.0 | | 1.74 | 1.94 | 1.00 | 2.60 | 0.04 | 6.7 | 34.3 | 23.4 | 10.6 | 77.4 |
| Leach Feed | 100.0 | | 7.84 | 1.70 | 1.23 | 7.33 | 0.02 | 100.0 | 100.0 | 100.0 | 100.0 | 100.0 |
| 4A-1 Leach Tailings | 76.9 | 50 g (0.86 M) | 0.10 | 0.12 | 1.60 | 4.22 | 0.02 | 1.0 | 5.6 | 99.2 | 45.4 | 100.0 |
| Solution (by difference) | | | | | | | | 99.0 | 94.4 | 0.8 | 54.6 | 0 |
| 4A-2 Tailings | 74.3 | 100 g (1.7 M) | 0.10 | 0.12 | 1.65 | 1.16 | Tr | 1.0 | 6.2 | 95.7 | 11.7 | 23.9 |
| Solution (by difference) | | | | | | | | 99.0 | 93.8 | 4.3 | 88.3 | 76.1 |
| A-3 Tailings | 72.6 | 175.5 g (3 M) | 0.15 | 0.15 | 0.25 | 0.84 | Tr | 1.4 | 6.5 | 14.1 | 8.3 | 23.6 |
| Solution (by difference) | | | | | | | | 98.6 | 93.6 | 85.9 | 91.7 | 76.4 |

*Trace considered 0.005 oz/ton.

TABLE 4B

| Time (min) | 4A-1 pH | 4A-1 Temp °C. | 4A-2 pH | 4A-2 Temp °C. | 4A-3 pH | 4A-3 Temp °C. |
| --- | --- | --- | --- | --- | --- | --- |
| 0 | 0 | 17 | 0 | 13 | 0 | 17 |
| 30 | 0 | 67 | 0 | 85 | 0 | 72 |
| 45 | 0 | 90 | 0 | 90 | 0.5 | 90 |
| 90 | 0 | 90 | 0 | 90 | 0 | 91 |
| 150 | 0 | 90 | 0 | 90 | 0 | 91 |
| 300 | 0 | 90 | 0 | 90 | 0 | 91 |
| 360 | 0 | 90 | 0 | 90 | 0 | 91 |

EXAMPLE 5

100 g of sulfide-silver concentrate having the composition indicated in Table 5A was combined with 28.6 g reagent grade MnO₂ to produce 128.6 g of leach feed having the composition indicated in Table 5A. The feed MnO₂ to provide a leach feed having the composition indicated in Table 6A. This feed was slurried with 1000 ml of solution containing 176 g NaCl and H₂SO₄ in a ratio of 1,360 lbs per ton. The leach was conducted for 6 hours at approximately 87° C. at a starting and ending pH of 0 and a maximum pH of 1.5. The leach liquor was continuously recycled through a cementation process during leaching. The results indicated in Table 6A show the effect of continuous cementation during the leaching of essentially the same feed and leach as in Example 5. Silver recovery was increased from 45.2 to 92.8 percent in the presence of 3M chloride.

TABLE 6A

|  | Wt % | Assay Mn (Wt %) | Zn (Wt %) | Pb (Wt %) | Ag (oz/ton) | Au (oz/ton) | Distribution (%) Mn | Zn | Pb | Ag | Au |
| --- | --- | --- | --- | --- | --- | --- | --- | --- | --- | --- | --- |
| Feed #4 | 66.7 | 0.1 | 9.3 | 3.1 | 204.1 | 0.16 | | | | | |
| MnO₂ reagent | 33.3 | 63.2 | | | | | | | | | |
| Leach Feed | 100.0 | 21.1 | 6.2 | 2.1 | 136.1 | .11 | 100.0 | 100.0 | 100.0 | 100.0 | 100.0 |
| Leach Tailing | 50.9 | 0.13 | 4.5 | .5 | 19.2 | .08 | 0.3 | 37.1 | 11.6 | 7.2 | 38.0 |
| Solution (Calc) | | | | | | | 99.7 | 62.9 | 88.4 | 92.8 | 62.0 |

EXAMPLE 7

A sulfide-silver concentrate having the composition indicated in Table 7A was combined with a manganese-silver dump ore having the composition indicated in Table 7A to produce a leach feed having the composition indicated in Table 9A. The leach feed was slurried with 1000 ml of solution containing 106 g NaCl and HCl in a ratio of 1,200 lbs per ton. The leach was conducted for 6 hours at approximately 86° C. at a starting and ending pH of 0 and a maximum pH of 3. The leach liquor was recycled continuously through a cementation device during the leach. The results indicated in Table 7A show that $MnO_2$ provided by a relatively low-grade manganese-silver ore is effective in extracting precious metals and base metal values from a high silver sulfidic concentrate and that zinc and lead values as well as silver and gold values are recovered from the manganese-silver dump ore, as well as the sulfide-silver concentrate.

are the zinc minerals comprising about 80 percent of the concentrate react with the $MnO_2$ in the manganese silver ore to solubilize 92.4 percent of the manganese and 88.2 percent of the zinc in the combined ore and concentrate. With no chloride added, silver, gold and lead are not solubilized but remain in the residue.

Table 8A-2 gives feed compositions tailings composition and the calculated solution recovery for a comparable experiment with the same feed materials, sulfuric acid addition and leach time, temperature and pH but to which 175.5 g NaCl was added to the leach to establish a 3M chloride solution. The results indicated in Table 8A-2 show that in addition to manganese and zinc dissolution 87.3 percent of the silver, 93.0 percent of the gold and 68.0 percent of the lead in the leach feed were solubilized by the 3M chloride solution, representing recovery of these values from both the manganese/silver ore and the sphalerite/marmatite zinc concentrate.

TABLE 8A-1

|  | Wt % | Assay Mn (Wt %) | Assay Zn (Wt %) | Assay Pb (Wt %) | Assay Ag (oz/ton) | Assay Au (oz/ton) | Distribution (%) Mn | Distribution (%) Zn | Distribution (%) Pb | Distribution (%) Ag | Distribution (%) Au |
|---|---|---|---|---|---|---|---|---|---|---|---|
| Zinc Concentrate | 71.4 | 1.18 | 49.00 | 0.60 | 5.40 | 0.04 |  |  |  |  |  |
| Manganese/Silver Ore | 28.6 | 16.84 | 3.65 | 0.66 | 5.16 | 0.04 |  |  |  |  |  |
| Leach Feed | 100.0 | 12.37 | 16.61 | 0.64 | 5.23 | 0.04 | 100.0 | 100.0 | 100.0 | 100.0 | 100.0 |
| Leach Tailings | 70.0 | 1.34 | 2.80 | NA | 7.56 | 0.04 | 7.6 | 11.8 | 100.0 | 100.0 | 100.0 |
| Solution (Calc) |  |  |  |  |  |  | 92.4 | 88.2 | 0 | 0 | 0 |

TABLE 8A-2

|  | Wt % | Assay Mn (Wt %) | Assay Zn (Wt %) | Assay Pb (Wt %) | Assay Ag (oz/ton) | Assay Au (oz/ton) | Distribution (%) Mn | Distribution (%) Zn | Distribution (%) Pb | Distribution (%) Ag | Distribution (%) Au |
|---|---|---|---|---|---|---|---|---|---|---|---|
| Zinc Concentrate | 71.4 | 1.18 | 49.00 | 0.60 | 5.40 | 0.04 |  |  |  |  |  |
| Manganese/Silver Ore | 28.6 | 17.06 | 2.90 | 3.66 | 5.24 | 0.04 |  |  |  |  |  |
| Leach Feed | 100.0 | 12.52 | 16.07 | 2.79 | 5.29 | 0.04 | 100.0 | 100.0 | 100.0 | 100.0 | 100.0 |
| Leach Tailings | 55.9 | 2.69 | 6.60 | 1.60 | 1.20 | Tr | 12.0 | 23.0 | 32.0 | 12.7 | 7.0 |
| Solution (Calc) |  |  |  |  |  |  | 88.0 | 77.0 | 68.0 | 87.3 | 93.0 |

TABLE 7A

|  | Wt % | Assay Mn (Wt %) | Assay Zn (Wt %) | Assay Pb (Wt %) | Assay Ag (oz/ton) | Assay Au (oz/ton) | Distribution (%) Mn | Distribution (%) Zn | Distribution (%) Pb | Distribution (%) Ag | Distribution (%) Au |
|---|---|---|---|---|---|---|---|---|---|---|---|
| Feed #5 | 40.0 | 0.1 | 24.5 | 3.5 | 150.7 | .12 | — | 88.8 | 83.5 | 94.7 | 80 |
| $MnO_2$ ore | 60.0 | 17.8 | 2.1 | 0.5 | 5.6 | .02 | 100.0 | 11.2 | 16.5 | 5.3 | 20 |
| Leach Feed | 100.0 | 10.7 | 11.0 | 1.7 | 63.6 | .06 | 100.0 | 100.0 | 100.0 | 100.0 | 100.0 |
| Leach Tailing | 66.6 | 0.4 | 5.3 | .2 | 10.7 | Tr | 2.5 | 31.7 | 9.7 | 11.2 | 5.5 |
| Solution (Calc) |  |  |  |  |  |  | 97.5 | 68.3 | 90.3 | 88.8 | 94.5 |

EXAMPLE 8

80 g of a zinc concentrate having the composition indicated in Table 8A-1 was combined with 200 g of a manganese-silver dump ore having the composition indicated in Table 8A-1 to produce a leach feed having composition indicated in Table 8A-1. The feed was slurried with 1000 cc of solution containing 20 ml $H_2SO_4$. No chloride was added. The leach was conducted for 6 hours at a temperature of about 91° C. and a pH maintained between 0.5 and 0 by the addition of 60 ml of $H_2SO_4$ during the leach. The results indicated in Table 8A-1 show that sphalerite and marmatite which

EXAMPLE 9

100 g of a tetrahedrite/sulfosalt silver concentrate having the composition indicated in Table 9A was combined with 50 g of reagent $MnO_2$ having the composition indicated in Table 9A to produce a leach feed having a composition indicated in Table 9A. The feed was slurried in 1000 ml of solution containing 20 ml of HCl and 175.5 g of NaCl. The leach was conducted for 6 hours at a temperature of 90° C. and a pH of 0 maintained by addition of 80 ml HCl during the leach. The leach solution was recycled through a cementation process during the leach. The results indicated in Table 9A show that silver is recovered from the sulfosalt mineralization.

TABLE 9A

| | Wt % | Assay Mn | Zn | Pb | Cu | Ag | Au | Distribution (%) Mn | Zn | Pb | Cu | Ag | Au |
|---|---|---|---|---|---|---|---|---|---|---|---|---|---|
| | | (Wt %) | | | | (oz/ton) | | | | | | | |
| Tetrahedrite Concentrate | 66.7 | 0.85 | 1.80 | 1.45 | 5.50 | 54.72 | 0.16 | | | | | | |
| $MnO_2$ | 33.3 | 63.19 | | | | | | | | | | | |
| Leach Feed | 100.0 | 21.63 | 1.20 | 0.97 | 3.67 | 36.48 | 0.11 | 100.0 | 100.0 | 100.0 | 100.0 | 100.0 | |
| Leach Tailings | 54.7 | 2.70 | 0.83 | 0.12 | 6.25 | 16.96 | 0.08 | 6.8 | 37.8 | 6.2 | 93.3 | 25.4 | 41.1 |
| Solution (calculated) | | | | | | | | 93.2 | 62.2 | 93.8 | 6.7 | 74.6 | 58.9 |

EXAMPLE 10

150 g of a gold-bearing cyanide leach residue with a composition indicated in Table 10A was combined with 33 g of reagent $MnO_2$ having a composition indicated in Table 10A to produce a leach feed having a composition indicated in Table 10A. The feed was slurried with 1000 ml of water solution containing 20 ml $H_2SO_4$ and 10 g NaCl. The leach was conducted for 6 hours at a temperature of 90° C. and a pH of 0 was maintained by addition of 20 ml $H_2SO_4$ during the leach. The results given in Table 10A indicate that refractory gold not recovered by cyanidation is effectively recovered and that a very low chloride content of 0.17M is adequate to hold the gold in solution but did not solubilize the silver.

TABLE 10A

| | Wt % | Assay Mn | Fe | Ag | Au | Distribution (%) Mn | Fe | Ag | Au |
|---|---|---|---|---|---|---|---|---|---|
| | | (Wt %) | | (oz/ton) | | | | | |
| Cyanide Residue | 82.0 | 0.04 | 6.20 | 1.84 | 0.24 | | | | |
| $MnO_2$ | 18.0 | 63.19 | | | | | | | |
| Leach Feed | 100.0 | 11.43 | 5.08 | 1.51 | 0.20 | 100.0 | 100.0 | 100.0 | 100.0 |
| Leach Tailings | 72.4 | 0.03 | 3.38 | 2.24 | Trace | 0.2 | 48.2 | 100.0 | 1.8 |
| Solution (calculated) | | | | | | 99.8 | 51.8 | 0 | 98.2 |

EXAMPLE 11

100 g of Feed No. 2 and 54 g of pulverized bituminous coal were combined to produce a leach feed having a composition indicated in Table 11A. The feed was slurried with 1000 ml of an aqueous solution containing 175.5 g (3M) NaCl and 20 ml HCl. The leach was conducted for 6 hours at the temperature and pH shown in Table 11B. 40 ml HCl and 60 ml $H_2O$ was added during the leach to maintain pH. The results given in Table 11A, when compared to the results on the same ore shown in Example 1, without reductant, indicate that bituminous coal is operable as a reductant.

TABLE 11A

| | Wt (g) | Assay Mn | Zn | Pb | Ag | Au | Distribution (%) Mn | Zn | Pb | Ag | Au |
|---|---|---|---|---|---|---|---|---|---|---|---|
| | | (Wt %) | | | (oz/ton) | | | | | | |
| Feed #2 | 100.0 | 10.45 | 1.59 | 1.40 | 9.44 | Tr | | | | | |
| Coal | 54.0 | — | — | — | — | — | — | — | — | — | — |
| Leach Feed | 154.0 | 6.79 | 1.03 | 0.91 | 6.13 | Tr | 100.00 | 100.00 | 100.00 | 100.00 | |
| Leach Tailings | 134.6 | 3.50 | 0.35 | 0.35 | 2.36 | — | 45.07 | 29.56 | 33.57 | 33.65 | |
| Solution (by difference) | | | | | | | 54.33 | 70.44 | 66.43 | 66.35 | |

TABLE 11B

| Elapsed Time (min.) | pH | Temp. °C. |
|---|---|---|
| 0 | 0 | 10 |
| 30 | 0 | 72 |
| 45 | 0 | 86 |
| 60 | 0 | 88 |
| 90 | 0 | 88 |
| 120 | 0 | 88 |
| 180 | 0 | 89 |
| 240 | 0 | 89 |
| 300 | 0 | 89 |
| 360 | 0 | 89 |

EXAMPLE 12

140 g of Feed No. 2 was combined with 50 g of pulverized bituminous coal to form a leach feed having the composition indicated in Table 12A. The feed was slurried with 1000 ml of an aqueous solution containing 175.5 g (3M) NaCl and 20 ml HCl. The leach was conducted for 6 hours at the temperature and pH shown in Table 12B. 40 ml HCl and 800 ml $H_2O$ was added during the leach to maintain the pH. The results given in Table 12A indicate that pulverized bituminous coal is operative as a reductant in the leach at a lower coal to ore ratio than that of Example 11.

TABLE 12A

| | | Assay | | | | | | Distribution (%) | | |
|---|---|---|---|---|---|---|---|---|---|---|
| | | Mn | Zn | Pb | Ag | Au | | | | |
| | Wt (g) | (Wt %) | | | (oz/ton) | | Mn | Zn | Pb | Ag | Au |
| Feed #2 | 140.0 | 10.45 | 1.59 | 1.40 | 9.44 | Tr | | | | | |
| Coal | 50.0 | — | — | — | — | — | | | | | |
| Leach Feed | 190.0 | 7.70 | 1.17 | 1.03 | 6.96 | Tr | 100.00 | 100.00 | 100.00 | 100.00 | |
| Leach Tailings | 164.3 | 4.40 | 0.45 | 0.56 | 3.32 | | 49.42 | 33.18 | 46.94 | 41.27 | |
| Solution (by difference) | | | | | | | 50.58 | 66.82 | 53.06 | 58.73 | |

TABLE 12B

| Elapsed Time (min.) | pH | Temp. °C. |
|---|---|---|
| 0 | 0 | 17 |
| 30 | 0 | 80 |
| 45 | 0 | 90 |
| 60 | 0 | 90 |
| 90 | 0 | 90 |
| 120 | 0 | 90 |
| 180 | 0 | 90 |
| 240 | 0 | 90 |
| 300 | 0 | 90 |
| 360 | 0 | 90 |

EXAMPLE 13

Simulating heap or percolation leaching, a stoichiometric mixture of typical Leadville, Colo. refractory silver bearing oxide and sulfide waste materials was leached in a 4 inch column. The waste materials were crushed to minus ¼ inch to minimize wall effects in the 4 inch column. The leachant used contained 20 grams per liter HCl and 117 grams per liter (2M) NaCl, and was fed at the rate of 5.7 ml per minute. Final extraction was measured from solution assays after passing 395 liters of leachant through the column which equates to 48 days of continuous leaching. Feed material analyses and the final extractions obtained from solution analyses are given in Table 13A-B. Gold was not analyzed in the solutions.

TABLE 13A

| Feed Analyses | Wt (g) | Au (oz/T) | Ag (oz/T) | Mn % | Zn % | Pb % | Fe % | Cu % | Cd % |
|---|---|---|---|---|---|---|---|---|---|
| manganese-oxide material | 7692.3 | 0.04 | 7.88 | 11.0 | 0.03 | 11.5 | 6.80 | 0.08 | 0.006 |
| Pyritic Waste | 3307.7 | 0.04 | 6.23 | 0.32 | 0.88 | 1.65 | 28.0 | 0.36 | 0.006 |
| Column Head (as assayed) | 11,000.0 | 0.04 | 6.79 | 8.00 | 0.70 | 6.50 | 18.0 | 0.16 | 0.006 |

TABLE 13B

| | | | Final Extractions | | | |
|---|---|---|---|---|---|---|
| Ag | Mn | Zn | Pb | Fe | Cu | Cd |
| 87.9% | 64.5% | 79.1% | 49.2% | 27.6% | 55.6% | 75.9% |

EXAMPLE 14

A low grade manganese-silver ore from Silver Cliff, Colo. was leached by percolation without and with added pyrite to demonstrate the effect of reductant. The ore was crushed through ¼ inch and leached in 4 inch columns, one with oxide ore only and the other with a stoichiometric admixture of pyrite waste. The leachant used contained 20 grams per liter HCl and 117 grams per liter NaCl and was added at the rate of 5.7 ml per minute. Final extractions were calculated from feed and tailing analyses after passing 292 liters (36 days equivalent) through the column without added pyrite and 302 liters (37 days equivalent) through the column with pyrite. Table 14A shows the feed analyses and metal recoveries without pyrite addition. Table 14B shows feed analyses and metal recoveries with pyrite addition. Adding pyrite to the low grade material increased silver recovery from 64 to 89 percent.

TABLE 14A

| PRODUCT | WEIGHT | Wt % | Ag (oz/t) | Mn % | Zn % | Pb % | Fe % | Cu % | Cd % |
|---|---|---|---|---|---|---|---|---|---|
| Feed | 9000 | | 2.69 | 2.9 | 0.16 | 0.65 | 3.4 | 0.004 | 0.00 |
| Tails | 8892 | 98.8 | 0.98 | 2.8 | 0.07 | 0.6 | 1.5 | 0.002 | tr |
| Recovery % | | | 64.0 | 4.6 | 56.8 | 8.8 | 56.4 | 50.6 | — |

TABLE 14B

| Feed Analyses | Wt (g) | Au (oz/T) | Ag (oz/T) | Mn % | Zn % | Pb % | Fe % | Cu % | Cd % |
|---|---|---|---|---|---|---|---|---|---|
| (Silver Cliff) oxidized ore | 9180.0 | 0.02 | 2.69 | 2.90 | 0.16 | 0.65 | 3.40 | 0.004 | 0.001 |
| Pyritic Waste | 1020.0 | 0.04 | 1.72 | 0.03 | 0.20 | 0.18 | 39.0 | 0.025 | 0.004 |
| Column Head (as assayed) | 10,200.0 | 0.022 | 2.59 | 2.61 | 0.17 | 0.60 | 6.96 | 0.004 | 0.001 |

| PRODUCT | WEIGHT | Wt % | Ag (oz/t) | Mn % | Zn % | Pb % | Fe % | Cu % | Cd % |
|---|---|---|---|---|---|---|---|---|---|
| Feed | 10200 | | 2.59 | 2.61 | 0.17 | 0.60 | 6.96 | 0.004 | 0.001 |
| Tails | 8892 | 87.17 | 0.33 | 0.27 | 0.07 | 0.035 | 4.00 | 0.001 | tr |

| TABLE 14B-continued | | | | | | | |
|---|---|---|---|---|---|---|---|
| Recovery % | | 88.9 | 91.0 | 64.1 | 89.1 | 49.9 | 78.2 | — |

EXAMPLE 15

Four leaches of ore having the assay shown in Table 15 were conducted with various ferric concentrations, as shown in Table 15. Leach conditions were 85° C. temperature with 25 percent initial solids, a $MnO_2$/$FeS_2$ mole ratio of 7.5 and 1.4 to 1.5 stoichiometric HCl addition. Although Tests 15-2 and 15-3 would be expected to have substantially similar results, extractions and kinetics for Test 15-2 were slightly better than for Test 15-3. A possible reason for the difference may be the slightly larger HCl addition to Test 15-2, which resulted in a final free HCl concentration of 29 g/l. This is well above the 20 g/l "threshold" HCl concentration for high or efficient extraction. Test 15-1 with 11 g/l $Fe^{+3}$ provided significantly lower Ag extraction after 8 hours of leaching than Tests 15-2 and 15-3 with 25 g/l $Fe^{+3}$ or Test 15-4 with 58 g/l $Fe^{+3}$. Tests 15-1 and 15-4, with low and high initial $Fe^{+3}$ concentrations showed decreasing iron extraction at leach times beyond 3 hours, while Tests 15-2 and 15-3, at an intermediate $Fe^{+3}$ level, showed increasing iron extraction in up to 24 hours of leaching. The reason is not clearly understood, but may be related to precipitation of iron as jarosite, favored in Test 15-1 by lower final acidity (17 g/l HCl) and, in Test 15-4, by the high solution Fe concentration which may drive the precipitation reaction despite the higher acidity of the solution. Test 15-1 indicates that a $Fe^{+3}$ concentration of about 10 g/l is consistent with an operable leach, while Tests 15-2 and 15-3 indicate generally enhanced leaching with a concentration exceeding 20 g/l. Only small amounts of $Cl_2$, 1 to 5 percent of theoretical, were evolved from these tests which indicates that the $Cl_2$ recapture mechanism operated efficiently when the 100 percent stoichiometric amount of $FeS_2$ was present in the slurry.

TABLE 15

Summary of Reductive Leaching Mn/Ag Ore
Leach feeds: Ore, Feed: wet ground to 48.6% passing 200 mesh. See note 1 for assays. Pyrite ($FeS_2$): pulverized to nominal passing 325 mesh. See note 1 for assays.
Leach solution: synthetic, 125 g/l Mn.

| Test No.: | 15-1 | | 15-2 | | 15-3 | | 15-4 | |
|---|---|---|---|---|---|---|---|---|
| Conditions: | | | | | | | | |
| Leach solution: | | | | | | | | |
| Initial $Fe^{+3}$, g/l | 11 | | 26 | | 24 | | 58 | |
| Free acid, g/l HCl | 127 | | 134 | | 130 | | 133 | |
| HCl/Mn ratio, g/g | 2.24 | | 2.37 | | 2.31 | | 2.38 | |
| Stoich HCl for $MnO_2$ | 1.41 | | 1.49 | | 1.45 | | 1.49 | |
| Fixed: | | | | | | | | |
| $MnO_2$/$FeS_2$ molar ratio | 7.5 | | 7.5 | | 7.5 | | 7.5 | |
| Initial % solids | 26.0 | | 25.5 | | 25.5 | | 24.6 | |
| Leach temperature, °C. | 85 | | 85 | | 85 | | 85 | |
| Leach time, total hr. | 8 | | 8 | | 24 | | 7 | |
| Results: | 1 hr | 8 hr | 1 hr | 8 hr | 0.25 hr | 24 hr | 1 hr | 7 hr |
| Extractions, %: | | | | | | | | |
| Ag | 83.8 | 90.2 | 94.3 | 98.5 | 86.6 | 96.2 | 92.8 | 94.4 |
| Mn | 80.0 | 84.9 | 91.1 | 95.2 | 86.8 | 97.9 | 89.1 | 93.0 |
| Fe | 60.0 | 61.0 | 72.0 | 77.0 | 61.0 | 76.0 | 64.0 | 56.0 |
| Pb | — | 84.4 | — | 94.3 | — | 95.3 | — | 90.8 |
| Zn | — | 97.5 | — | 99.5 | — | 99.3 | — | 98.7 |
| Leach weight loss, % | | 27 | | 30 | | 33 | | 29 |
| HCl consumption: | | | | | | | | |
| lb/ton ore | | 508 | | 598 | | 485 | | 451 |
| g/g Mn | | 2.02 | | 1.98 | | 1.93 | | 1.79 |
| Stoich for $MnO_2$ | | 1.27 | | 1.25 | | 1.21 | | 1.13 |
| Chlorine evolved from slurry: | | | | | | | | |
| % of theoretical 2/ | | 0.8 | | 2.2 | | 4.9 | | 2.4 |
| Final free acid, g/l HCl | | 17.3 | | 28.8 | | 20.2 | | 34.3 |
| Final residue, Ag, oz/ton | | 0.971 | | 0.172 | | 0.388 | | 0.557 |
| Mn, % | | 2.49 | | 0.824 | | 0.382 | | 1.21 |

| Leach Reaction Stoichiometry: | | |
|---|---|---|
| | Stoichiometry | |
| Reaction | $MnO_2$/$FeS_2$ mole/mole | HCl/Mn g/g |
| $7.5MnO_2 + FeS_2 + 18HCl \rightarrow 7.5MnCl_2 + FeCl_3 + 2H_2SO_4 + 7H_2O$ | 7.5 | 1.59 |

Note 1:
Ore: 7.26 oz/ton Ag; 12.6% Mn; 1.35% , e; 1.64% Pb; 2.21% Zn.
Pyrite: 0.28 oz/ton Ag; 0.028% Mn; 43.8% Fe; 0.018% Pb; 0.058% Zn.
Note 2:
If no $FeS_2$ were present in the slurry, the $MnO_2$ in the ore would produce $Cl_2$ according to reaction: $MnO_2 + 4HCl \rightarrow MnCl_2 + Cl_2 + 2H_2O$

EXAMPLE 16

A feed similar to that described in Example 15 was leached with several different molar ratios of $MnO_2$/$FeS_2$ and with no pyrite added. Tests 16-2 and 16-3 are the same as Tests 15-2 and 15-3 described above. Leach conditions were 85° C. temperature, 25 percent initial solids, 25 g/l $Fe^{+3}$ in solution and 1.5 stoichiometric HCl for slurries containing FeS$_2$. Leach conditions and results are presented in Table 16. Chlorine gas evolution was measured by passing the off-gas from the reactor through an NaOH scrubber. The amount of Cl$_2$ lost from the leach slurry was determined by titration of the free chlorine content of the scrubber solution. The data of Table 16 indicate that Cl$_2$ is lost from slurries which do not contain the stoichiometric amount of FeS$_2$ to convert the evolved Cl$_2$ to HCl.

tracted Fe would be precipitated as jarosite, this did not occur. It was also expected that at 85° C. significant Fe precipitation as hydrogen jarosite would occur. Unexpectedly low precipitation in Tests 17-2 and 17-4 are ascribed to high free acid or too low concentration of monovalent ions that form more insoluble jarosites, indicating that a monovalent metal cation, e.g. Na$^+$, NH$_4^+$ or K$^+$, is preferably present in the leach solution to produce 0 percent net extraction of Fe in leaching.

TABLE 16

Summary of Reductive Leaching Mn/Ag Ore
Leach feeds: Ore, Feed: wet ground to 48.6% passing 200 mesh. See note 1 for assays. Pyrite (FeS$_2$): pulverized to nominal passing 325 mesh. See note 1 for assays.
Leach solution: synthetic, 125 g/l Mn.

| Test No.: | 16-1 | | 16-2 | | 16-3 | | 16-4 | | 16-5 | | 16-6 | |
|---|---|---|---|---|---|---|---|---|---|---|---|---|
| Conditions: | | | | | | | | | | | | |
| Variable: | | | | | | | | | | | | |
| MnO$_2$/FeS$_2$ molar ratio | 4.5 | | 7.5 | | 7.5 | | 12.2 | | No pyrite added | | No pyrite added | |
| Fixed: | | | | | | | | | | | | |
| Leach solution: | | | | | | | | | | | | |
| Initial Fe$^{+3}$, g/l | 26 | | 26 | | 24 | | 26 | | 26 | | 24 | |
| Free acid, g/l HCl | 133 | | 134 | | 130 | | 133 | | 131 | | 176 | |
| HCl/Mn ratio, g/g | 2.37 | | 2.37 | | 2.31 | | 2.37 | | 2.31 | | 3.34 | |
| Stoich HCl for MnO$_2$ | 1.49 | | 1.49 | | 1.45 | | 1.49 | | 0.87 3/ | | 1.26 3/ | |
| Initial % solids | 25.4 | | 25.5 | | 25.5 | | 25.4 | | 25.5 | | 24.2 | |
| Leach temperature, °C. | 85 | | 85 | | 85 | | 85 | | 85 | | 85 | |
| Leach time, total hr. | 7 | | 8 | | 24 | | 7 | | 7 | | 22 | |
| Results: | 1 hr | 7 hr | 1 hr | 8 hr | 0.25 hr | 24 hr | 1 hr | 7 hr | 1 hr | 7 hr | 0.25 hr | 24 hr |
| Extractions, %: | | | | | | | | | | | | |
| Ag | 96.3 | 98.2 | 94.3 | 98.5 | 86.6 | 96.2 | 85.5 | 87.9 | 61.6 | 61.5 | 83.0 | 90.2 |
| Mn | 93.6 | 97.9 | 91.1 | 95.2 | 86.8 | 97.9 | 84.0 | 84.2 | 57.1 | 55.9 | 83.6 | 85.0 |
| Fe | 52.0 | 50.0 | 72.0 | 77.0 | 61.0 | 76.0 | 59.0 | 60.0 | 25.0 | 34.0 | 61.0 | 61.0 |
| Pb | — | 94.6 | — | 94.3 | — | 95.3 | — | 85.3 | — | 61.9 | — | 88.5 |
| Zn | — | 99.5 | — | 99.5 | — | 99.3 | — | 97.3 | — | 90.5 | — | 97.5 |
| Leach weight loss, % | 31 | | 30 | | 33 | | 27 | | 20 | | 28 | |
| HCl consumption: | | | | | | | | | | | | |
| lb/ton ore | 513 | | 498 | | 485 | | 524 | | 495 | | 740 | |
| g/g Mn | 2.03 | | 1.98 | | 1.93 | | 2.08 | | 1.97 | | 2.94 | |
| Stoich for MnO$_2$ | 1.28 | | 1.25 | | 1.21 | | 1.31 | | 0.74 | | 1.11 | |
| Chlorine evolved from slurry: | | | | | | | | | | | | |
| % of theoretical 2/ | 0.2 | | 2.2 | | 4.0 | | 12.0 | | 35.1 | | 72.0 | |
| Final free acid, g/l HCl | 24.0 | | 28.8 | | 20.2 | | 22.2 | | 17.9 | | 23.1 | |
| Final residue, Ag, oz/ton | 0.171 | | 0.172 | | 0.388 | | 1.16 | | 3.58 | | 1.02 | |
| Mn, % | 0.364 | | 0.824 | | 0.382 | | 2.67 | | 6.94 | | 2.63 | |

Leach Reaction Stoichiometry:

| Reaction No. | Reaction | Stoichiometry MnO$_2$/FeS$_2$ mole/mole | HCl/Mn g/g |
|---|---|---|---|
| 1 | 7.5MnO$_2$ + FeS$_2$ + 18HCl → 7.5MnCl$_2$ + FeCl$_3$ + 2H$_2$SO$_4$ + 7H$_2$O | 7.5 | 1.59 |
| 2 | MnO$_2$ + 4HCl → MnCo$_2$ + Cl$_2$ + 2H$_2$O | — | 2.66 |

Note 1:
Ore: 7.26 oz/ton Ag; 12.6% Mn; 1.35% Fe; 1.64% Pb; 2.21% Zn.
Pyrite: 0.28 oz/ton Ag; 0.028% Mn; 43.8% Fe; 0.018% Pb; 0.058% Zn.
Note 2:
If no FeS$_2$ were present in the slurry, the MnO$_2$ in the ore would produce Cl$_2$ according to Reaction: MnO$_2$ + 4HCl → MnCl$_2$ + Cl$_2$ + 2H$_2$O

EXAMPLE 17

Leaches on ore with the characteristics shown in Table 17 were conducted at varying temperatures to investigate the extraction behavior of Fe and its precipitation as jarosite. Temperatures of 70° C., 85° C. and 105° C. were tested. Results are summarized in Table 17. Although it was expected that at 105° C. all ex- Na$^+$ concentration was analyzed at only 0.004 gpl. Note that some hydrogen jarosite precipitated in Test 17-4 in which the temperature was raised to 105° C. and the terminal HCl concentration was 15.9 gpl. This is indicated by the reduction in net iron extraction from 65.0% at 0.25 hours to 43.0% after 24 hours leach time.

TABLE 17

Summary of Reductive Leaching Mn/Ag Ore
Leach feeds: Ore, Feed: wet ground to 48.6% passing 200 mesh. See note 1 for assays. Pyrite (FeS$_2$): pulverized to nominal passing 325 mesh. See note 1 for assays.
Leach solution: synthetic, 125 g/l Mn.

| Test No.: | 17-1 | 17-2 | 17-3 | 17-4 |
|---|---|---|---|---|
| Conditions: | | | | |
| Variable: | | | | |

TABLE 17-continued

Summary of Reductive Leaching Mn/Ag Ore
Leach feeds: Ore, Feed: wet ground to 48.6% passing 200 mesh. See note 1 for assays. Pyrite (FeS$_2$): pulverized to nominal passing 325 mesh. See note 1 for assays.
Leach solution: synthetic, 125 g/l Mn.

| Test No.: | 17-1 | | 17-2 | | 17-3 | | 17-4 | |
|---|---|---|---|---|---|---|---|---|
| Leach temperature, °C. | 70 | | 85 | | 85 | | 105 | |
| Fixed: | | | | | | | | |
| MnO$_2$/FeS$_2$ molar ratio | 7.5 | | 7.5 | | 7.5 | | 7.5 | |
| Leach solution: | | | | | | | | |
| Initial Fe$^{+3}$, g/l | 25 | | 26 | | 24 | | 25 | |
| Free acid, g/l HCl | 130 | | 134 | | 130 | | 130 | |
| HCl/Mn ratio, g/g | 2.06 | | 2.37 | | 2.31 | | 2.06 | |
| Stoich HCl for MnO$_2$ | 1.30 | | 1.49 | | 1.45 | | 1.30 | |
| Initial % solids | 25.2 | | 25.5 | | 25.5 | | 25.2 | |
| Leach time, total hr. | 24 | | 8 | | 24 | | 24 | |
| Results: | 0.25 hr | 24 hr | 1 hr | 8 hr | 0.25 hr | 24 hr | 0.25 hr | 24 hr |
| Extractions, %: | | | | | | | | |
| Ag | 91.8 | 97.2 | 94.3 | 98.5 | 86.6 | 96.2 | 90.4 | 99.0 |
| Mn | 85.4 | 95.7 | 91.1 | 95.2 | 86.8 | 97.9 | 85.9 | 99.2 |
| Fe | 60.0 | 69.0 | 72.0 | 77.0 | 61.0 | 76.0 | 65.0 | 43.0 |
| Pb | — | 94.5 | — | 94.3 | — | 95.3 | — | 93.8 |
| Zn | — | 98.5 | — | 99.5 | — | 99.3 | — | 99.4 |
| Leach weight loss, % | | 32 | | 30 | | 33 | | 31 |
| HCl consumption: | | | | | | | | |
| lb/ton ore | | 487 | | 498 | | 485 | | 519 |
| g/g Mn | | 1.93 | | 1.98 | | 1.93 | | 2.06 |
| Stoich for MnO$_2$ | | 1.21 | | 1.25 | | 1.21 | | 1.30 |
| Chlorine evolved from slurry: | | | | | | | | |
| % of theoretical 2/ | | 1.1 | | 2.2 | | 4.0 | | 7.3 |
| Final free acid, g/l HCl | | 20.6 | | 28.8 | | 20.2 | | 13.9 |
| Final residue, Ag, oz/ton | | 0.274 | | 0.172 | | 0.388 | | 0.092 |
| Mn, % | | 0.760 | | 0.824 | | 0.382 | | 1.135 |

Leach Reaction Stoichiometry:

| Reaction | Stoichiometry MnO$_2$/FeS$_2$ mole/mole | HCl/Mn g/g |
|---|---|---|
| 7.5MnO$_2$ + FeS$_2$ + 18HCl → 7.5MnCl$_2$ + FeCl$_3$ + 2H$_2$SO$_4$ + 7H$_2$O | 7.5 | 1.59 |

Note 1:
Ore: 7.26 oz/ton Ag; 12.6% Mn; 1.35% Fe; 1.64% Pb; 2.21% Zn.
Pyrite: 0.28 oz/ton Ag; 0.028% Mn; 43.8% Fe; 0.018% Pb; 0.058% Zn.
Note 2:
If no FeS$_2$ were present in the slurry, the MnO$_2$ in the ore would produce Cl$_2$ according to reaction: MnO$_2$ + 4HCl → MnCl$_2$ + Cl$_2$ + 2H$_2$O

EXAMPLE 18

Leaching of ores with the characteristics shown in Table 18 were conducted at varying temperatures to investigate the extraction behavior of Fe and its precipitation as sodium jarosite. Results are summarized in Table 18. Test 18-4 is identical to Test 17-4 above. The effect of low sodium concentration is demonstrated by Test 18-4. In this test, precipitation of jarosite was believed to be mostly precipitation of hydrogen jarosite. The results indicate that another monovalent cation is preferably present in the leach slurry. The tests indicate the effects of Na$^+$ ion concentration, temperature and terminal free acid. Test 18-1 at 80° C. and 20 gpl terminal free acid maintained approximately the initial ferric ion concentration, while Test 18-3 at 105° C. and 6.6 gpl terminal free acid substantially depleted the ferric ion concentration by precipitation of sodium jarosite.

TABLE 18

| Test No.: | 18-1 | | | | 18-2 | | | | 18-3 | | | | 18-4 | | | |
|---|---|---|---|---|---|---|---|---|---|---|---|---|---|---|---|---|
| Molar ratio MnO$_2$:FeS$_2$ | 4.5:1 | | | | 4.5:1 | | | | 4.5:1 | | | | 7.5:1 | | | |
| % Solids | 10.7 | | | | 10.9 | | | | 26.3 | | | | 25.2 | | | |
| Leach temperature | 80° C. | | | | 105° C. | | | | 105° C. | | | | 105° C. | | | |
| Initial HCl g/l | 50.3 | | | | 43.7 | | | | 50.7 | | | | 130 | | | |
| Final HCl g/l | 20.0 | | | | 11.8 | | | | 6.6 | | | | 13.9 | | | |
| Initial Na$^+$ g/l | 1.6 | | | | 1.8 | | | | 1.9 | | | | .004 | | | |
| | Mn | Ag | Fe | EMF (+mV) | Mn | Ag | Fe | EMF (+mV) | Mn | Ag | Fe | EMF (+mV) | Mn | Ag | Fe | EMF (+mV) |
| Ore | 13.8 | 11.0 | 1.26 | | 13.8 | 11.0 | 1.26 | | 13.8 | 11.0 | 1.26 | | 12.6 | 7.26 | 1.35 | |
| Pyrite | | | 43.8 | | | | 43.8 | | | | 43.8 | | | .28 | 43.8 | |
| Leach Solution, g/l | | | | | | | | | | | | | | | | |
| Initial | 154 | | 54.1 | 560 | 167 | | 29.8 | 560 | 184 | | 58.1 | 560 | 125 | | 25 | |
| 1 hour | 172 | .050 | 57.4 | | 172 | .059 | 31.3 | | 256 | .178 | | 550 | | | | |
| 2 hours | 172 | .054 | 55.9 | | 186 | .061 | 31.4 | | 245 | .172 | | | | | | |
| 4 hours | 180 | .057 | 55.9 | 660 | 182 | .063 | 26.0 | 540 | 229 | .163 | 18.0 | 505 | | | | |
| Extraction % from ore | | | | | | | | | | | | | | | | |

TABLE 18-continued

| Test No.: | 18-1 | | | 18-2 | | | 18-3 | | | 18-4 | | |
|---|---|---|---|---|---|---|---|---|---|---|---|---|
| 1 hour | 73.6 | 79.1 | 27 | 80.1 | 86.7 | 8.0 | 99.1 | 95.5 | | 85.9 | 90.4 | 65.0 |
| 2 hours | 81.2 | 86.3 | 10 | 85.4 | 89.9 | −2 | 99.5 | 96.5 | | | | |
| 4 hours | 95.6 | 95.4 | −22 | 99.4 | 97.4 | −38 | 99.1 | 95.9 | −177 | | | |
| 24 hours | | | | | | | | | | 99.2 | 99.0 | 43.0 |
| ptn from solution | | 2.8 | | | 8.7 | | | 61.4 | | | | |

EXAMPLE 19

A series of leaches was conducted to investigate the effect of feed particle size on leach extractions. The leach conditions and results are summarized in Table 19. The tests indicate that coarse grinding results in extractions substantially as good as those achieved from fine-ground ore. In all cases, finely-ground pyrite reductant was used, since efficient $Cl_2$ recapture is at least partly dependent on pyrite surface area available for reaction.

TABLE 19

Summary of Reductive Leaching Mn/Ag Ore
Leach feeds: Ore, Feed: wet ground to 100% passing 10 mesh or wet ground to 100% passing 48 mesh. See note 1 for assays. Pyrite ($FeS_2$): pulverized to nominal passing 325 mesh. See note 1 for assays. Leach solution: synthetic, 125 g/l Mn.

| Test No.: | 19-1 | | 19-2 | | 19-3 | |
|---|---|---|---|---|---|---|
| Conditions: | | | | | | |
| Variable: | | | | | | |
| Feed Particle Size | 30.7% passing 100 mesh | | 78.0% passing 100 mesh | | 79% passing 100 mesh | |
| Fixed: | | | | | | |
| $MnO_2/FeS_2$ molar ratio | 7.5 | | 7.5 | | 7.5 | |
| Leach solution: | | | | | | |
| Initial $Fe^{+3}$, g/l | 33.3 | | 26 | | 24 | |
| Free acid, g/l HCl | 130 | | 134 | | 130 | |
| HCl/Mn ratio, g/g | 2.31 | | 2.37 | | 2.31 | |
| Stoich HCl for $MnO_2$ | 1.45 | | 1.49 | | 1.45 | |
| Initial % solids | 25.3 | | 25.5 | | 25.5 | |
| Leach temperature, °C. | 85 | | 85 | | 85 | |
| Leach time, total hr. | 22 | | 8 | | 24 | |
| Results: | 0.25 hr | 22 hr | 1 hr | 8 hr | 0.25 hr | 24 hr |
| Extractions, %: | | | | | | |
| Ag | 94.4 | 97.4 | 94.3 | 98.5 | 86.6 | 96.2 |
| Mn | 91.3 | 97.6 | 91.1 | 95.2 | 86.8 | 97.9 |
| Fe | 67 | 86 | 72.0 | 77.0 | 61.0 | 76.0 |
| Pb | — | 94.9 | — | 99.5 | — | 95.3 |
| Zn | — | 99.2 | — | 99.5 | — | 99.3 |
| Leach weight loss, % | 32 | | 30 | | 33 | |
| HCl consumption: | | | | | | |
| lb/ton ore | 485 | | 498 | | 485 | |
| g/g Mn | 1.93 | | 1.98 | | 1.93 | |
| Stoich for $MnO_2$ | 1.21 | | 1.25 | | 1.21 | |
| Chlorine evolved from slurry: | | | | | | |
| % of theoretical 2/ | 0.3 | | 2.2 | | 4.9 | |
| Final free acid, g/l HCl | 25.9 | | 28.8 | | 20.2 | |
| Final residue, Ag, oz/ton | 0.233 | | 0.172 | | 0.388 | |
| Mn, % | 0.420 | | 0.824 | | 0.382 | |
| Leach Reaction Stoichiometry: | | | | | | |

| Reaction | Stoichiometry | |
|---|---|---|
| | $MnO_2/FeS_2$ mole/mole | HCl/Mn g/g |
| $7.5MnO_2 + FeS_2 + 2H_2SO_4 + 7H_2O$ | 7.5 | 1.59 |

Note 1:
Ore: 7.26 oz/ton Ag; 12.6% Mn; 1.35% Fe; 1.64% Pb; 2.21% Zn.
Pyrite: 0.28 oz/ton Ag; 0.028% Mn; 43.8% Fe; 0.018% Pb; 0.058% Zn.
Note 2:
If no $FeS_2$ were present in the slurry, the $MnO_2$ in the ore would produce $Cl_2$ according to Reaction:
$MnO_2 + 4HCl \rightarrow MnCl_2 + Cl_2 + 2H_2O$.

Although the foregoing invention has been described in some detail by way of illustration and example for purposes of clarity and understanding, it will be obvious that certain changes and modifications may be practiced within the scope of the invention, as limited only by the scope of the appended claims.

We claim:

1. A process for recovery of precious metals from a precious metal-containing refractory ore or other refractory feed comprising precious metals including at least material selected from the group consisting of silver and gold, comprising the steps of:

adding a material to said feed selected from the group consisting of $MnO_2$, a reductant, or mixtures thereof, said reductant comprising material selected from the group consisting of pyrite, sulfidic materials and carbonaceous materials;

leaching said feed to form a leach with a leach liquor comprising an acid selected from the group consisting of HCl and $H_2SO_4$ in the presence of $MnO_2$ and a reductant comprising material selected from the group consisting of pyrite, sulfidic materials and carbonaceous materials wherein said reductant reduces said $MnO_2$ that is associated with precious metals;

adding a source of chloride ion to said leach to maintain a concentration of chloride ions in said leach sufficient to dissolve at least about 50% of said precious metals present in said ore;

separating a portion of said leach comprising at least a portion of said dissolved precious metals and further comprising a chloride carrier which comprises $MnCl_2$ to produce a removed portion of said leach liquor;

recovering a solid comprising at least a portion of said precious metals from said removed portion to produce a precious metals-depleted stream; and recycling at least a portion of said chloride carrier to said leaching step to carry chloride values to the leach.

2. The process of claim 1 wherein said leach is reacted in agitated suspension during the leaching step.

3. The process of claim 2 further comprising separating solids from said removed portion prior to recovering said dissolved precious metals.

4. The process of claim 1 wherein said leaching step comprises percolating said leach liquor through said feed and recycling said leach liquor back to said feed before said separating step.

5. The process of claim 4 further comprising washing said feed with water to recover entrained precious metals values after said removed portion contains substantially no dissolved precious metals.

6. The process of claim 1 wherein said acid is $H_2SO_4$.

7. The process of claim 1 wherein said acid is HCl.

8. The process of claim 7 further comprising:
generating said HCl in-situ in said leach by a process comprising adding $H_2SO_4$ and $CaCl_2$ to said leach.

9. The process of claim 7 further comprising:
regenerating HCl by pyrohydrolysis from said precious metals-depleted stream.

10. The process of claim 9 wherein said regeneration comprises:
pyrohydrolyzing a portion of said precious metals-depleted stream to produce regenerated HCl and solid $Mn_2O_3$; and
separating said solid $Mn_2O_3$ from said regenerated HCl.

11. The process of claim 10 further comprising:
concentrating a portion of said precious metals-depleted stream by heating said stream by heat exchange with a fluid comprising said regenerated HCl.

12. The process of claim 7 further comprising:
sparging said precious metals-depleted stream with gaseous HCl to produce a sparged stream; and
cooling said sparged stream to precipitate $MnCl_2 \cdot H_2O$.

13. The process of claim 12 further comprising: pyrohydrolyzing said $MnCl_2 \cdot H_2O$ to produce $Mn_2O_3$ and regenerated HCl.

14. The process of claim 13 wherein said gaseous HCl comprises said regenerated HCl.

15. The process of claim 2 further comprising: grinding said ore to less than about 48 Mesh.

16. The process of claim 1 wherein said reductant comprises pyrite.

17. The process of claim 16 wherein said pyrite contains less than about 1 oz. precious metal values per ton.

18. The process of claim 16 wherein said pyrite contains more than about 1 oz. precious metal values per ton.

19. The process of claim 1 wherein said reductant comprises a carbonaceous material.

20. The process of claim 1 wherein said precious metals comprise silver.

21. The process of claim 1 wherein said precious metals comprise gold.

22. The process of claim 1 wherein said recovering step comprises:
contacting a portion of said stream with a metal selected from the group consisting of copper, lead, iron or zinc to form solid precious metals.

23. The process of claim 1 wherein said stream comprises zinc and further comprising the step of recovering zinc from said stream.

24. The process of claim 1 wherein said stream comprises lead and further comprising the step of recovering lead from said stream.

25. The process of claim 2 wherein precious metals are removed from said removed portion by a continuous cementation process comprising:
separating precious metals from said removed portion by cementation to produce a precious metals-depleted leach liquor; and
recycling said precious metals-depleted leach liquor to said leaching step.

26. The process of claim 3 wherein said step of separating solids from said stream comprises cycloning.

27. The process of claim 1 wherein said process further comprises:
precipitating a jarosite from said removed portion by addition of a base thereto.

28. The process of claim 1 wherein said process further comprises:
controlling the temperature of at least a portion of said feed to provide a temperature effective to precipitate jarosite from said portion of said feed.

29. The process of claim 1 wherein said process further comprises:
providing a ferric ion source to said feed; and
maintaining in said feed a concentration of ferric ions greater than or equal to about 10 g/l.

30. The process of claim 29 wherein the ferric ion concentration in said feed is maintained between about 20 g/l and about 30 g/l.

31. The process of claim 29 wherein said step of maintaining in said feed a concentration of ferric ions comprises:
precipitating jarosite from at least a portion of said removed portion in an amount wherein recycle of at least a portion of said fluid to said feed provides a source of ferric ions to said feed.

32. The process of claim 31 wherein said leach comprises $Fe^{+3}$ and wherein said feed comprises $Na^+$ in a molar ratio of at least about 0.3 moles $Na^+$ per mole of $Fe^{+3}$.

33. The process of claim 1 wherein said process further comprises:
maintaining in said feed a ferric ion to ferrous ion concentration ratio sufficient to produce an electromative force of said leach of at least about 450 mv.

34. The process of claim 1, further comprising:

controlling formation of $Cl_2$ by providing $FeS_2$ in said feed in an amount to produce a molar ratio of $MnO_2$ to $FeS_2$ of about 7.5.

35. The process of claim 2, wherein:
said ore has a size of less than about −10 mesh.

36. The process of claim 1 wherein said refractory feed comprises $MnO_2$ that is associated with said precious metals and said process comprises adding a reductant to said leach selected from the group consisting of sulfide materials, carbonaceous materials, and mixtures thereof.

37. The process of claim 1 wherein said refractory feed comprises material that is associated with said precious metals said material being selected from the group consisting of sulfidic and carbonaceous ores and said process comprises adding $MnO_2$ to the leach.

38. The process of claim 37 further comprising:
concentrating sulfide from said removed portion of said feed by a flotation process;
separating said concentrated sulfide from said portion of said feed; and
recycling said concentrated sulfide to said feed.

39. The process of claim 38 further comprising:
grinding said concentrated sulfide.

40. The process of claim 1 wherein said maintaining step comprises:
adding a source of chloride ion comprising a first compound selected from the group consisting of $CaCl_2$, KCl, $NH_4Cl$ and NaCl to said feed to maintain a concentration of chloride ions in said feed sufficient to dissolve at least about 50% of said precious metals present in said ore wherein said reductant is oxidized to achieve reduction of said manganese dioxide.

41. The process of claim 1 wherein said precious metals-depleted stream comprises sulfate, and wherein said step of adding a source of chloride ion comprises adding $CaCl_2$ and a second chloride ion source in a first weight ratio of $CaCl_2$ to said second chloride ion source, and further comprising:
regulating the concentration of said sulfate by a process including adjusting said first weight ratio.

* * * * *